US010743287B2

(12) United States Patent
Zhang et al.

(10) Patent No.: US 10,743,287 B2
(45) Date of Patent: Aug. 11, 2020

(54) TECHNIQUES FOR CONTENDING FOR ACCESS TO CHANNELS OF A SHARED RADIO FREQUENCY SPECTRUM BAND FOR BROADCAST/MULTICAST TRANSMISSIONS

(71) Applicant: QUALCOMM Incorporated, San Diego, CA (US)

(72) Inventors: Xiaoxia Zhang, San Diego, CA (US); Srinivas Yerramalli, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 15/244,662

(22) Filed: Aug. 23, 2016

(65) Prior Publication Data

US 2017/0079010 A1  Mar. 16, 2017

Related U.S. Application Data

(60) Provisional application No. 62/217,607, filed on Sep. 11, 2015.

(51) Int. Cl.
*H04L 5/00* (2006.01)
*H04W 72/00* (2009.01)
(Continued)

(52) U.S. Cl.
CPC ......... *H04W 72/005* (2013.01); *H04L 5/0035* (2013.01); *H04L 12/2861* (2013.01);
(Continued)

(58) Field of Classification Search
CPC .... H04W 74/04; H04W 74/08; H04L 5/0035; H04L 12/2861; H04L 12/4035; H04L 47/15
See application file for complete search history.

(56) References Cited

U.S. PATENT DOCUMENTS

2002/0188750 A1* 12/2002 Li ......................... H04L 12/413
709/235
2005/0063349 A1* 3/2005 LoGalbo ............... H04W 88/08
370/338
(Continued)

FOREIGN PATENT DOCUMENTS

KR        20120035702 A      4/2012

OTHER PUBLICATIONS

Li et al., "A New Backoff Algorithm for IEE 802.11 Distributed Coordination Function", IEEE Xplorer, Aug. 14-16, 2009 (Years: 2009).*

(Continued)

*Primary Examiner* — Salvador E Rivas
(74) *Attorney, Agent, or Firm* — Dalei Dong; Holland & Hart LLP

(57) ABSTRACT

Techniques are described for wireless communications. One method includes determining a contention window size for a first broadcast transmission or a first multicast transmission on at least one channel of a shared radio frequency spectrum band, where the first broadcast transmission or the first multicast transmission is targeted for a first plurality of UEs, and contending for access to the at least one channel of the shared radio frequency spectrum band for the first broadcast transmission or the first multicast transmission based at least in part on the determined contention window size. In some cases, the first broadcast transmission or the first multicast transmission may be an example of a multipoint transmission, which may include a coordinated multipoint transmission.

24 Claims, 24 Drawing Sheets

(51) Int. Cl.

| | | |
|---|---|---|
| *H04W 16/14* | (2009.01) | |
| *H04W 74/08* | (2009.01) | |
| *H04W 74/00* | (2009.01) | |
| *H04W 4/06* | (2009.01) | |
| *H04L 12/801* | (2013.01) | |
| *H04L 12/28* | (2006.01) | |
| *H04W 74/04* | (2009.01) | |
| *H04L 12/403* | (2006.01) | |

(52) U.S. Cl.
CPC ............... *H04L 47/15* (2013.01); *H04W 4/06* (2013.01); *H04W 16/14* (2013.01); *H04W 74/004* (2013.01); *H04W 74/0816* (2013.01); *H04L 12/4035* (2013.01); *H04W 74/04* (2013.01)

(56) References Cited

U.S. PATENT DOCUMENTS

| | | | | |
|---|---|---|---|---|
| 2009/0279470 | A1* | 11/2009 | Seok | H04L 1/1685 370/312 |
| 2011/0243034 | A1* | 10/2011 | Yamada | H04L 5/001 370/254 |
| 2011/0310785 | A1* | 12/2011 | Gou | H04W 72/005 370/312 |
| 2012/0236800 | A1* | 9/2012 | Park | H04W 72/1226 370/329 |
| 2014/0079022 | A1* | 3/2014 | Wang | H04W 36/22 370/331 |
| 2016/0270100 | A1* | 9/2016 | Ng | H04L 1/1887 |

OTHER PUBLICATIONS

Li et al., "A New Backoff Algorithm for IEEE 802.11 Distributed Coordination Function", IEEE Xplorer, Aug. 14-16, 2009 (Year: 2009).*

Alcatel-Lucent et al., "Review of Annex 1 of Rec. ITU-R M.2012," 3GPP TSG RAN WG1 Meeting #72bis, R1-131800, Chicago, USA, Apr. 15-19, 2013, 92 pgs, XP050697570, 3rd Generation Partnership Project. Retrieved from the Internet: URL: http://www.3gpp.org/ftp/tsg_ran/WG1_RL1/TSGR1_72b/Docs. [retrieved on May 2, 2013].

Bagby, "Wireless Access Method and Physical Layer Specifications—Monday Afternoon MAC Group Meeting," IEEE 802.11, May 11, 1995, 8 pgs., DOC: P802,11-95/089a, XP068085433, Institute of Electrical and Electronics Engineers, Piscataway, NJ USA. [retrieved on Jan. 2, 2015].

ISA/EP, International Search Report and Written Opinion of the International Searching Authority, Int'l Application No. PCT/US2016/048269, dated Oct. 28, 2016, European Patent Office, Rijswijk, NL, 17 pgs.

Orfanos et al., "A New Distributed Coordination Function for W-LANs with Multiple Channel Structure," Proceedings of 14th 1st Mobile & Wireless Communications Summit, Dresden, Germany, Jun. 19-23, 2005, 5 pgs, XP002756497, URL: www.eurasip.org/Proceedings/Ext/IST05/papers/275.pdf.

IEEE, "P<designation>™/D0.6 Draft <Gde./Rec. Prac./Std.> for <Complete Title Matching PAR>, Unapproved IEEE Standards Draft, Nov. 6, 2014, 110 pgs., vol. P802.15.8/D0.6", XP068078652, Institute of Electrical and Electronics Engineers, New York, NY, USA. [retrieved on Nov. 6, 2014].

IEEE, P802.15.8™/D0.2 Draft Std. for Wireless Medium Access Control (MAC) and Physical Layer (PHY) Specifications for Peer Aware Communications (PAC), Unapproved IEEE Standards Draft, Sep. 18, 2014, 16 pgs, vol. P802.15.8™/D0.2, XP068071452, Institute of Electrical and Electronics Engineers, New York, NY, USA. [retrieved on Sep. 18, 2014].

IEEE, "Results of Ballot on Draft Standard D3.0 Comments on Clause 9 and Resolutions," IEEE Draft, May 1996, 54 pgs; Doc.: IEEE P802.11-96/47-5R6, XP068086155, Institute of Electrical and Electronics Engineers, Piscataway, NJ, USA. [retrieved on Jan. 17, 2015].

Seok et al., "Audio Video Multicast Protocol", IEEE, Jan. 16, 2007, 18 pgs., Doc.: IEEE 802.11-yy/xxxxr0, XP002763164, Institute of Electrical and Electronics Engineers, Retrieved from the Internet: URL: https://www.google.de/?gws_rd=ssl#q=%22Audio+Video+Multicast+Protocol%22 [retrieved on Oct. 18, 2016].

* cited by examiner

TECHNIQUES FOR CONTENDING FOR ACCESS TO CHANNELS OF A SHARED RADIO FREQUENCY SPECTRUM BAND FOR BROADCAST/MULTICAST TRANSMISSIONS

CROSS REFERENCES

The present application for patent claims priority to U.S. Provisional Patent Application No. 62/217,607 by Zhang et al., entitled "TECHNIQUES FOR CONTENDING FOR ACCESS TO CHANNELS OF A SHARED RADIO FREQUENCY SPECTRUM BAND FOR BROADCAST/MULTICAST TRANSMISSIONS," filed Sep. 11, 2015, assigned to the assignee hereof, which is hereby incorporated by reference in its entirety.

BACKGROUND

Field of the Disclosure

The present disclosure, for example, relates to wireless communication systems, and more particularly to techniques for contending for access to channels of a shared radio frequency spectrum band for multipoint (e.g., broadcast/multicast) transmissions.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communications system may include a number of base stations, each simultaneously supporting communication for multiple communication devices, otherwise known as user equipment (UE) devices. A base station may communicate with UEs on downlink channels (e.g., for transmissions from a base station to a UE) and uplink channels (e.g., for transmissions from a UE to a base station).

Some modes of communication may enable communications between a base station and a UE over a shared radio frequency spectrum band, or over different radio frequency spectrum bands (e.g., a dedicated radio frequency spectrum band and a shared radio frequency spectrum band) of a cellular network. With increasing data traffic in cellular networks that use a dedicated (e.g., licensed) radio frequency spectrum band, offloading of at least some data traffic to a shared radio frequency spectrum band may provide a cellular operator with opportunities for enhanced data transmission capacity. A shared radio frequency spectrum band may also provide service in areas where access to a dedicated radio frequency spectrum band is unavailable. The types of transmissions that may be offloaded to (or transmitted on) a shared radio frequency spectrum band may include unicast transmissions, multipoint transmissions, broadcast transmissions, or multicast transmissions.

SUMMARY

The present disclosure, for example, relates to techniques for contending for access to channels of a shared radio frequency spectrum band for multipoint (e.g., broadcast/multicast) transmissions. In some examples, the multipoint transmissions may be or include broadcast transmissions, multicast transmissions, coordinated multipoint (CoMP) transmissions, or a combination thereof. Before communicating over a channel of a shared radio frequency spectrum band, a transmitting apparatus may perform a Listen-Before-Talk (LBT) procedure to gain access to the channel of the shared radio frequency spectrum band. Such an LBT procedure may include performing a clear channel assessment (CCA) procedure or extended CCA (eCCA) procedure, to determine whether a channel of the shared radio frequency spectrum band is available. When it is determined that the channel of the shared radio frequency spectrum band is available, a preamble including a channel reservation signal (e.g., a channel usage beacon signal (CUBS)) may be transmitted to reserve the channel. When it is determined that the channel is not available, a CCA procedure or eCCA procedure may be performed for the channel again at a later time.

A CCA procedure or eCCA procedure may be performed during a contention window. In some examples, the size of a contention window used to contend for access to a channel may be adjusted based on acknowledgements (ACKs) or non-acknowledgements (NAKs) of the packets of prior transmissions on the channel. However, in the case of multipoint transmissions (e.g., broadcast transmissions, multicast transmissions) over a shared radio frequency spectrum band, such ACKs or NAKs may not be transmitted or received. The present disclosure describes techniques for determining the size of a contention window in the absence of such packet-level ACKs or NAKs. The present disclosure also describes techniques for contending for access to the channels of a shared radio frequency spectrum band for parallel transmissions of multipoint (e.g., broadcast/multicast) transmissions and unicast transmissions.

In one example, a method for wireless communication is described. The method may include determining a contention window size for a first broadcast transmission or a first multicast transmission on at least one channel of a shared radio frequency spectrum band, where the first broadcast transmission or the first multicast transmission is targeted for a first plurality of UEs, and contending for access to the at least one channel of the shared radio frequency spectrum band for the first broadcast transmission or the first multicast transmission based at least in part on the determined contention window size. In some examples, the first multipoint transmission may be a coordinated multipoint transmission.

In some examples, the method may include determining a load on the at least one channel of the shared radio frequency spectrum band, and the contention window size may be determined based at least in part on the determined load. In some examples, the method may include multiplexing at least one unicast transmission with the first broadcast transmission or the first multicast transmission on the at least one channel of the shared radio frequency spectrum band, and identifying at least one of ACKs or NAKs received for the at least one unicast transmission. In these examples, the contention window size may be determined based at least in part on the ACKs or NAKs identified for the at least one unicast transmission.

In some examples, the method may include receiving, from each UE of a second plurality of UEs, a UE reception status of a second broadcast transmission or a second multicast transmission on the at least one channel of the shared radio frequency spectrum band, where the second broadcast transmission or the second multicast transmission is transmitted before the first broadcast transmission or the first multicast transmission and targeted for the second plurality of UEs. In these examples, the contention window size may be determined based at least in part on the UE reception statuses. In some examples, each UE reception status of the second broadcast transmission or the second multicast transmission may include a UE block error rate (BLER) for the second broadcast transmission or the second multicast transmission. In some examples, the method may include receiving identifications of broadcast services of interest from each UE of at least the second plurality of UEs, identifying the second plurality of UEs from the received identifications, and triggering the second plurality of UEs to transmit the UE reception statuses for the second broadcast transmission or the second multicast transmission. In some examples, the first plurality of UEs and the second plurality of UEs may include a same plurality of UEs or different pluralities of UEs.

In some examples, the at least one channel may include at least a first channel and a second channel, and the first broadcast transmission or the first multicast transmission may include a multiple channel broadcast transmission or a multiple channel multicast transmission over at least the first channel and the second channel. In some examples, the method may include identifying a plurality of ACKs or NAKs corresponding to at least one unicast transmission, where the at least one unicast transmission is transmitted on one or more of a plurality of channels of the shared radio frequency spectrum band, and where the plurality of channels include the at least one channel on which the first broadcast transmission or the first multicast transmission is transmitted. In these examples, the contention window size may be determined based at least in part on the plurality of ACKs or NAKs. In some examples, the first broadcast transmission or the first multicast transmission may include a multicast-broadcast single-frequency network (MBSFN) transmission, a single cell enhanced multimedia broadcast multicast services (eMBMS) transmission, a single cell point to multipoint (SC-PTM) transmission, or a combination thereof.

In one example, an apparatus for wireless communication is described. The apparatus may include means for determining a contention window size for a first broadcast transmission or a first multicast transmission on at least one channel of a shared radio frequency spectrum band, where the first broadcast transmission or the first multicast transmission is targeted for a first plurality of UEs, and means for contending for access to the at least one channel of the shared radio frequency spectrum band for the first broadcast transmission or the first multicast transmission based at least in part on the determined contention window size. In some examples, the first multipoint transmission may be a coordinated multipoint transmission.

In some examples, the apparatus may include means for determining a load on the at least one channel of the shared radio frequency spectrum band, and the contention window size may be determined based at least in part on the determined load. In some examples, the apparatus may include means for multiplexing at least one unicast transmission with the first broadcast transmission or the first multicast transmission on the at least one channel of the shared radio frequency spectrum band, and means for identifying at least one of ACKs or NAKs received for the at least one unicast transmission. In these examples, the contention window size may be determined based at least in part on the ACKs or NAKs identified for the at least one unicast transmission.

In some examples, the apparatus may include means for receiving, from each UE of a second plurality of UEs, a UE reception status of a second broadcast transmission or a second multicast transmission on the at least one channel of the shared radio frequency spectrum band, where the second broadcast transmission or the second multicast transmission is transmitted before the first broadcast transmission or the first multicast transmission and targeted for the second plurality of UEs. In these examples, the contention window size may be determined based at least in part on the UE reception statuses. In some examples, each UE reception status of the second broadcast transmission or the second multicast transmission may include a UE BLER for the second broadcast transmission or the second multicast transmission. In some examples, the apparatus may include means for receiving identifications of broadcast services of interest from each UE of at least the second plurality of UEs, means for identifying the second plurality of UEs from the received identifications, and means for triggering the second plurality of UEs to transmit the UE reception statuses for the second broadcast transmission or the second multicast transmission. In some examples, the first plurality of UEs and the second plurality of UEs may include a same plurality of UEs or different pluralities of UEs.

In some examples, the at least one channel may include at least a first channel and a second channel, and the first broadcast transmission or the first multicast transmission may include a multiple channel broadcast transmission or a multiple channel multicast transmission over at least the first channel and the second channel. In some examples, the apparatus may include means for identifying a plurality of ACKs or NAKs corresponding to at least one unicast transmission, where the at least one unicast transmission is transmitted on one or more of a plurality of channels of the shared radio frequency spectrum band, and where the plurality of channels include the at least one channel on which the first broadcast transmission or the first multicast transmission is transmitted. In these examples, the contention window size may be determined based at least in part on the plurality of ACKs or NAKs. In some examples, the first broadcast transmission or the first multicast transmission may include a MBSFN transmission, a single cell eMBMS transmission, a SC-PTM transmission, or a combination thereof.

In one example, another apparatus for wireless communication is described. The apparatus may include a processor, and memory in electronic communication with the processor. The processor and the memory may be configured to determine a contention window size for a first broadcast transmission or a first multicast transmission on at least one channel of a shared radio frequency spectrum band, where the first broadcast transmission or the first multicast transmission is targeted for a first plurality of UEs, and to contend for access to the at least one channel of the shared radio frequency spectrum band for the first broadcast transmission or the first multicast transmission based at least in part on the determined contention window size.

In some examples, the processor and the memory may be configured to determine a load on the at least one channel of the shared radio frequency spectrum band, and the contention window size may be determined based at least in part on the determined load. In some examples, the processor and the memory may be configured to multiplex at least one unicast transmission with the first broadcast transmission or the first multicast transmission on the at least one channel of the shared radio frequency spectrum band, and identify at least one of ACKs or NAKs received for the at least one unicast transmission. In these examples, the contention window size may be determined based at least in part on the ACKs or NAKs identified for the at least one unicast transmission. In some examples, the processor and the memory may be configured to receive from each UE of a second plurality of UEs, a UE reception status of a second broadcast transmission or a second multicast transmission on the at least one channel of the shared radio frequency spectrum band, where the second broadcast transmission or the second multicast transmission is transmitted before the first broadcast transmission or the first multicast transmission and targeted for the second plurality of UEs. In these examples, the contention window size may be determined based at least in part on the UE reception statuses.

In some examples, the at least one channel may include at least a first channel and a second channel, and the first broadcast transmission or the first multicast transmission may include a multiple channel broadcast transmission or a multiple channel multicast transmission over at least the first channel and the second channel. In some examples, the processor and the memory may be configured to identify a plurality of ACKs or NAKs corresponding to at least one unicast transmission, where the at least one unicast transmission is transmitted on one or more of a plurality of channels of the shared radio frequency spectrum band, the plurality of channels including the at least one channel on which the first broadcast transmission or the first multicast transmission is transmitted. In these examples, the contention window size may be determined based at least in part on the plurality of ACKs or NAKs. In some examples, the first broadcast transmission or the first multicast transmission may include a MBSFN transmission, a single cell eMBMS transmission, a SC-PTM transmission, or a combination thereof.

In some examples, the code may be executable by the processor to receive, from each UE of a second plurality of UEs, a UE reception status of a second broadcast transmission or a second multicast transmission on the at least one channel of the shared radio frequency spectrum band, where the second broadcast transmission or the second multicast transmission is transmitted before the first broadcast transmission or the first multicast transmission and targeted for the second plurality of UEs. In these examples, the contention window size may be determined based at least in part on the UE reception statuses. In some examples, the first broadcast transmission or the first multicast transmission may include a MBSFN transmission, a single cell eMBMS transmission, a SC-PTM transmission, or a combination thereof.

In one example, a method for wireless communication at a UE is described. The method may include receiving an indication to transmit a UE reception status of a broadcast transmission or a multicast transmission targeted for a plurality of UEs, receiving the broadcast transmission or the multicast transmission on at least one channel of a shared radio frequency spectrum band, and transmitting the UE reception status of the broadcast transmission or the multicast transmission based at least in part on the received indication.

In some examples, the UE reception status of the broadcast transmission or the multicast transmission may include a UE BLER for the broadcast transmission or the multicast transmission. In some examples, the at least one channel may include at least a first channel and a second channel, and the broadcast transmission or the multicast transmission may include a multiple channel broadcast transmission or a multiple channel multicast transmission over at least the first channel and the second channel. In some examples, the broadcast transmission or the multicast transmission may include a MBSFN transmission, a single cell eMBMS transmission, a SC-PTM transmission, or a combination thereof.

In one example, an apparatus for wireless communication at a UE is described. The apparatus may include means for receiving an indication to transmit a UE reception status of a broadcast transmission or a multicast transmission targeted for a plurality of UEs, means for receiving the broadcast transmission or the multicast transmission on at least one channel of a shared radio frequency spectrum band, and means for transmitting the UE reception status of the broadcast transmission or the multicast transmission based at least in part on the received indication.

In some examples, the UE reception status of the broadcast transmission or the multicast transmission may include a UE BLER for the broadcast transmission or the multicast transmission. In some examples, the at least one channel may include at least a first channel and a second channel, and the broadcast transmission or the multicast transmission may include a multiple channel broadcast transmission or a multiple channel multicast transmission over at least the first channel and the second channel. In some examples, the broadcast transmission or the multicast transmission may include a MBSFN transmission, a single cell eMBMS transmission, a SC-PTM transmission, or a combination thereof.

In one example, another apparatus for wireless communication at a UE is described. The apparatus may include a processor, and memory in electronic communication with the processor. The processor and the memory may be configured to receive an indication to transmit a UE reception status of a broadcast transmission or a multicast transmission targeted for a plurality of UEs, to receive the broadcast transmission or the multicast transmission on at least one channel of a shared radio frequency spectrum band, and to transmit the UE reception status of the broadcast transmission or the multicast transmission based at least in part on the received indication.

In some examples, the UE reception status of the broadcast transmission or the multicast transmission may include a UE BLER for the broadcast transmission or the multicast transmission. In some examples, the broadcast transmission or the multicast transmission may include a MBSFN transmission, a single cell eMBMS transmission, a SC-PTM transmission, or a combination thereof.

In one example, another method for wireless communication is described. The method may include identifying at least a first channel of a plurality of channels of a shared radio frequency spectrum band for transmitting a broadcast transmission or a multicast transmission targeted for a plurality of UEs, and a second channel of the plurality of channels for transmitting a first unicast transmission. The method may also include contending for access to at least the first channel based at least in part on a first timing of a broadcast resynchronization boundary, and contending for access to the second channel.

In some examples, the method may include winning contention for access to at least the first channel based at least in part on a second timing of the contending for access to the second channel, and transmitting the broadcast transmission or the multicast transmission at a broadcast transmission time upon the winning contention for access to at least the first channel, the broadcast transmission time occurring a predetermined time after the broadcast resynchronization boundary. In some examples, the contending for access to the second channel may be performed independently of the contending for access to at least the first channel.

In some examples, the method may include determining the contending for access to the second channel is successfully completed within a threshold time prior to the broadcast resynchronization boundary, and performing a CCA procedure for the second channel just prior to the broadcast resynchronization boundary. In some examples, the method may include winning contention for access to the second channel and transmitting the first unicast transmission based at least in part on successfully performing the CCA procedure, and transmitting the first unicast transmission at the broadcast transmission time upon successfully performing the CCA procedure.

In some examples, the method may include stopping a second unicast transmission on the second channel at a threshold time before the broadcast resynchronization boundary, and performing the contending for access to the second channel upon stopping the second unicast transmission. In some examples, the method may include determining the contending for access to at least the first channel is successfully completed before completing the contending for access to the second channel, and performing a CCA procedure for at least the first channel at a predetermined time between the timing of the broadcast resynchronization boundary and the broadcast transmission time. In some examples, the method may include winning contention for access to at least the first channel based at least in part on successfully performing the CCA procedure.

In one example, another apparatus for wireless communication is described. The apparatus may include means for identifying at least a first channel of a plurality of channels of a shared radio frequency spectrum band for transmitting a broadcast transmission or a multicast transmission targeted for a plurality of UEs, and a second channel of the plurality of channels for transmitting a first unicast transmission. The apparatus may also include means for contending for access to at least the first channel based at least in part on a first timing of a broadcast resynchronization boundary, and means for contending for access to the second channel.

In some examples, the apparatus may include means for winning contention for access to at least the first channel based at least in part on a second timing of the contending for access to the second channel, and means for transmitting the broadcast transmission or the multicast transmission at a broadcast transmission time upon winning contention for access to at least the first channel, the broadcast transmission time occurring a predetermined time after the broadcast resynchronization boundary. In some examples, the contending for access to the second channel may be performed independently of the contending for access to at least the first channel.

In some examples, the apparatus may include means for determining the contending for access to the second channel is successfully completed within a threshold time prior to the broadcast resynchronization boundary, and means for performing a CCA procedure for the second channel just prior to the broadcast resynchronization boundary. In some examples, the apparatus may include means for winning contention for access to the second channel and transmitting the first unicast transmission based at least in part on successfully performing the CCA procedure, and means for transmitting the first unicast transmission at the broadcast transmission time upon successfully performing the CCA procedure.

In some examples, the apparatus may include means for stopping a second unicast transmission on the second channel at a threshold time before the broadcast resynchronization boundary, and means for performing the contending for access to the second channel upon stopping the second unicast transmission. In some examples, the apparatus may include means for determining the contending for access to at least the first channel is successfully completed before completing the contending for access to the second channel, and means for performing a CCA procedure for at least the first channel at a predetermined time between the timing of the broadcast resynchronization boundary and the broadcast transmission time. In some examples, the apparatus may include means for winning contention for access to at least the first channel based at least in part on successfully performing the CCA procedure.

In one example, another apparatus for wireless communication is described. The apparatus may include a processor, and memory in electronic communication with the processor. The processor and the memory may be configured to identify at least a first channel of a plurality of channels of a shared radio frequency spectrum band for transmitting a broadcast transmission or a multicast transmission targeted for a plurality of UEs, and a second channel of the plurality of channels for transmitting a first unicast transmission. The processor and the memory may also be configured to contend for access to at least the first channel based at least in part on a first timing of a broadcast resynchronization boundary, and to contend for access to the second channel.

In some examples, the processor and the memory may be configured to win contention for access to at least the first channel based at least in part on a second timing of the contending for access to the second channel, and to transmit the broadcast transmission or the multicast transmission at a broadcast transmission time upon winning contention for access to at least the first channel, the broadcast transmission time occurring a predetermined time after the broadcast resynchronization boundary. In some examples, the processor and the memory may be configured to determine the contending for access to the second channel is successfully completed within a threshold time prior to the broadcast resynchronization boundary, and to perform a CCA procedure for the second channel just prior to the broadcast resynchronization boundary. In some examples, the processor and the memory may be configured to stop a second unicast transmission on the second channel at a threshold time before the broadcast resynchronization boundary; and to perform the contending for access to the second channel upon stopping the second unicast transmission. In some examples, the processor and the memory may be configured to determine the contending for access to at least the first channel is successfully completed before completing the contending for access to the second channel, and to perform a CCA procedure for at least the first channel at a predetermined time between the timing of the broadcast resynchronization boundary and the broadcast transmission time.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
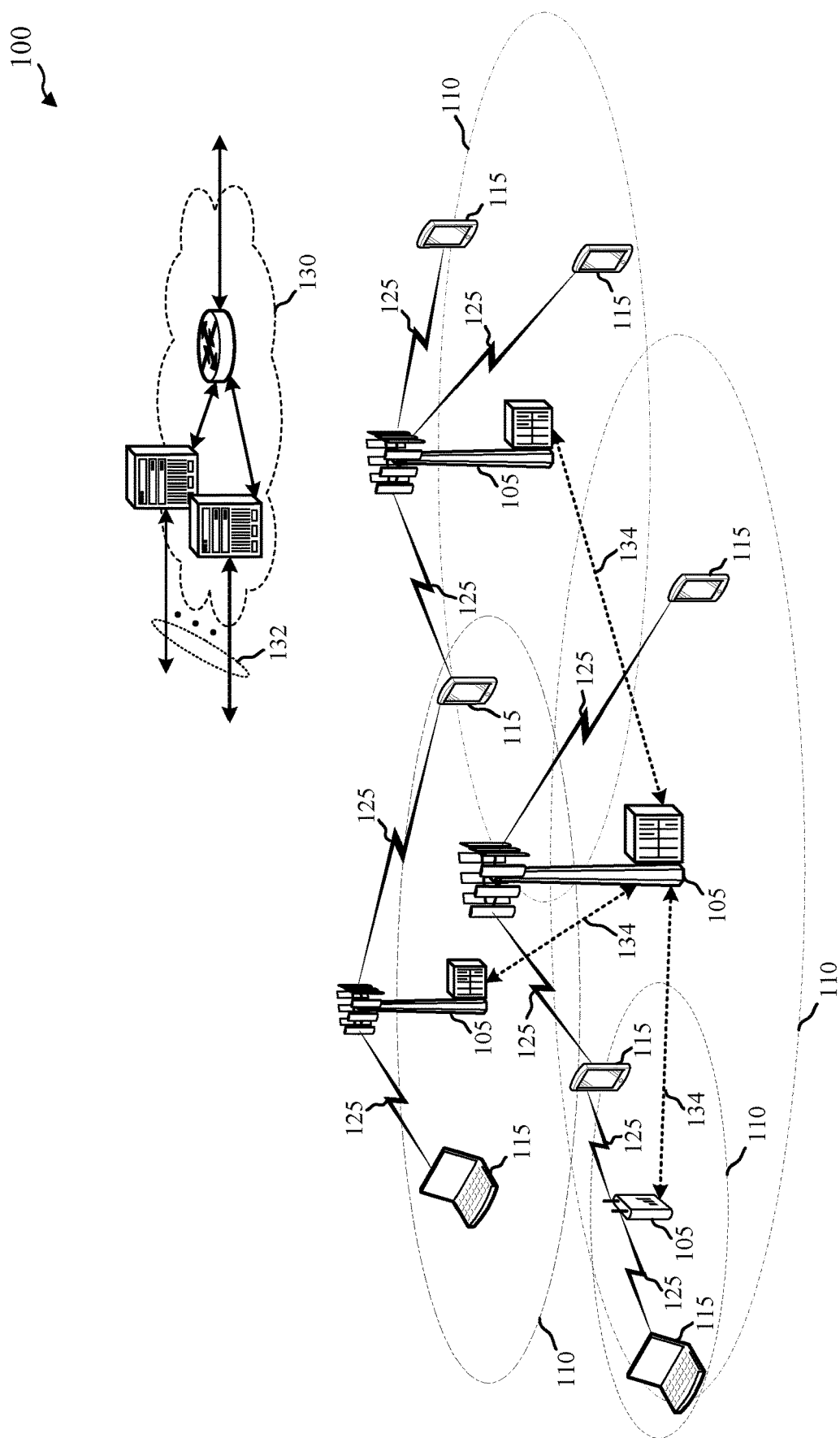
FIG. 1 illustrates an example of a wireless communication system, in accordance with various aspects of the present disclosure.

Techniques are described in which a shared radio frequency spectrum band is used for at least a portion of communications over a wireless communication system. In some examples, the shared radio frequency spectrum band may be used for Long Term Evolution (LTE) or LTE-Advanced (LTE-A) communications. The shared radio frequency spectrum band may be used in combination with, or independent from, a dedicated radio frequency spectrum band. The dedicated radio frequency spectrum band may include a radio frequency spectrum band for which transmitting apparatuses may not contend for access (e.g., a radio frequency spectrum band licensed to unique users for unique uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

In some examples, a shared radio frequency spectrum band may be used for multipoint transmissions (e.g., broadcast transmissions, multicast transmissions, CoMP transmissions), such as MBSFN transmissions, single cell eMBMS transmissions, SC-PTM transmissions, or a combination thereof. Single frequency network (SFN) transmissions using eMBMS (e.g., MBSFN transmissions) can achieve high broadcast capacity, with a plurality of nodes (e.g., base stations) transmitting the same content in a synchronous fashion. Single cell eMBMS transmissions or SC-PTM transmissions can also achieve high broadcast capacity, and can save a node from having to repeatedly transmit the same content to multiple UEs.

When multipoint transmissions (e.g., broadcast transmissions, multicast transmissions) are made in a shared radio frequency spectrum band by multiple nodes, the nodes making the transmissions may be synchronized (or resynchronized) by synchronizing the performance of LBT procedures at the nodes. After performing the LBT procedures, some of the nodes may gain access to one or more channels of the shared radio frequency spectrum band, and other nodes may not gain access to the shared radio frequency spectrum band (e.g., because of local interference). In some examples, the nodes may include small cells, and broadcast/multicast transmissions may be made using a normal cyclic prefix (CP). In the present disclosure, description relating to techniques and methods associated with at least one broadcast transmission or at least one multicast transmission may also relate to at least one multipoint transmission. In some examples, description relating to techniques and methods associated with at least one broadcast transmission or at least one multicast transmission may relate to at least one CoMP transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink transmissions, from a base station 105 to a UE 115, or uplink transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five component carriers (CCs) when operating in a carrier aggregation mode or dual-connectivity mode. One or more of the CCs may be configured as a DL CC, and one or more of the CCs may be configured as an UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a dedicated radio frequency spectrum band (e.g., a radio frequency spectrum band for which transmitting apparatuses may not contend for access because the radio frequency spectrum band is licensed to unique users for unique uses (e.g., a licensed radio frequency spectrum band usable for LTE/LTE-A communications)) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). Upon winning a contention for access to a channel of the shared radio frequency spectrum band, a transmitting apparatus (e.g., a base station 105 or UE 115) may transmit a preamble including one or more CUBS over the channel of the shared radio frequency spectrum band. The CUBS may reserve the channel of the shared radio frequency spectrum band by providing a detectable energy on the channel of the shared radio frequency spectrum band. The CUBS may also serve to identify the transmitting apparatus or serve to synchronize the transmitting apparatus and a receiving apparatus. In some examples, at least one of unicast transmissions, multipoint transmissions, CoMP transmissions, broadcast transmissions, or multicast transmissions may be transmitted over the shared radio frequency spectrum band (and also over the dedicated radio frequency spectrum band).

Figure 2:
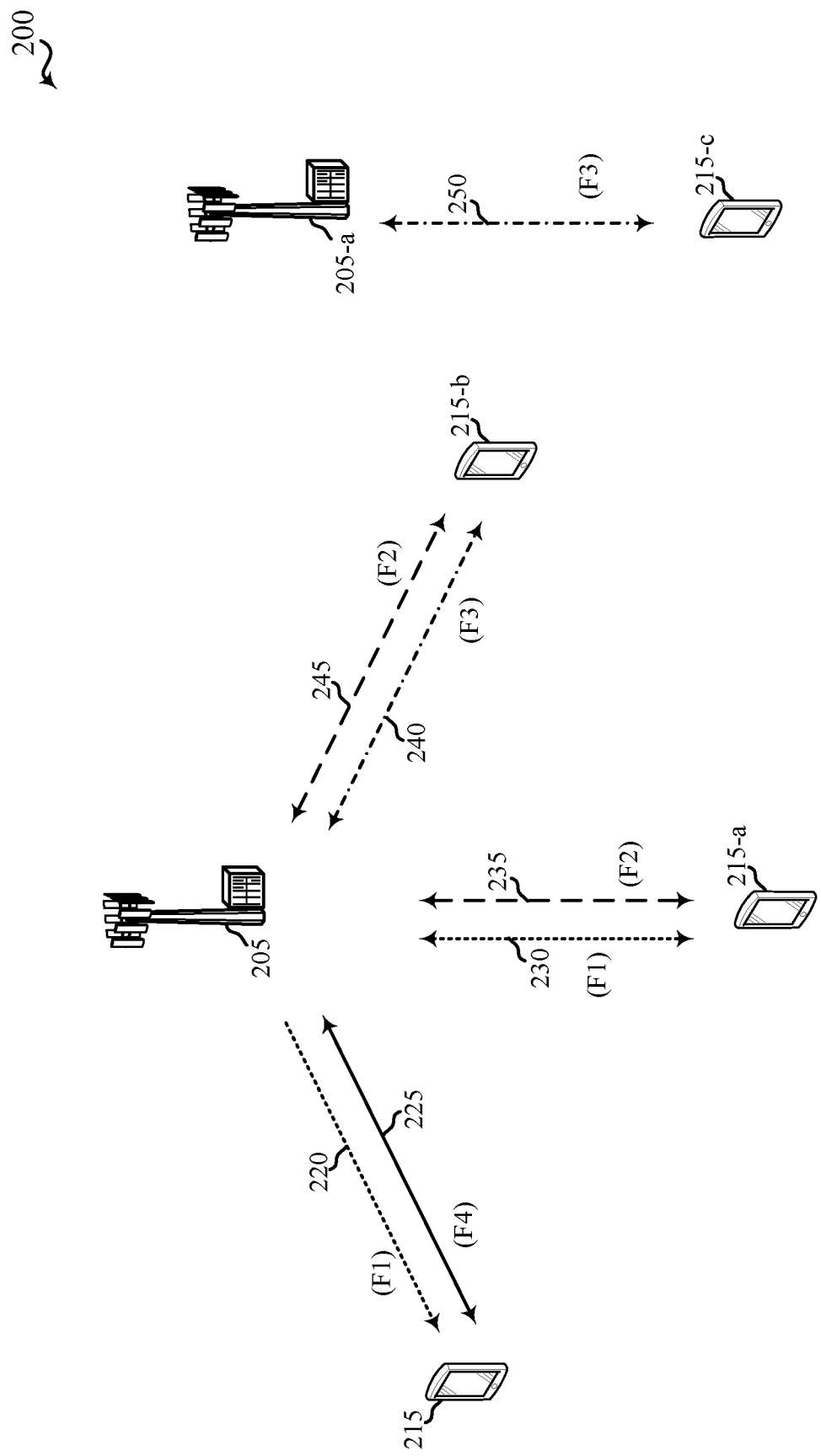
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (also referred to as a licensed assisted access mode), a carrier aggregation mode, and a standalone mode in which LTE/LTE-A is deployed using a shared radio frequency spectrum band. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first UE 215, a second UE 215-*a*, a third UE 215-*b*, and a fourth UE 215-*c* may be examples of aspects of one or more of the UEs 115 described with reference to FIG. 1.

In the example of a supplemental downlink mode (e.g., a licensed assisted access mode) in the wireless communication system 200, the first base station 205 may transmit OFDMA waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a dedicated radio frequency spectrum and needs to relieve some of the traffic or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, or resource block interleaved FDMA waveforms from the second UE 215-a using the second bidirectional link 230. The second bidirectional link 230 may be associated with the frequency F1 in the shared radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a dedicated radio frequency spectrum band. The second bidirectional link 230 may provide a downlink and uplink capacity offload for the first base station 205. Like the supplemental downlink mode (e.g., licensed assisted access mode) described above, this scenario may occur with any service provider (e.g., MNO) that uses a dedicated radio frequency spectrum and needs to relieve some of the traffic or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, or resource block interleaved waveforms from the third UE 215-b using the fourth bidirectional link 240. The fourth bidirectional link 240 may be associated with a frequency F3 in the shared radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the dedicated radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a dedicated radio frequency spectrum band and use a shared radio frequency spectrum band for capacity offload.

As described above, one type of service provider that may benefit from the capacity offload offered by using LTE/LTE-A in a shared radio frequency spectrum band is a traditional MNO having access rights to an LTE/LTE-A dedicated radio frequency spectrum band. For these service providers, an operational example may include a bootstrapped mode (e.g., supplemental downlink, carrier aggregation) that uses the LTE/LTE-A PCC on the dedicated radio frequency spectrum band and at least one secondary component carrier (SCC) on the shared radio frequency spectrum band.

In the carrier aggregation mode, data and control may, for example, be communicated in the dedicated radio frequency spectrum band (e.g., via first bidirectional link 225, third bidirectional link 235, and fifth bidirectional link 245) while data may, for example, be communicated in the shared radio frequency spectrum band (e.g., via second bidirectional link 230 and fourth bidirectional link 240). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, or resource block interleaved FDMA waveforms from the fourth UE 215-c using the bidirectional link 250. The bidirectional link 250 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-a described with reference to FIG. 1 or 2, or one of the UEs 115, 215, 215-a, 215-b, or 215-c described with reference to FIG. 1 or 2, may use a gating interval to gain access to a channel of a shared radio frequency spectrum band (e.g., to a physical channel of the shared radio frequency spectrum band). In some examples, the gating interval may be synchronous and periodic. For example, the periodic gating interval may be synchronized with at least one boundary of an LTE/LTE-A radio interval. In other examples, the gating interval may be asynchronous. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a CCA procedure or an eCCA procedure. The outcome of the CCA procedure or eCCA procedure may indicate to the transmitting apparatus whether a channel of a shared radio frequency spectrum band is available or in use for the gating interval (e.g., an LBT radio frame or transmission burst). When a CCA procedure or eCCA procedure indicates the channel is available for a corresponding LBT radio frame or transmission burst (e.g., "clear" for use), the transmitting apparatus may reserve or use the channel of the shared radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

After transmitting a unicast transmission on a channel of a shared radio frequency spectrum band, a transmitting apparatus may receive ACKs or NAKs corresponding to the various packets of the unicast transmission, and may adjust a contention window size for the channel (e.g., the number of CCA procedures, or length(s) of one or more CCA procedures, for which the transmitting apparatus needs to determine the channel is "clear" for use before winning contention for access to the channel). In some examples, the contention window size may be increased upon receiving one or more NAKs for a unicast transmission, or more than a threshold number of NAKs for the unicast transmission. In some examples, the contention window size may remain the same or be decreased upon receiving ACKs for all of a unicast transmission's packets.

It would be useful if a transmitting apparatus could adjust the contention window size for a channel after transmitting a broadcast transmission or a multicast transmission. However, ACKs or NAKs are not currently transmitted for broadcast transmissions or multicast transmissions, and information such as a minimization drive test (MDT) report or reception report transmitted for a broadcast transmission may not be transmitted fast enough for meaningful contention window size adjustments (e.g., because such reports are transmitted on an application layer). Techniques described in the present disclosure may be used to adjust a contention window size for a channel, following transmission of a broadcast transmission or a multicast transmission (e.g., a multipoint transmission) on the channel, based on information other than ACKs or NAKs corresponding to the packets of the broadcast transmission or the multicast transmission.

Figure 3:
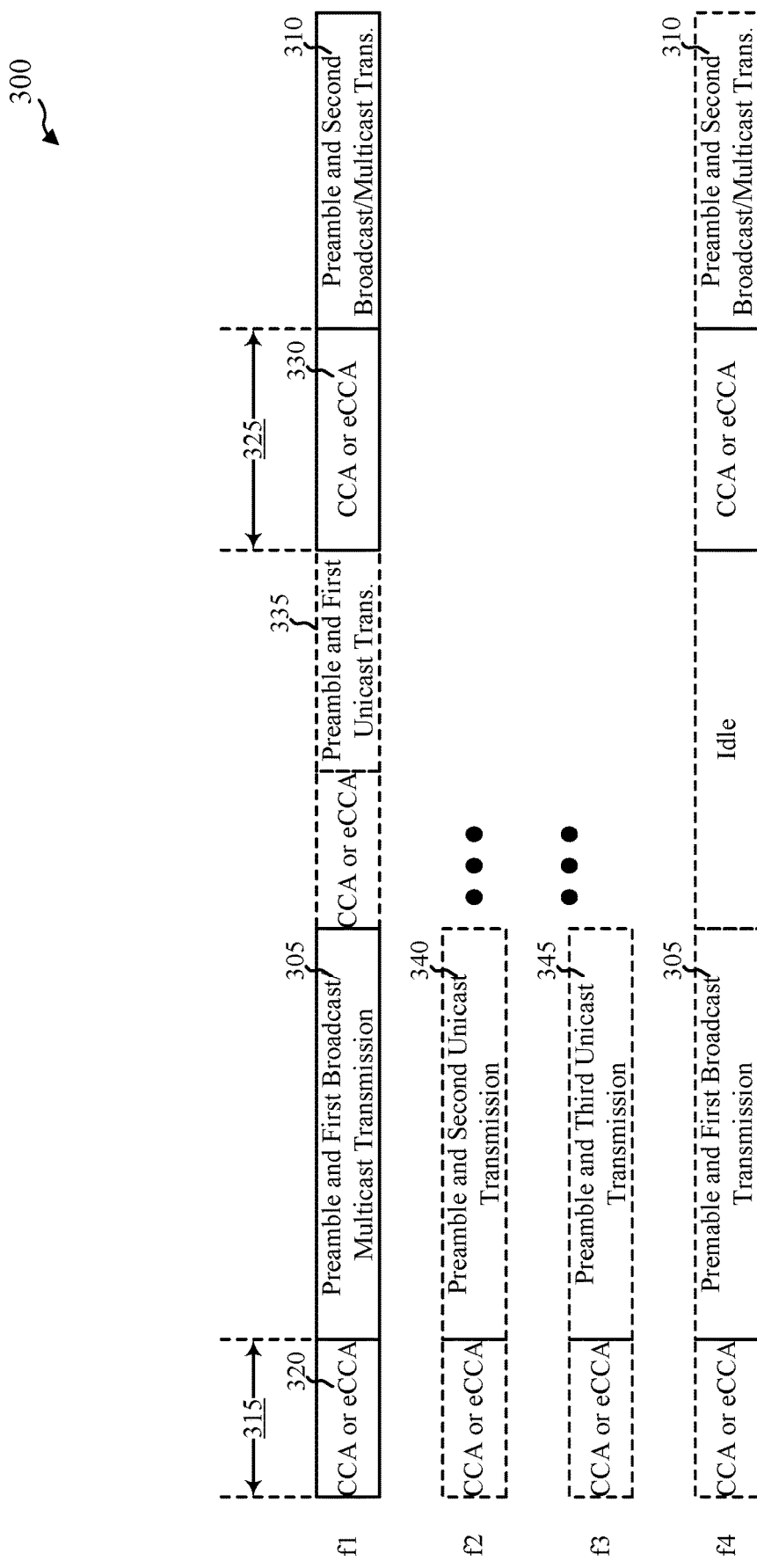
FIG. 3 shows a timeline of contending for access to at least one channel of a shared radio frequency spectrum band, for the purpose of transmitting a first multipoint transmission (e.g., first broadcast transmission or first multicast transmission) and a second multipoint transmission (e.g., second broadcast transmission or second multicast transmission), in accordance with various aspects of the present disclosure.

FIG. 3 shows a timeline 300 of contending for access to at least one channel of a shared radio frequency spectrum band, for the purpose of transmitting a first multipoint transmission (e.g., first broadcast transmission or first multicast transmission 305) and a second multipoint transmission (e.g., second broadcast transmission or second multicast transmission 310), in accordance with various aspects of the present disclosure. In some examples, the first broadcast transmission or first multicast transmission 305 may be an example of a multipoint transmission, such as a CoMP transmission. In some examples, the second broadcast transmission or second multicast transmission 310 may be an example of a multipoint transmission, such as a CoMP transmission. In some examples, the contention for access to the at least one channel of the shared radio frequency spectrum band may be performed by a base station. The base station may be an example of aspects of one or more of the base stations 105, 205, or 205-a described with reference to FIG. 1 or 2. In some examples, the first broadcast transmission, the first multicast transmission, the second broadcast transmission, or the second multicast transmission may include a MBSFN transmission, a single cell eMBMS transmission, a SC-PTM transmission, or a combination thereof.

As shown in FIG. 3, a base station may contend for access to at least a first channel (f1) of the shared radio frequency spectrum band for transmitting the first broadcast transmission or first multicast transmission 305. Contention for access to at least the first channel for transmitting the first broadcast transmission or first multicast transmission 305 may be performed during a first contention window 315 having a first contention window size. In some examples, the base station may contend for access to the first channel by performing a first CCA procedure or first eCCA procedure 320 during the first contention window 315.

Upon winning contention for access to at least the first channel of the shared radio frequency spectrum band, the base station may transmit the first broadcast transmission or first multicast transmission 305 to a first set of UEs. Transmission of the first broadcast transmission or first multicast transmission 305 may be preceded by transmission of a preamble. Following transmission of the first broadcast transmission or first multicast transmission 305, the base station may contend for access to at least the first channel for transmitting the second broadcast transmission or second multicast transmission 310. Contention for access to at least the first channel for transmitting the second broadcast transmission or second multicast transmission 310 may be performed during a second contention window 325 having a second contention window size. The second window contention size may be the same or different compared to the first contention window size. In some examples, the base station may contend for access to the second channel by performing a second CCA procedure or second eCCA procedure 330 during the first contention window 315.

Upon winning contention for access to at least the first channel of the shared radio frequency spectrum band, the base station may transmit the second broadcast transmission or second multicast transmission 310 to a second set of UEs. Transmission of the second broadcast transmission or second multicast transmission 310 may be preceded by transmission of a preamble. In some examples, the second set of UEs may differ from the first set of UEs. In some examples, the second set of UEs may include the same UEs as the first set of UEs.

In some examples, the first broadcast transmission or first multicast transmission 305 and the second broadcast transmission or second multicast transmission 310 may be multiplexed with one or more unicast transmissions, such as an optional first unicast transmission 335. In some examples, the first broadcast transmission or first multicast transmission 305 or the second broadcast transmission or second multicast transmission 310 may be transmitted in parallel with one or more unicast transmissions on other channels (e.g., a second unicast transmission 340 on a second channel of the shared radio frequency spectrum band, or a third unicast transmission 345 on a third channel (f3) of the shared radio frequency spectrum band). In some examples, the first broadcast transmission or first multicast transmission 305 or the second broadcast transmission or second multicast transmission 310 may be transmitted on a single channel (e.g., the first channel (f1)). In some examples, the first broadcast transmission or first multicast transmission 305 or the second broadcast transmission or second multicast transmission 310 may be transmitted on multiple channels (e.g., the first channel (f1) and a fourth channel (f4)). In some examples, the same broadcast transmission or multicast transmission content may be transmitted on multiple channels to mitigate variable broadcast transmission gains across the multiple channels and reduce a signal-to-noise ratio (SNR) variation across the multiple channels (which SNR variation may result in contention for access to one or more of the channels not being won, or one or more of the channels being associated with bursty interference).

In some examples, the base station may determine a load on the at least one channel on which the first broadcast transmission or first multicast transmission 305 is transmitted, and determine the size of the first contention window 315 and/or the second contention window 325 based on the determined load. In some examples, the load may be determined based at least in part on an energy level on the first channel or fourth channel when the base station is not transmitting on the first channel or fourth channel.

In some examples, the base station may identify reception statuses (e.g., at least one of ACKs or NAKs) received for at least one unicast transmission (e.g., the first unicast transmission 335) multiplexed with the first broadcast transmission or first multicast transmission 305 or the second broadcast transmission or second multicast transmission 310, and may determine the size of a contention window (e.g., the second contention window 325) based at least in part on the reception statuses (e.g., the ACKs or NAKs) received for the at least one unicast transmission.

In some examples, the base station may receive identifications of broadcast services or multicast services of interest from each UE of at least a first plurality of UEs, and may identify, from the received identifications, a plurality of UEs interested in a type of service associated with the first broadcast transmission or first multicast transmission 305 (e.g., the first plurality of UEs). The base station may trigger the first plurality of UEs to transmit UE reception statuses for the first broadcast transmission or first multicast transmission 305, and may receive a UE reception status of the first broadcast transmission or first multicast transmission 305 from each UE of the first plurality of UEs. The base station may then determine a size of the second contention window 325 based at least in part on the UE reception statuses of the first broadcast transmission or first multicast transmission 305. In some examples, a UE reception status of the first broadcast transmission or first multicast transmission 305 may include a UE block error rate (BLER) for the first broadcast transmission or first multicast transmission 305 (or other aggregate indicator of how many packets of the first broadcast transmission or first multicast transmission 305 were received). In some examples, a UE reception status of the first broadcast transmission or first multicast transmission 305 may be received at the base station on an enhanced physical uplink control channel (ePUCCH), with each UE in the first plurality of UEs being assigned at least one resource of the ePUCCH. In other examples, a UE reception status of the first broadcast transmission or first multicast transmission 305 may be received at the base station on an enhanced physical uplink shared channel (ePUSCH), with each UE in the first plurality of UEs being assigned at least one resource of the ePUSCH.

In some examples, broadcast transmissions or multicast transmissions may be sent in separate LBT bursts from unicast transmissions. In these examples, the base station can determine contention window sizes for the LBT bursts including the broadcast transmissions or the multicast transmissions separately from the contention window sizes for the LBT bursts including the unicast transmissions. In some examples, the base station can determine a contention window size based on a current LBT burst and use the adjusted contention window size for the next LBT burst, irrespective of whether the next LBT burst is used for broadcast transmissions, multicast transmissions, or unicast transmissions.

When the first broadcast transmission or first multicast transmission 305 includes a multiple channel broadcast transmission or multiple channel multicast transmission, and in some examples, the base station may receive a plurality of ACKs or NAKs corresponding to at least one unicast transmission transmitted on one or more of a plurality of channels of the shared radio frequency spectrum band (e.g., ACKs or NAKs corresponding to the second unicast transmission 340 and the third unicast transmission 345). In these examples, the base station may determine the size of the second contention window 325 based at least in part on the plurality of ACKs or NAKs corresponding to the at least one unicast transmission.

When the first broadcast transmission or first multicast transmission 305 is a multiple channel broadcast transmission or multiple channel multicast transmission, or when the base station transmits at least one unicast transmission in parallel with the first broadcast transmission or first multicast transmission 305, a size of the first contention window 315 or the second contention window 325 may be determined for all of the broadcast/multicast channels, or all of the channels over which the base station transmits.

When an apparatus (e.g., a base station) contends for access to a first channel of a shared radio frequency spectrum band for the purpose of transmitting a broadcast transmission or multicast transmission, contention for access to the first channel may be won or lost based at least in part on the apparatus' use of a second channel of the shared radio frequency spectrum band. In some examples, the second channel may be used to transmit one or more unicast transmissions. In some examples, the apparatus may use the first channel and the second channel (and contend for access to the first channel and the second channel) independently (e.g., asynchronously). In these examples, a CCA procedure or an eCCA procedure may be performed for each of the first channel and the second channel independently. In some examples, the apparatus may apply a broadcast resynchronization procedure used to contend for access to the first channel to the second channel (or to all channels), to synchronize contention for access to the first channel and the second channel. In this manner, a transmission on the second channel may be synchronized with a transmission of the broadcast transmission or the multicast transmission on the first channel, and the transmission on the second channel will not block contention for access to the first channel or transmission of the broadcast transmission or the multicast transmission. In some examples, the apparatus may defer the broadcast transmission or the multicast transmission for a period of time. In this manner, the likelihood that contention for access to the second channel will be successfully completed may be increased, and the likelihood that the broadcast transmission or the multicast transmission will block a transmission on the second channel will be decreased.

When the apparatus uses the first channel and the second channel independently, and contends for access to the first channel and the second channel independently, the use of one of the channels (e.g., an in-process transmission on the second channel) may block access to the other channel (e.g., use of the first channel may cause the apparatus to not win contention for access to the second channel). Winning contention for access to one of the channels (e.g., the second channel) before the other channel (e.g., the first channel) may also block access to the other channel (e.g., the first channel).

When the apparatus applies a broadcast resynchronization procedure used to contend for access to the first channel to the second channel (or to all channels), contention for access to the first channel and the second channel may be synchronized. Examples showing how a broadcast resynchronization procedure used to contend for access to a first channel may be applied to a second channel are shown with reference to FIG. 4 or 5.

Figure 4:
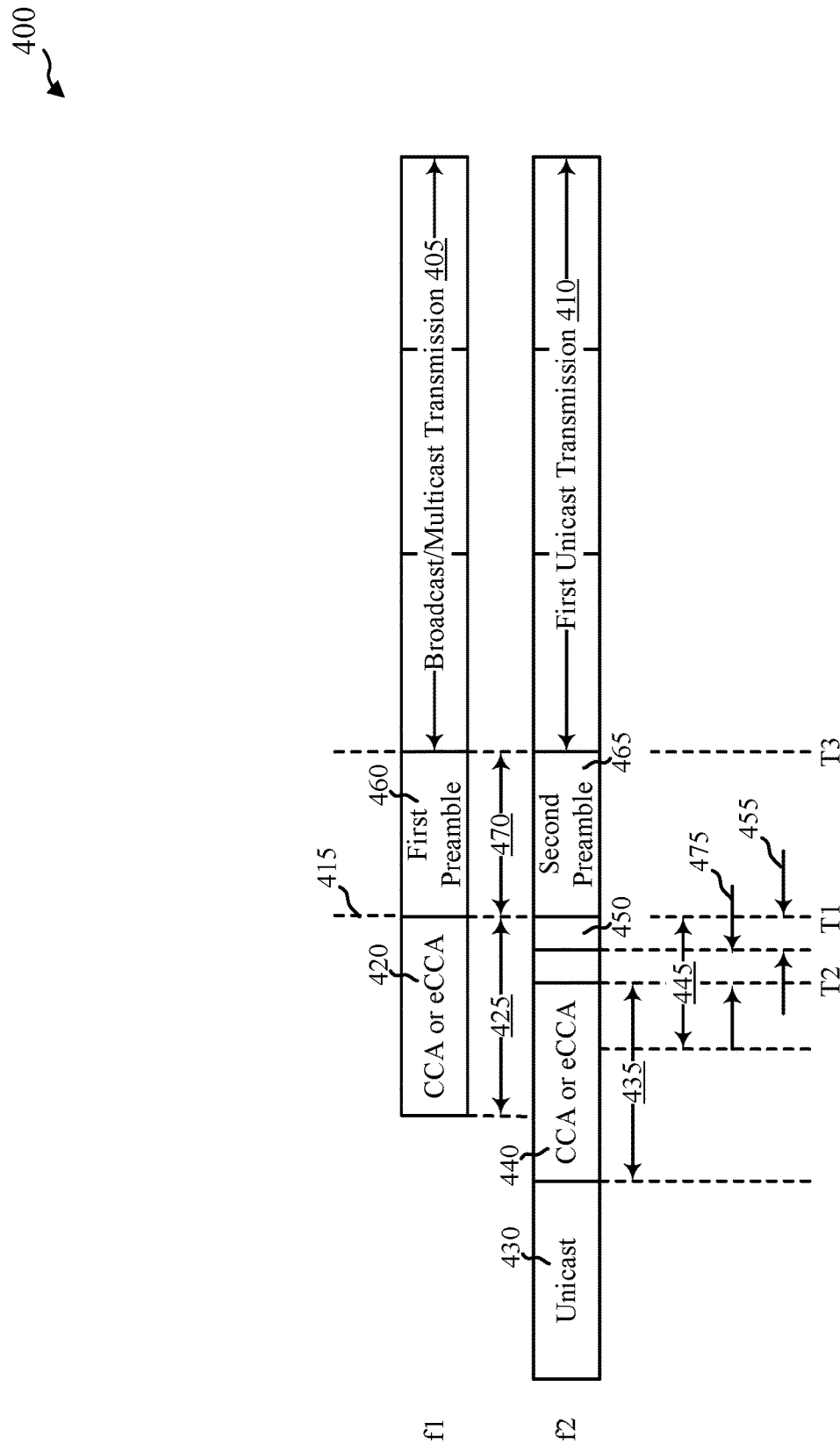
FIG. 4 shows a timeline of contending for access to a first channel of a shared radio frequency spectrum band, for the purpose of transmitting a multipoint transmission (e.g., broadcast transmission or multicast transmission), and contending for access to a second channel of the shared radio frequency spectrum band, for the purpose of transmitting a first unicast transmission, in accordance with various aspects of the present disclosure.

FIG. 4 shows a timeline 400 of contending for access to a first channel of a shared radio frequency spectrum band, for the purpose of transmitting a multipoint transmission (e.g., broadcast transmission or multicast transmission 405), and contending for access to a second channel of the shared radio frequency spectrum band, for the purpose of transmitting a first unicast transmission 410, in accordance with various aspects of the present disclosure. In some examples, the broadcast transmission or multicast transmission 405 may be an example of a multipoint transmission, such as a CoMP transmission. In some examples, the contentions for access to the first channel and the second channel may be performed by a base station. The base station may be an example of aspects of one or more of the base stations 105, 205, or 205-a described with reference to FIG. 1 or 2. In some examples, the broadcast transmission or multicast transmission may include a MBSFN transmission, a single cell eMBMS transmission, a SC-PTM transmission, or a combination thereof.

As shown in FIG. 4, a base station may contend for access to the first channel (f1) based at least in part on a timing T1 of a broadcast resynchronization boundary 415. In some examples, the base station may contend for access to the first channel by performing a first CCA procedure or first eCCA procedure 420 during a first time period 425 preceding the broadcast resynchronization boundary 415.

By way of example, the base station is shown to finish a second unicast transmission 430 on the second channel (f2) and contend for access to the second channel for the first unicast transmission 410 during a second time period 435. In some examples, the base station may contend for access to the second channel by performing a second CCA procedure or second eCCA procedure 440 during the second time period 435.

As shown, the base station may win contention for access to the second channel at a time T2 preceding the timing T1 of the broadcast resynchronization boundary 415. When the time T2 is within a threshold time period 445 before the timing T1 of the broadcast resynchronization boundary 415, the base station may defer commencement of the first unicast transmission 410 (e.g., remain idle on the second channel for an idle period 475) and perform a third CCA procedure 450 for the second channel during a third time period 455, with the third time period 455 being just prior to the timing T1 of the broadcast resynchronization boundary 415. When the first CCA procedure or first eCCA procedure 420 performed for the first channel during the first time period 425 and the third CCA procedure 450 performed for the second channel during the third time period 455 are both successful, the base station may transmit a first preamble 460 on the first channel and a second preamble 465 on the second channel during a fourth time period 470, and begin transmission of the broadcast transmission or multicast transmission 405 on the first channel and the first unicast transmission 410 on the second channel at a broadcast transmission time T3. The broadcast transmission time T3 may occur a predetermined time after the timing T1 of the broadcast resynchronization boundary 415. When the first CCA procedure or first eCCA procedure 420 performed for the first channel during the first time period 425 is not successful, but the third CCA procedure 450 performed for the second channel during the third time period 455 is successful, the base station may transmit the second preamble 465 on the second channel during the fourth time period 470, and transmit the first unicast transmission 410 on the second channel beginning at the broadcast transmission time T3. When the first CCA procedure or first eCCA procedure 420 performed for the first channel during the first time period 425 is successful, but the third CCA procedure 450 performed for the second channel during the third time period 455 is not successful, the base station may transmit the first preamble 460 on the first channel during the fourth time period 470, and transmit the broadcast transmission or multicast transmission 405 on the first channel beginning at the broadcast transmission time T3.

Figure 5:
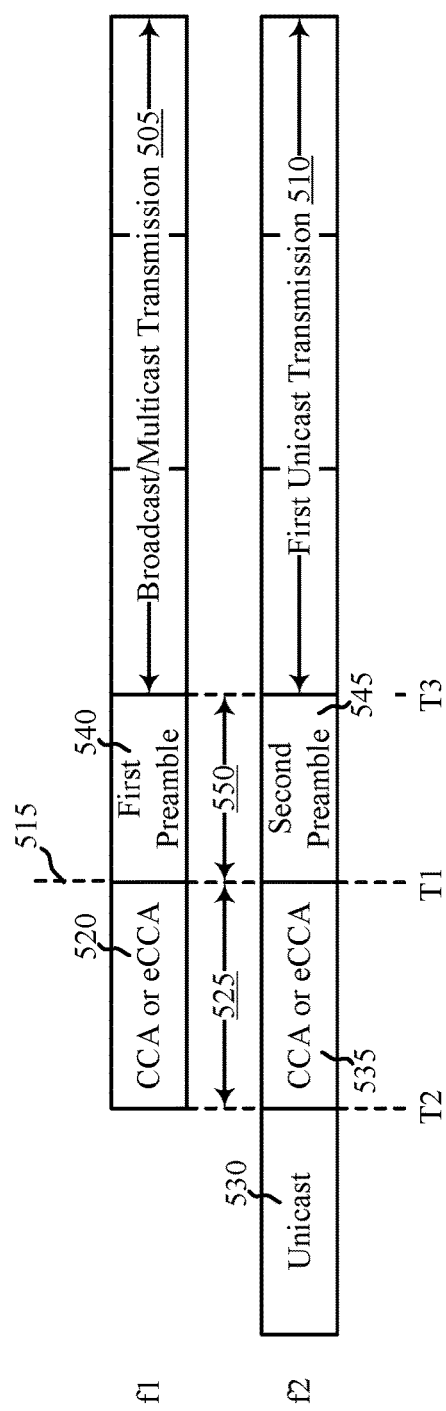
FIG. 5 shows a timeline of contending for access to a first channel of a shared radio frequency spectrum band, for the purpose of transmitting a multipoint transmission (e.g., broadcast transmission or multicast transmission), and contending for access to a second channel of the shared radio frequency spectrum band, for the purpose of transmitting a first unicast transmission, in accordance with various aspects of the present disclosure.

FIG. 5 shows a timeline 500 of contending for access to a first channel of a shared radio frequency spectrum band, for the purpose of transmitting a multipoint transmission (e.g., a broadcast transmission or multicast transmission 505), and contending for access to a second channel of the shared radio frequency spectrum band, for the purpose of transmitting a first unicast transmission 510, in accordance with various aspects of the present disclosure. In some examples, the broadcast transmission or multicast transmission 505 may be an example of a multipoint transmission, such as a CoMP transmission. In some examples, the contentions for access to the first channel and the second channel may be performed by a base station. The base station may be an example of aspects of one or more of the base stations 105, 205, or 205-a described with reference to FIG. 1 or 2. In some examples, the broadcast transmission or multicast transmission 505 may include a MBSFN transmission, a single cell eMBMS transmission, a SC-PTM transmission, or a combination thereof.

As shown in FIG. 5, a base station may contend for access to the first channel (f1) based at least in part on a timing T1 of a broadcast resynchronization boundary 515. In some examples, the base station may contend for access to the first channel by performing a first CCA procedure or first eCCA procedure 520 during a first time period 525 preceding the broadcast resynchronization boundary 515.

By way of example, the base station is shown to stop a second unicast transmission 530 on the second channel (f2) at a time T2, and contend for access to the second channel for the first unicast transmission 510 during the first time period 525. In some examples, the base station may contend for access to the second channel by performing a second CCA procedure or second eCCA procedure 535 during the first time period 525.

As shown, the base station may win contention for access to the first channel and the second channel at the broadcast resynchronization boundary 515. When the first CCA procedure or first eCCA procedure 520 performed for the first channel during the first time period 525 and the second CCA procedure or second eCCA procedure 535 performed for the second channel during the first time period 525 are both successful, the base station may transmit a first preamble 540 on the first channel and a second preamble 545 on the second channel during a second time period 550, and begin transmission of the broadcast transmission or multicast transmission 505 on the first channel and the first unicast transmission 510 on the second channel at a broadcast transmission time T3. The broadcast transmission time T3 may occur a predetermined time after the timing T1 of the broadcast resynchronization boundary 515. When the first CCA procedure or first eCCA procedure 520 performed for the first channel during the first time period 525 is not successful, but the second CCA procedure or second eCCA procedure 535 performed for the second channel during the first time period 525 is successful, the base station may transmit the second preamble 545 on the second channel during the second time period 550, and transmit the second unicast transmission 530 on the second channel beginning at the broadcast transmission time T3. When the first CCA procedure or first eCCA procedure 520 performed for the first channel during the first time period 525 is successful, but the second CCA procedure or second eCCA procedure 535 performed for the second channel during the first time period 525 is not successful, the base station may transmit the first preamble 540 on the first channel during the second time period 550, and transmit the broadcast transmission or multicast transmission 505 on the first channel beginning at the broadcast transmission time T3.

As previously described, when an apparatus defers a broadcast transmission or multicast transmission on a first channel for a period of time, the likelihood that contention for access to a second channel will be successfully completed before commencement of the broadcast transmission or multicast transmission may be increased, and the likelihood that transmission of the broadcast transmission or multicast transmission will block a transmission on the second channel will be decreased. An example showing how a broadcast transmission or multicast transmission may be deferred is shown with reference to FIG. 6.

Figure 6:
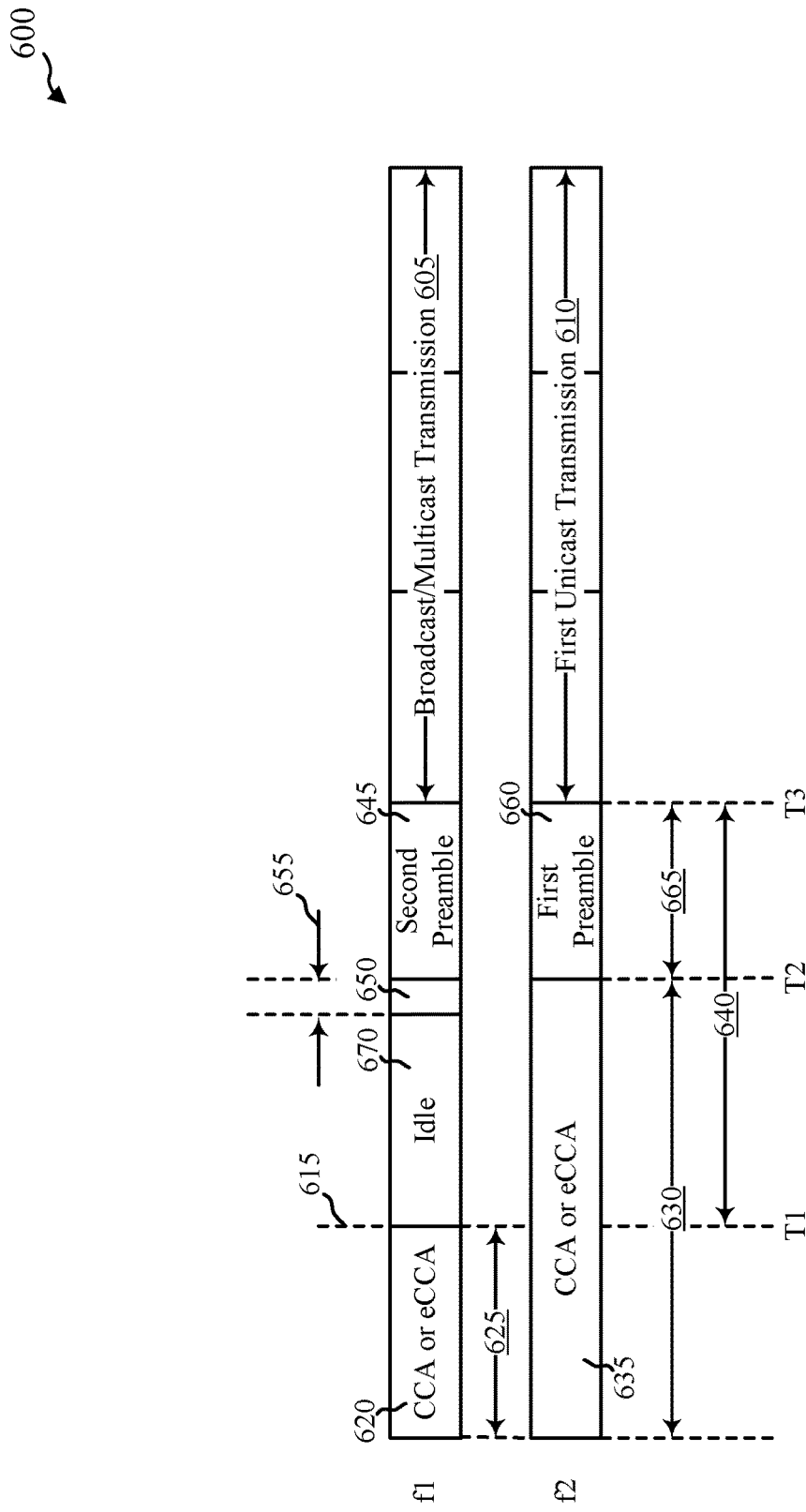
FIG. 6 shows a timeline of contending for access to a first channel of a shared radio frequency spectrum band, for the purpose of transmitting a multipoint transmission (e.g., broadcast transmission or multicast transmission), and contending for access to a second channel of the shared radio frequency spectrum band, for the purpose of transmitting a first unicast transmission, in accordance with various aspects of the present disclosure.

FIG. 6 shows a timeline 600 of contending for access to a first channel of a shared radio frequency spectrum band, for the purpose of transmitting a multipoint transmission (e.g., broadcast transmission or multicast transmission 605), and contending for access to a second channel of the shared radio frequency spectrum band, for the purpose of transmitting a first unicast transmission 610, in accordance with various aspects of the present disclosure. In some examples, the broadcast transmission or multicast transmission 605 may be an example of a multipoint transmission, such as a CoMP transmission. In some examples, the contentions for access to the first channel and the second channel may be performed by a base station. The base station may be an example of aspects of one or more of the base stations 105, 205, or 205-a described with reference to FIG. 1 or 2. In some examples, the broadcast transmission or multicast transmission may include a MBSFN transmission, a single cell eMBMS transmission, a SC-PTM transmission, or a combination thereof.

As shown in FIG. 6, a base station may contend for access to the first channel (f1) based at least in part on a timing T1 of a broadcast resynchronization boundary 615. In some examples, the base station may contend for access to the first channel by performing a first CCA procedure or first eCCA procedure 620 during a first time period 625 preceding the broadcast resynchronization boundary 615.

By way of example, the base station is shown to contend for access to the second channel (f2) for the first unicast transmission 610 during a second time period 630. In some examples, the base station may contend for access to the second channel by performing a second CCA procedure or second eCCA procedure 635 during the second time period 630.

As shown, the base station may win contention for access to the first channel at the timing T1 of the broadcast resynchronization boundary 615, but the base station may not win contention for access to the second channel until a time T2. When a third time period 640 between the timing T1 of the broadcast resynchronization boundary 615 and a broadcast transmission time T3 is greater than a length of a first preamble 645 to be transmitted for the broadcast transmission or multicast transmission 605, the base station may defer commencement of the broadcast transmission or multicast transmission 605 (e.g., remain idle on the first channel for an idle period 670) and perform a third CCA procedure 650 for the first channel during a fourth time period 655. The broadcast transmission time T3 may occur a predetermined time after the timing T1 of the broadcast resynchronization boundary 615, and the fourth time period 655 may begin at a predetermined time between the timing T1 of the broadcast resynchronization boundary 615 and the broadcast transmission time T3. The timing of the fourth time period 655 may enable performance of the third CCA procedure 650 just before transmitting the first preamble 645 on the first channel.

When the third CCA procedure 650 performed for the first channel during the fourth time period 655 and the second CCA procedure or second eCCA procedure 635 performed for the second channel during the second time period 630 are both successful, the base station may transmit the first preamble 645 on the first channel and a second preamble 660 on the second channel during a fifth time period 665, and begin transmission of the broadcast transmission or multicast transmission 605 on the first channel and the first unicast transmission 610 on the second channel at the broadcast transmission time T3. When the third CCA procedure 650 performed for the first channel during the fourth time period 655 is not successful, but the second CCA procedure or second eCCA procedure 635 performed for the second channel during the second time period 630 is successful, the base station may transmit the second preamble 660 on the second channel during the fifth time period 665, and transmit the first unicast transmission 610 on the second channel beginning at the broadcast transmission time T3. When the third CCA procedure 650 performed for the first channel during the fourth time period 655 is successful, but the second CCA procedure or second eCCA procedure 635 performed for the second channel during the second time period 630 is not successful (or has yet to be completed), the base station may transmit the first preamble 645 on the first channel during the fifth time period 665, and transmit the broadcast transmission or multicast transmission 605 on the first channel beginning at the broadcast transmission time T3.

The idle period 670 between the broadcast resynchronization boundary 615 and the fourth time period 655 may enable another apparatus gaining access to the first channel, thereby causing the base station to lose access to the first channel and be unable to transmit the broadcast transmission or multicast transmission 605. However, when the broadcast transmission or multicast transmission 605 is an MBSFN transmission that is also transmitted by a neighboring base station (or base stations), an inability to transmit the broadcast transmission or multicast transmission 605 from one base station may have a non-significant effect on the UEs that would have otherwise received the broadcast transmission or multicast transmission 605, because the UEs can receive the broadcast transmission or multicast transmission from a neighboring base station.

In some examples, different parameters (e.g., different contention window sizes or different CCA/eCCA energy detection thresholds) may be used to contend for access to a first channel, for transmission of a broadcast transmission or multicast transmission, and a second channel, for transmission of a unicast transmission. To provide better synchronization between broadcast/multicast transmissions and unicast transmissions, a base station may apply a same set of parameters (e.g., a broadcast set of parameters) to the CCA procedures or eCCA procedures used to contend for access to channels for parallel broadcast/multicast transmissions and unicast transmissions, as described with reference to FIG. 6.

Figure 7:
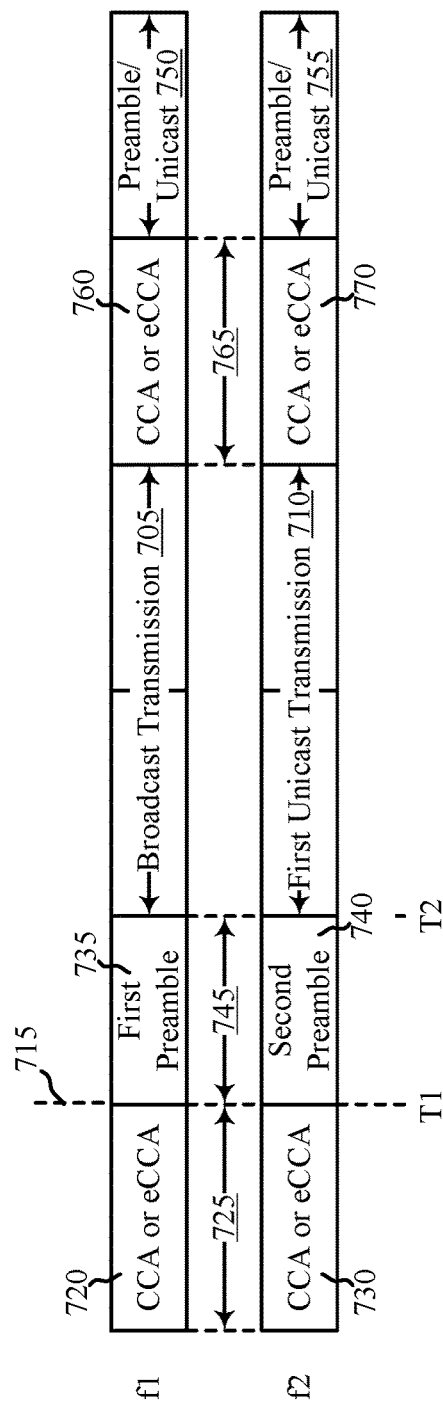
FIG. 7 shows a timeline of contending for access to a first channel of a shared radio frequency spectrum band, for the purpose of transmitting a multipoint transmission (e.g., broadcast transmission), and contending for access to a second channel of the shared radio frequency spectrum band, for the purpose of transmitting a first unicast transmission, in accordance with various aspects of the present disclosure.

FIG. 7 shows a timeline 700 of contending for access to a first channel of a shared radio frequency spectrum band, for the purpose of transmitting a multipoint transmission (e.g., broadcast transmission 705), and contending for access to a second channel of the shared radio frequency spectrum band, for the purpose of transmitting a first unicast transmission 710, in accordance with various aspects of the present disclosure. In some examples, the broadcast transmission 705 may be an example of a multipoint transmission, such as a CoMP transmission. In some examples, the contentions for access to the first channel and the second channel may be performed by a base station. The base station may be an example of aspects of one or more of the base stations 105, 205, or 205-a described with reference to FIG. 1 or 2. In some examples, the broadcast transmission may include a MBSFN transmission, a single cell eMBMS transmission, a SC-PTM transmission, or a combination thereof.

As shown in FIG. 7, a base station may contend for access to the first channel (f1) based at least in part on a timing T1 of a broadcast resynchronization boundary 715. In some examples, the base station may contend for access to the first channel by performing a first CCA procedure or first eCCA procedure 720 during a first time period 725 preceding the broadcast resynchronization boundary 715.

By way of example, the base station may also contend for access to the second channel (f2) for the first unicast transmission 710 during the first time period 725. In some examples, the base station may contend for access to the second channel by performing a second CCA procedure or second eCCA procedure 730 during the first time period 725. The second CCA procedure or second eCCA procedure 730 may be performed using the same parameters (e.g., contention window size or CCA/eCCA energy detection threshold) used for the first CCA procedure or first eCCA procedure 720 (e.g., both the first CCA procedure or first eCCA procedure and the second CCA procedure or second eCCA procedure may use a set of broadcast transmission parameters).

As shown, the base station may win contention for access to the first channel and the second channel at the broadcast resynchronization boundary 715. When the first CCA procedure or first eCCA procedure 720 performed for the first channel during the first time period 725 and the second CCA procedure or second eCCA procedure 730 performed for the second channel during the first time period 725 are both successful, the base station may transmit a first preamble 735 on the first channel and a second preamble 740 on the second channel during a second time period 745, and begin transmission of the broadcast transmission 705 on the first channel and the first unicast transmission 710 on the second channel at a broadcast transmission time T2. The broadcast transmission time T2 may occur a predetermined time after the timing T1 of the broadcast resynchronization boundary 715.

After completion of the broadcast transmission 705 and the first unicast transmission 710, the base station may contend for access to the first channel for a second unicast transmission 750 and contend for access to the second channel for a third unicast transmission 755. The base station may contend for access to the first channel for the second unicast transmission 750 by performing a third CCA procedure or third eCCA procedure 760 during a third time period 765, and may contend for access to the second channel for the third unicast transmission 755 by performing a fourth CCA procedure or fourth eCCA procedure 770. The third CCA procedure or third eCCA procedure 760 may be performed using the same parameters (e.g., contention window size or CCA/eCCA energy detection threshold) used for the fourth CCA procedure or fourth eCCA procedure 770 (e.g., both the third CCA procedure or third eCCA procedure and the fourth CCA procedure or fourth eCCA procedure may use a set of unicast transmission parameters).

Each of the second unicast transmission 750 and the third unicast transmission 755 may be preceded by a preamble.

In some examples, a PFFICH (or a downlink control channel) transmitted by a base station may include configuration information for the next few subframes or a downlink transmission burst. The PFFICH may be MBSFN-specific or cell-specific. In some examples, a few resource elements of each MBSFN subframe may be reserved for PFFICH (or downlink control channel) transmission, to enable nodes that determine a channel is "clear" at a later time than other nodes to transmit the PFFICH (or downlink control channel). In some examples, a higher layer may indicate to UEs the potential subframes that can be used for MBSFN or multicast transmissions. A UE operating in an RRC IDLE mode may therefore monitor the PFFICH (or downlink control channel) when there can be subframes for MBSFN or multicast transmission, instead of monitoring the PFFICH (or downlink control channel) for all downlink bursts or downlinksubframes.

Figure 8:
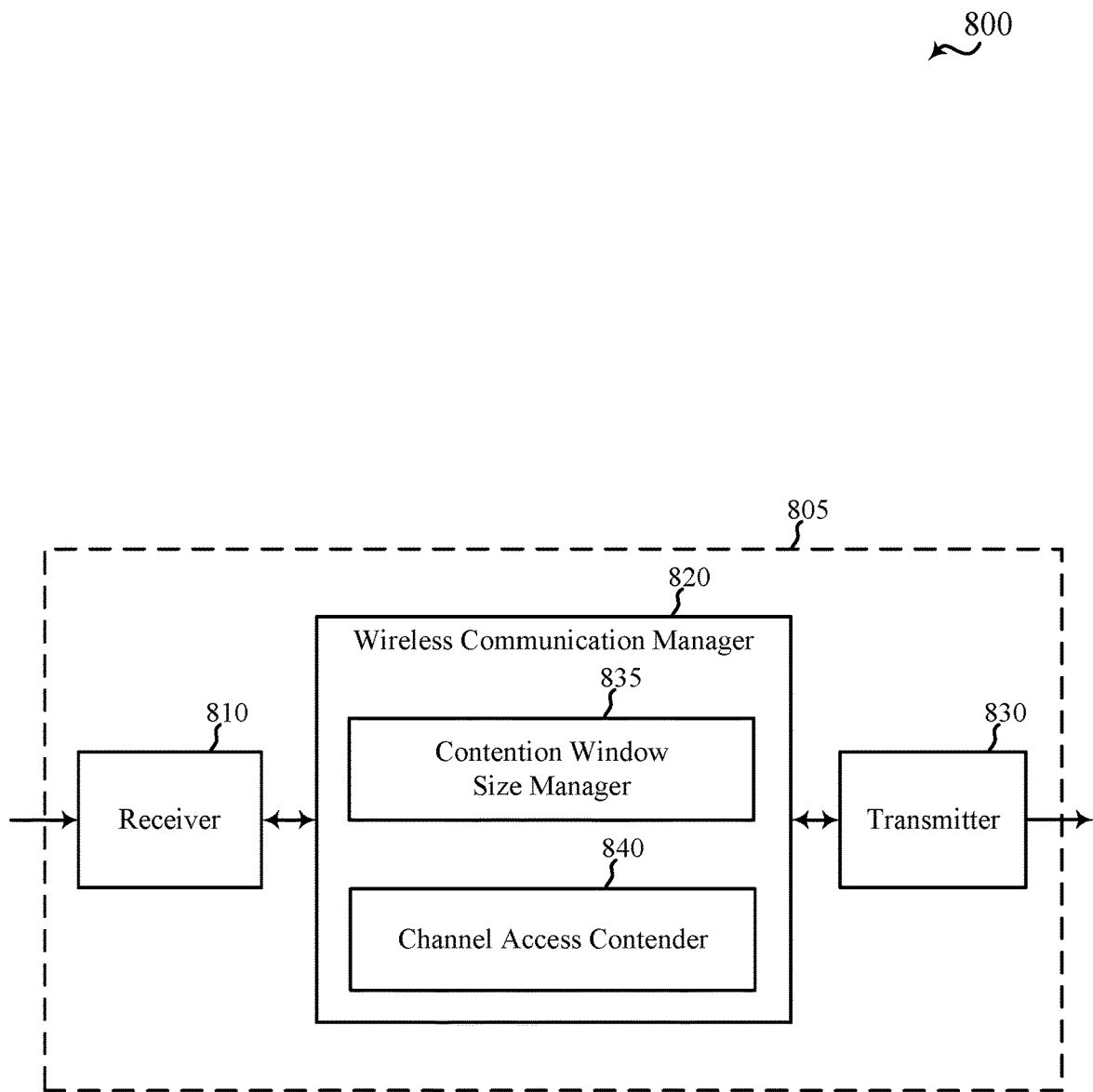
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. The apparatus 805 may be an example of aspects of one or more of the base stations 105, 205, or 205-a described with reference to FIG. 1 or 2. The apparatus 805 may also be or include a processor. The apparatus 805 may include a receiver 810, a wireless communication manager 820, or a transmitter 830. Each of these components may be in communication with each other.

The components of the apparatus 805 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 810 may include at least one radio frequency (RF) receiver, such as at least one RF receiver operable to receive transmissions over a dedicated radio frequency spectrum band (e.g., a radio frequency spectrum band for which transmitting apparatuses may not contend for access because the radio frequency spectrum band is licensed to unique users for unique uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, 5, 6, or 7. The receiver 810 may be used to receive various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the transmitter 830 may include at least one RF transmitter, such as at least one RF transmitter operable to transmit over the dedicated radio frequency spectrum band or the shared radio frequency spectrum band. The transmitter 830 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 820 may be used to manage one or more aspects of wireless communication for the apparatus 805. In some examples, part of the wireless communication manager 820 may be incorporated into or shared with the receiver 810 or the transmitter 830. In some examples, the wireless communication manager 820 may include a contention window size manager 835 or a channel access contender 840.

The contention window size manager 835 may be used to determine a contention window size for a first multipoint transmission (e.g., a first broadcast transmission or a first multicast transmission) on at least one channel of the shared radio frequency spectrum band. The first broadcast transmission or the first multicast transmission may be targeted for a first plurality of UEs. In some examples, the first broadcast transmission or first multicast transmission may be an example of a multipoint transmission. In some cases, the first broadcast transmission or first multicast transmission may be an example of a CoMP transmission. The channel access contender 840 may be used to contend for access to the at least one channel of the shared radio frequency spectrum band for the first broadcast transmission or the first multicast transmission based at least in part on the determined contention window size. In some examples, the first broadcast transmission or the first multicast transmission may include a MBSFN transmission, a single cell eMBMS transmission, a SC-PTM transmission, or a combination thereof.

Figure 9:
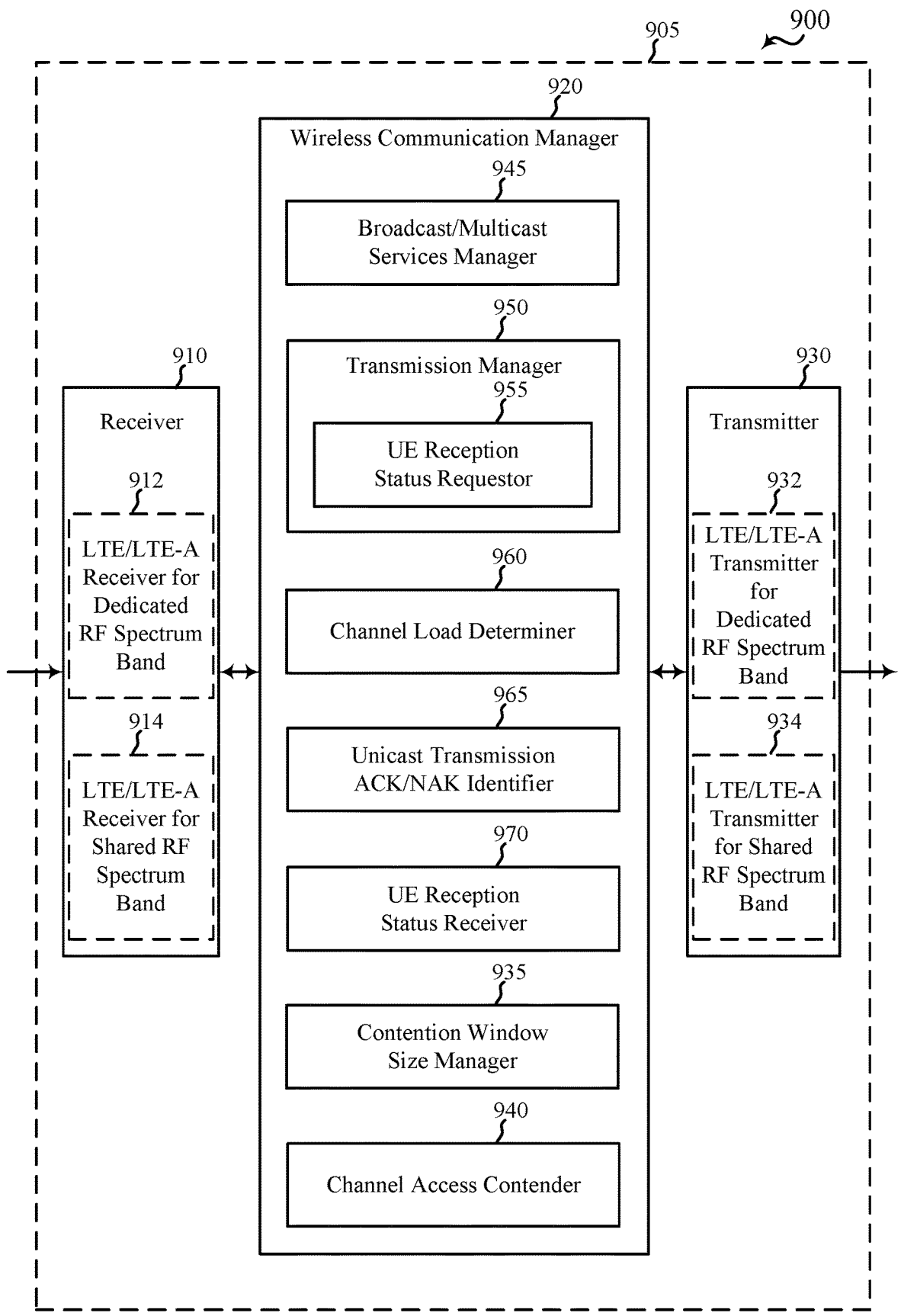
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. The apparatus 905 may be an example of aspects of one or more of the base stations 105, 205, or 205-a described with reference to FIG. 1 or 2, or aspects of the apparatus 805 described with reference to FIG. 8. The apparatus 905 may also be or include a processor. The apparatus 905 may include a receiver 910, a wireless communication manager 920, or a transmitter 930. Each of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 910 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to unique users for unique uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, 5, 6, or 7. The receiver 910 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 912), and an LTE/LTE-A receiver for communicating over the shared radio frequency spectrum band (e.g., LTE/LTE-A receiver for shared RF spectrum band 914). The receiver 910, including the LTE/LTE-A receiver for dedicated RF spectrum band 912 or the LTE/LTE-A receiver for shared RF spectrum band 914, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 930 may include at least one RF transmitter, such as at least one RF transmitter operable to transmit over the dedicated radio frequency spectrum band or the shared radio frequency spectrum band. The transmitter 930 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 932), and an LTE/LTE-A transmitter for communicating over the shared radio frequency spectrum band (e.g., LTE/LTE-A transmitter for shared RF spectrum band 934). The transmitter 930, including the LTE/LTE-A transmitter for dedicated RF spectrum band 932 or the LTE/LTE-A transmitter for shared RF spectrum band 934, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 920 may be used to manage one or more aspects of wireless communication for the apparatus 905. In some examples, part of the wireless communication manager 920 may be incorporated into or shared with the receiver 910 or the transmitter 930. In some examples, the wireless communication manager 920 may include a broadcast/multicast services manager 945, a transmission manager 950, a channel load determiner 960, a unicast transmission ACK/NAK identifier 965, a UE reception status receiver 970, a contention window size manager 935, or a channel access contender 940.

The broadcast/multicast services manager 945 may be used to receive identifications of broadcast services or multicast services of interest from each UE of at least a first plurality of UEs. In some examples, the broadcast/multicast services manager 945 may be used to receive identifications of multipoint services of interest, including those related to CoMP transmissions, which may be related to or examples of broadcast transmissions or multicast transmissions.

In some examples, the transmission manager 950 may include a UE reception status requestor 955. The UE reception status requestor 955 may optionally be used to identify the first plurality of UEs from the received identifications. The first plurality of UEs may be identified based at least in part on a type of service associated with a first broadcast transmission or a first multicast transmission, and based at least in part on the received indications indicating that the UEs in the first plurality of UEs are interested in the type of service associated with the first broadcast transmission or the first multicast transmission. The UE reception status requestor 955 may also be used to trigger the first plurality of UEs to transmit UE reception statuses for the first broadcast transmission or the first multicast transmission. The UE reception status requestor 955 may also be used to trigger a plurality of UEs to transmit UE reception statuses for other broadcast transmissions or multicast transmissions.

The transmission manager 950 may be used to transmit the first broadcast transmission or the first multicast transmission, on at least one channel of the shared radio frequency spectrum band, upon winning contention for access to the at least one channel for the first broadcast transmission. The transmission manager 950 may also be used to transmit a second broadcast transmission or a second multicast transmission (or other broadcast transmissions or multicast transmissions) on the at least one channel of the shared radio frequency spectrum band, upon winning contention for access to the at least one channel for the second broadcast transmission, the second multicast transmission, or the other broadcast transmissions or multicast transmissions. Each of the first broadcast transmission or the second broadcast transmission may include a single channel broadcast transmission or a multiple channel broadcast transmission. Each of the first multicast transmission or the second multicast transmission may include a single channel multicast transmission or a multiple channel multicast transmission. In some examples, the first broadcast transmission, the first multicast transmission, the second broadcast transmission, or the second multicast transmission may be multiplexed with at least one unicast transmission on the at least one channel. In some examples, the first broadcast transmission, the first multicast transmission, the second broadcast transmission, or the second multicast transmission may include a MBSFN transmission, a single cell eMBMS transmission, a SC-PTM transmission, or a combination thereof.

The channel load determiner 960 may optionally be used to determine a load on the at least one channel of the shared radio frequency spectrum band on which the first broadcast transmission or the first multicast transmission is transmitted. The channel load determiner 960 may also be used to determine the load on other channels of the shared radio frequency spectrum band.

The unicast transmission ACK/NAK identifier 965 may optionally be used to identify at least one of ACKs or NAKs received for at least one unicast transmission on one or more channels of the shared radio frequency spectrum band.

The UE reception status receiver 970 may optionally be used to receive, from each UE of the first plurality of UEs, a UE reception status of the first broadcast transmission or the first multicast transmission. In some examples, the UE reception status of the first broadcast transmission or the first multicast transmission may include a UE BLER for the first broadcast transmission or the first multicast transmission. The UE reception status receiver 970 may also be used to receive UE reception status of other broadcast transmissions or multicast transmissions.

The contention window size manager 935 may be used to determine a contention window size for a second broadcast transmission or a second multicast transmission on the at least one channel of the shared radio frequency spectrum band. The second broadcast transmission or the second multicast transmission may be targeted for a second plurality of UEs. The first plurality of UEs and the second plurality of UEs may include a same plurality of UEs or different pluralities of UEs. In some examples, the contention window size may be determined based at least in part on the load determined by the channel load determiner 960. In some examples, the contention window size may be determined based at least in part on the ACKs or NAKs identified for the at least one unicast transmission by the unicast transmission ACK/NAK identifier 965. In some examples, the contention window size may be determined based at least in part on the UE reception statuses received by the UE reception status receiver 970. The contention window size manager 935 may also be used to determine a contention window size for other broadcast transmissions, multicast transmissions, or unicast transmissions.

The channel access contender 940 may be used to contend for access to the at least one channel of the shared radio frequency spectrum band for the second broadcast transmission or the second multicast transmission based at least in part on the determined contention window size. The channel access contender 940 may also be used to contend for access to the at least one channel, or other channels of the shared radio frequency spectrum band, for other broadcast transmissions, multicast transmissions, multipoint transmissions, CoMP transmissions, or unicast transmissions.

Figure 10:
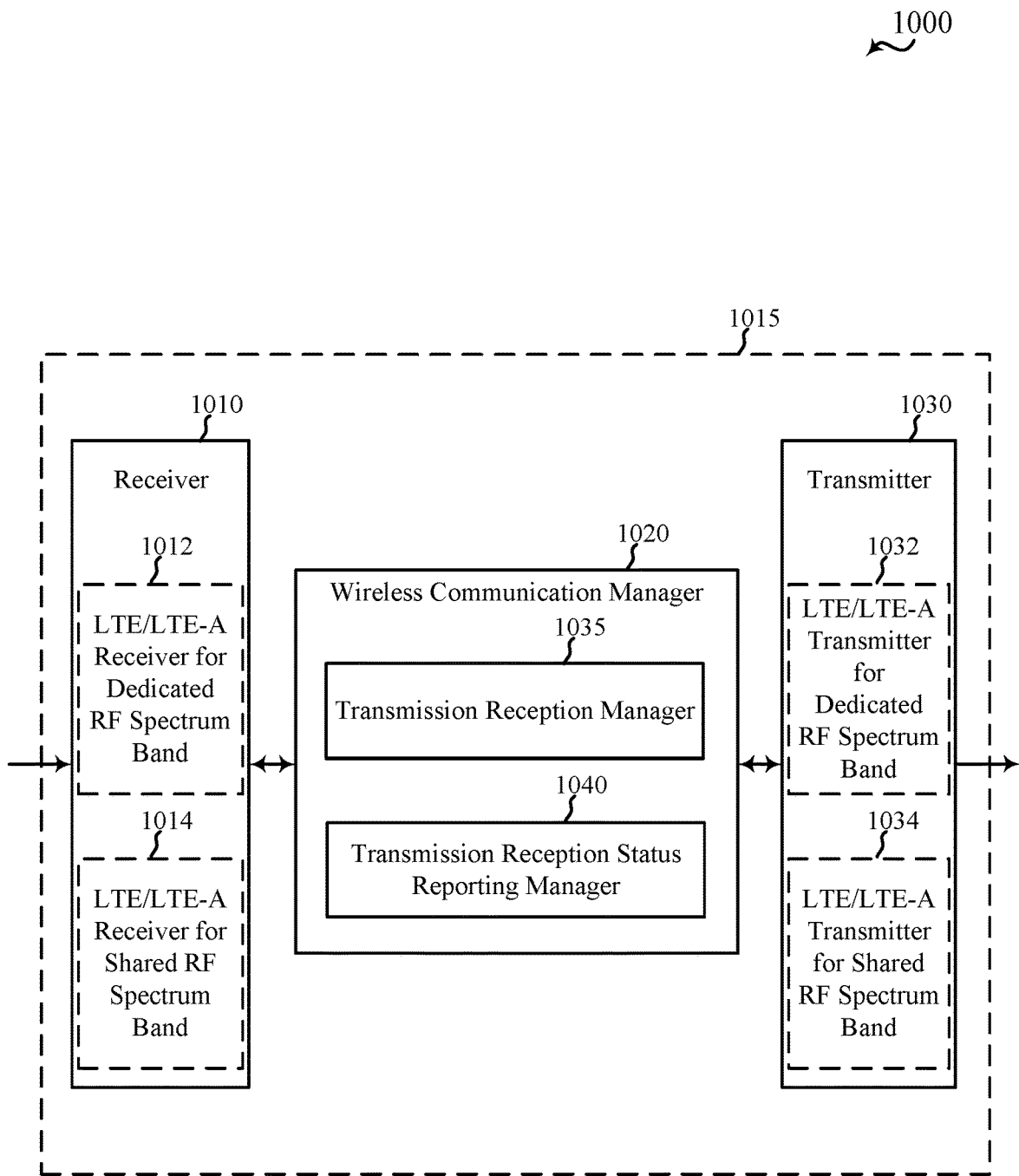
FIG. 10 shows a block diagram of an apparatus for use in wireless communication, in accordance with various aspects of the present disclosure.

FIG. 10 shows a block diagram 1000 of an apparatus 1015 for use in wireless communication, in accordance with various aspects of the present disclosure. The apparatus 1015 may be an example of aspects of one or more of the UEs 115, 215, 215-*a*, 215-*b*, or 215-*c* described with reference to FIG. 1 or 2. The apparatus 1015 may also be or include a processor. The apparatus 1015 may include a receiver 1010, a wireless communication manager 1020, or a transmitter 1030. Each of these components may be in communication with each other.

The components of the apparatus 1015 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1010 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to unique users for unique uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, 5, 6, or 7. The receiver 1010 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1012), and an LTE/LTE-A receiver for communicating over the shared radio frequency spectrum band (e.g., LTE/LTE-A receiver for shared RF spectrum band 1014). The receiver 1010, including the LTE/LTE-A receiver for dedicated RF spectrum band 1012 or the LTE/LTE-A receiver for shared RF spectrum band 1014, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1030 may include at least one RF transmitter, such as at least one RF transmitter operable to transmit over the dedicated radio frequency spectrum band or the shared radio frequency spectrum band. The transmitter 1030 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1032), and an LTE/LTE-A transmitter for communicating over the shared radio frequency spectrum band (e.g., LTE/LTE-A transmitter for shared RF spectrum band 1034). The transmitter 1030, including the LTE/LTE-A transmitter for dedicated RF spectrum band 1032 or the LTE/LTE-A transmitter for shared RF spectrum band 1034, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 1020 may be used to manage one or more aspects of wireless communication for the apparatus 1015. In some examples, part of the wireless communication manager 1020 may be incorporated into or shared with the receiver 1010 or the transmitter 1030. In some examples, the wireless communication manager 1020 may include a transmission reception manager 1035 or a transmission reception status reporting manager 1040.

The transmission reception manager 1035 may be used to receive a broadcast transmission or a multicast transmission targeted for a plurality of UEs on at least one channel of the shared radio frequency spectrum band. In some examples, the broadcast transmission or the multicast transmission may be an example of a multipoint transmission, such as a CoMP transmission. In some examples, the broadcast transmission or the multicast transmission may include a MBSFN transmission, a single cell eMBMS transmission, a SC-PTM transmission, or a combination thereof. In some examples, the at least one channel over which the broadcast transmission or the multicast transmission is received may include a single channel. In other examples, the at least one channel over which the broadcast transmission or the multicast transmission is received may include at least a first channel and a second channel, and the broadcast transmission or the multicast transmission may include a multiple channel broadcast transmission or a multiple channel multicast transmission.

The transmission reception status reporting manager 1040 may be used to receive an indication to transmit a UE reception status of the broadcast transmission or the multicast transmission, and to transmit the UE reception status of the broadcast transmission or the multicast transmission based at least in part on the received indication. In some examples, the UE reception status of the broadcast transmission or the multicast transmission may include a UE BLER for the broadcast transmission or the multicast transmission.

Figure 11:
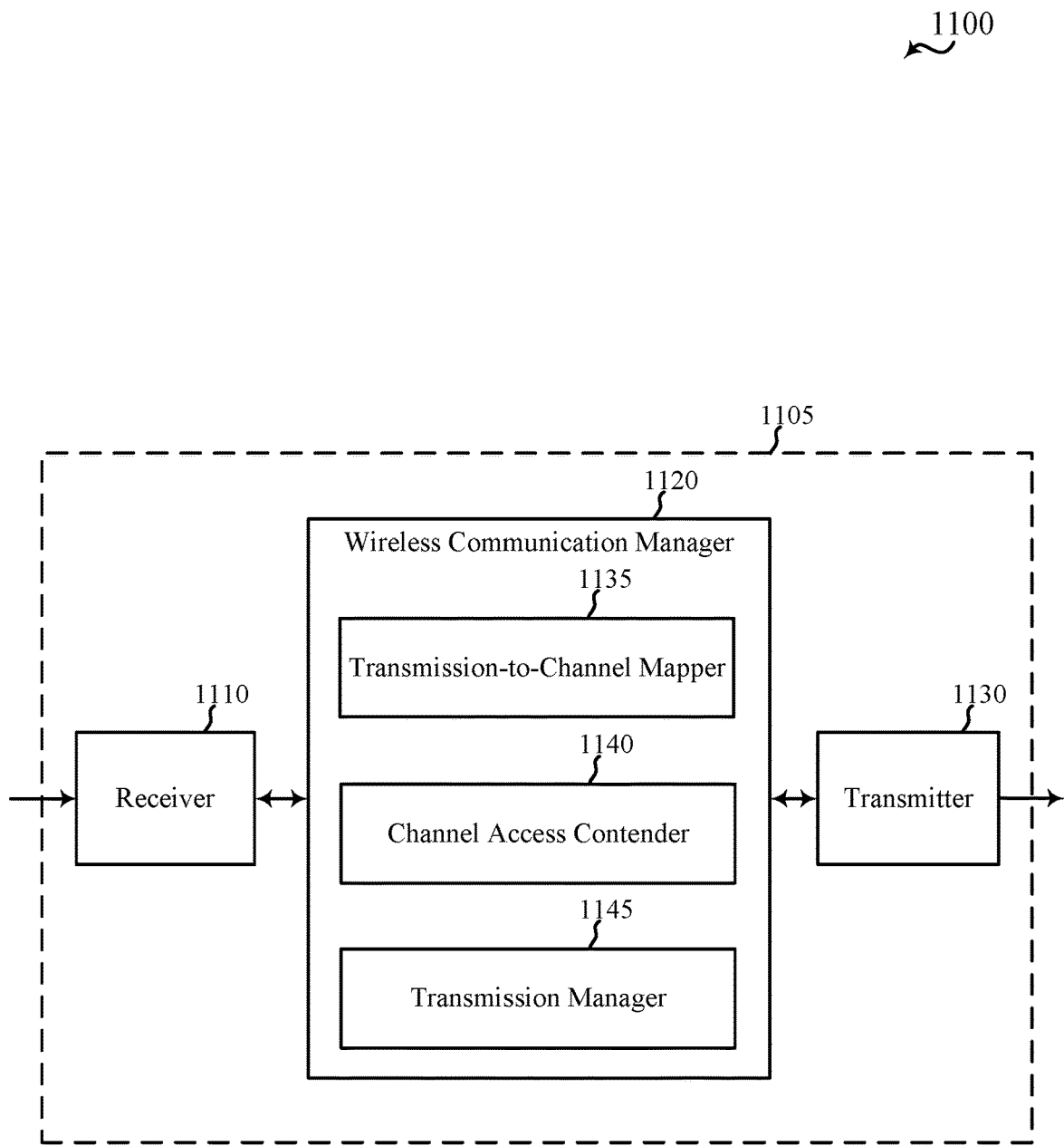
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. The apparatus 1105 may be an example of aspects of one or more of the base stations 105, 205, or 205-*a* described with reference to FIG. 1 or 2, or aspects of one or more of the apparatuses 805 or 905 described with reference to FIG. 8 or 9. The apparatus 1105 may also be or include a processor. The apparatus 1105 may include a receiver 1110, a wireless communication manager 1120, or a transmitter 1130. Each of these components may be in communication with each other.

The components of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1110 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to unique users for unique uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, 5, 6, or 7. The receiver 1110 may be used to receive various types of data or control signals (i.e., transmissions) over one or more communication links of a wireless communication system, such as one or more communication links of the wireless communication system 100 or 200 described with reference to FIG. 1 or 2. The communication links may be established over the first radio frequency spectrum band or the second radio frequency spectrum band.

In some examples, the transmitter 1130 may include at least one RF transmitter, such as at least one RF transmitter operable to transmit over the dedicated radio frequency spectrum band or the shared radio frequency spectrum band. The transmitter 1130 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 1120 may be used to manage one or more aspects of wireless communication for the apparatus 1105. In some examples, part of the wireless communication manager 1120 may be incorporated into or shared with the receiver 1110 or the transmitter 1130. In some examples, the wireless communication manager 1120 may include a transmission-to-channel mapper 1135, a channel access contender 1140, or a transmission manager 1145.

The transmission-to-channel mapper 1135 may be used to identify at least a first channel of the shared radio frequency spectrum band for transmitting a broadcast transmission or a multicast transmission (e.g., a multipoint transmission), and to identify a second channel of the shared radio frequency spectrum band for transmitting a first unicast transmission. In some examples, the broadcast transmission or the multicast transmission may be an example of a multi-point transmission, such as a CoMP transmission. In some examples, the broadcast transmission or the multicast transmission may include a MBSFN transmission, a single cell eMBMS transmission, a SC-PTM transmission, or a combination thereof.

The channel access contender 1140 may be used to contend for access to at least the first channel based at least in part on a timing of a broadcast resynchronization boundary. The channel access contender 1140 may also be used to contend for access to the second channel. The contending for access to at least the first channel, for transmission of the broadcast transmission or the multicast transmission, and to the second channel, for transmission of the first unicast transmission, may be performed independently, in synchronization, and/or in parallel. In some examples, the contending for access to the second channel may be synchronized with the broadcast resynchronization boundary. In some examples, contention for access to at least the first channel may be won based at least in part on a timing of the contention for access to the second channel. For example, when contention for access to at least the first channel and the second channel is synchronized, or when contention for access to at least the first channel is won before winning contention for access to the second channel, contention for access to at least the first channel may be won. When contention for access to the second channel is won before winning contention for access to at least the first channel, or when the second channel is in use at the completion of contending for access to at least the first channel, contention for access to at least the first channel may not be won (e.g., use of the second channel for the first unicast transmission (or another transmission) may block access to at least the first channel for the broadcast transmission or the multicast transmission).

The transmission manager 1145 may be used to transmit the broadcast transmission or the multicast transmission at a broadcast transmission time upon winning contention for access to at least the first channel. The broadcast transmission time may occur a predetermined time after a timing of the broadcast resynchronization boundary.

Figure 12:
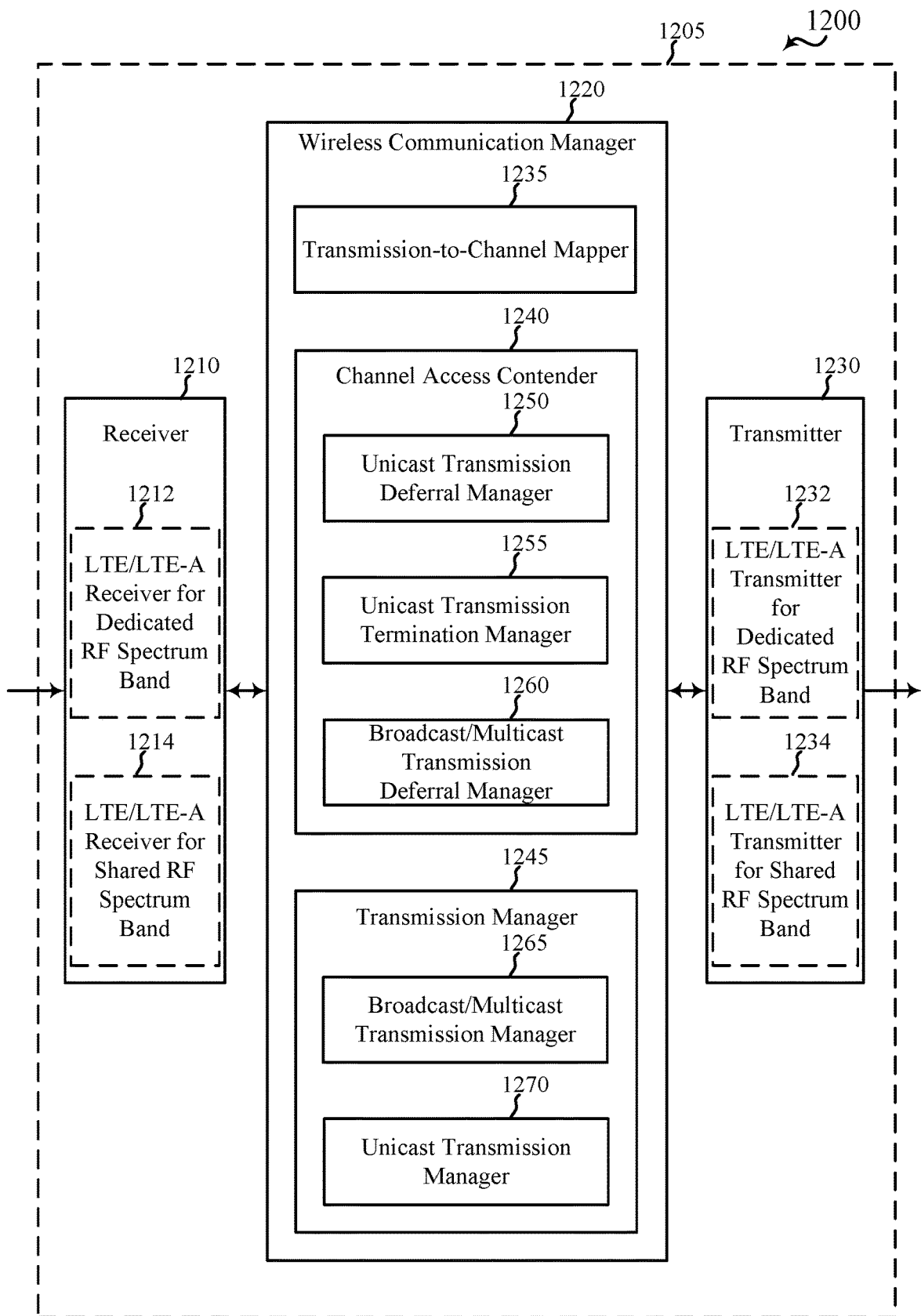
FIG. 12 shows a block diagram of an apparatus for use in wireless communication, in accordance with various aspects of the present disclosure.

FIG. 12 shows a block diagram 1200 of an apparatus 1205 for use in wireless communication, in accordance with various aspects of the present disclosure. The apparatus 1205 may be an example of aspects of one or more of the base stations 105, 205, or 205-*a* described with reference to FIG. 1 or 2, or aspects of one or more of the apparatuses 805, 905, or 1105 described with reference to FIG. 8, 9, or 11. The apparatus 1205 may also be or include a processor. The apparatus 1205 may include a receiver 1210, a wireless communication manager 1220, or a transmitter 1230. Each of these components may be in communication with each other.

The components of the apparatus 1205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 1210 may include at least one RF receiver, such as at least one RF receiver operable to receive transmissions over a dedicated radio frequency spectrum band (e.g., a radio frequency spectrum band for which transmitting apparatuses may not contend for access because the radio frequency spectrum band is licensed to unique users for unique uses) or a shared radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). In some examples, the dedicated radio frequency spectrum band or the shared radio frequency spectrum band may be used for LTE/LTE-A communications, as described, for example, with reference to FIG. 1, 2, 3, 4, 5, 6, or 7. The receiver 1210 may in some cases include separate receivers for the dedicated radio frequency spectrum band and the shared radio frequency spectrum band. The separate receivers may, in some examples, take the form of an LTE/LTE-A receiver for communicating over the dedicated radio frequency spectrum band (e.g., LTE/LTE-A receiver for dedicated RF spectrum band 1212), and an LTE/LTE-A receiver for communicating over the shared radio frequency spectrum band (e.g., LTE/LTE-A receiver for shared RF spectrum band 1214). The receiver 1210, including the LTE/LTE-A receiver for dedicated RF spectrum band 1212 or the LTE/LTE-A receiver for shared RF spectrum band 1214, may be used to receive various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the transmitter 1230 may include at least one RF transmitter, such as at least one RF transmitter operable to transmit over the dedicated radio frequency spectrum band or the shared radio frequency spectrum band. The transmitter 930 may in some cases include separate transmitters for the dedicated radio frequency spectrum band and the shared radio frequency spectrum band. The separate transmitters may, in some examples, take the form of an LTE/LTE-A transmitter for communicating over the dedicated radio frequency spectrum band (e.g., LTE/LTE-A transmitter for dedicated RF spectrum band 1232), and an LTE/LTE-A transmitter for communicating over the shared radio frequency spectrum band (e.g., LTE/LTE-A transmitter for shared RF spectrum band 1234). The transmitter 1230, including the LTE/LTE-A transmitter for dedicated RF spectrum band 1232 or the LTE/LTE-A transmitter for shared RF spectrum band 1234, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the dedicated radio frequency spectrum band or the shared radio frequency spectrum band.

In some examples, the wireless communication manager 1220 may be used to manage one or more aspects of wireless communication for the apparatus 1205. In some examples, part of the wireless communication manager 1220 may be incorporated into or shared with the receiver 1210 or the transmitter 1230. In some examples, the wireless communication manager 1220 may include a transmission-to-channel mapper 1235, a channel access contender 1240, or a transmission manager 1245.

The transmission-to-channel mapper 1235 may be used to identify at least a first channel of the shared radio frequency spectrum band for transmitting a broadcast transmission or a multicast transmission, and to identify a second channel of the shared radio frequency spectrum band for transmitting a first unicast transmission. In some examples, the broadcast transmission or the multicast transmission may be an example of a multipoint transmission, such as a CoMP transmission. In some examples, the broadcast transmission or the multicast transmission may include a MBSFN transmission, a single cell eMBMS transmission, a SC-PTM transmission, or a combination thereof.

The channel access contender 1240 may be used to contend for access to at least the first channel based at least in part on a timing of a broadcast resynchronization boundary. The channel access contender 1240 may also be used to contend for access to the second channel. The contending for access to at least the first channel, for transmission of the broadcast transmission or the multicast transmission (which may each be an example of a multipoint transmission, such as a CoMP transmission), and to the second channel, for transmission of the first unicast transmission, may be performed independently, in synchronization, and/or in parallel. In some examples, contention for access to at least the first channel may be won based at least in part on a timing of the contending for access to the second channel. In some examples, contention for access to the second channel may be won based at least in part on a timing of the contending for access to at least the first channel.

In some examples, the channel access contender 1240 may include a unicast transmission deferral manager 1250, a unicast transmission termination manager 1255, or a broadcast/multicast transmission deferral manager 1260. The unicast transmission deferral manager 1250 may optionally be used to determine the contending for access to the second channel is successfully completed within a threshold time prior to the broadcast resynchronization boundary, and to trigger the channel access contender 1140 (based at least in part on the determination that the contention for access to the second channel is successfully completed within a threshold time prior to the broadcast resynchronization boundary) to perform a CCA procedure for the second channel just prior to the broadcast resynchronization boundary. Contention for access to the second channel may be won upon successfully performing the CCA procedure. In this manner, transmission of the first unicast transmission on the second channel may be synchronized with transmission of the broadcast transmission or the multicast transmission on at least the first channel, and transmission of the first unicast transmission will not block contention for access to at least the first channel (or block transmission of the broadcast transmission or the multicast transmission).

The unicast transmission termination manager 1255 may optionally be used to stop a second unicast transmission on the second channel at a threshold time before the broadcast resynchronization boundary. The second unicast transmission may precede the first unicast transmission. Stopping the second unicast transmission may enable synchronization of contention for access to at least the first channel (for transmission of the broadcast transmission or the multicast transmission) and contention for access to the second channel (for transmission of the first unicast transmission), so that transmission of one of the transmissions does not block the other of the transmissions.

The broadcast/multicast transmission deferral manager 1260 may optionally be used to determine the contending for access to at least the first channel is successfully completed before completing the contending for access to the second channel, and to trigger the channel access contender 1140 (based at least in part on the determination that the contending for access to at least the first channel is successfully completed before completing the contending for access to the second channel) to perform a CCA procedure for at least the first channel at a predetermined time between the timing of the broadcast resynchronization boundary and a broadcast transmission time. The broadcast transmission time may occur a predetermined time after the timing of the broadcast resynchronization boundary. Contention for access to at least the first channel may be won upon successfully performing the CCA procedure for at least the first channel. In this manner, transmission of the broadcast transmission or the multicast transmission on at least the first channel may be synchronized with transmission of the first unicast transmission on the second channel, and transmission of the broadcast transmission or the multicast transmission will not block contention for access to the second channel or block transmission of the first unicast transmission.

In some examples, the transmission manager 1245 may include a broadcast/multicast transmission manager 1265 or a unicast transmission manager 1270. The broadcast/multicast transmission manager 1265 may be used to transmit the broadcast transmission or the multicast transmission at the broadcast transmission time, upon winning contention for access to at least the first channel (or when the channel access contender 1240 performs a CCA procedure for at least the first channel, just prior to the broadcast transmission time, upon the channel access contender 1240 successfully performing the CCA procedure for at least the first channel). In some examples, broadcast/multicast transmission manager 1265 may be used to facilitate operations, such as transmitting, relating to a multipoint transmission, which may be an example of the broadcast transmission or the multicast transmission. The unicast transmission manager 1270 may be used to transmit the first unicast transmission at the broadcast transmission time upon the channel access contender 1240 winning contention for access to the second channel (or when the channel access contender 1240 performs a CCA procedure for the second channel, just prior to the broadcast transmission time, upon the channel access contender 1240 successfully performing the CCA procedure for the second channel).

Figure 13:
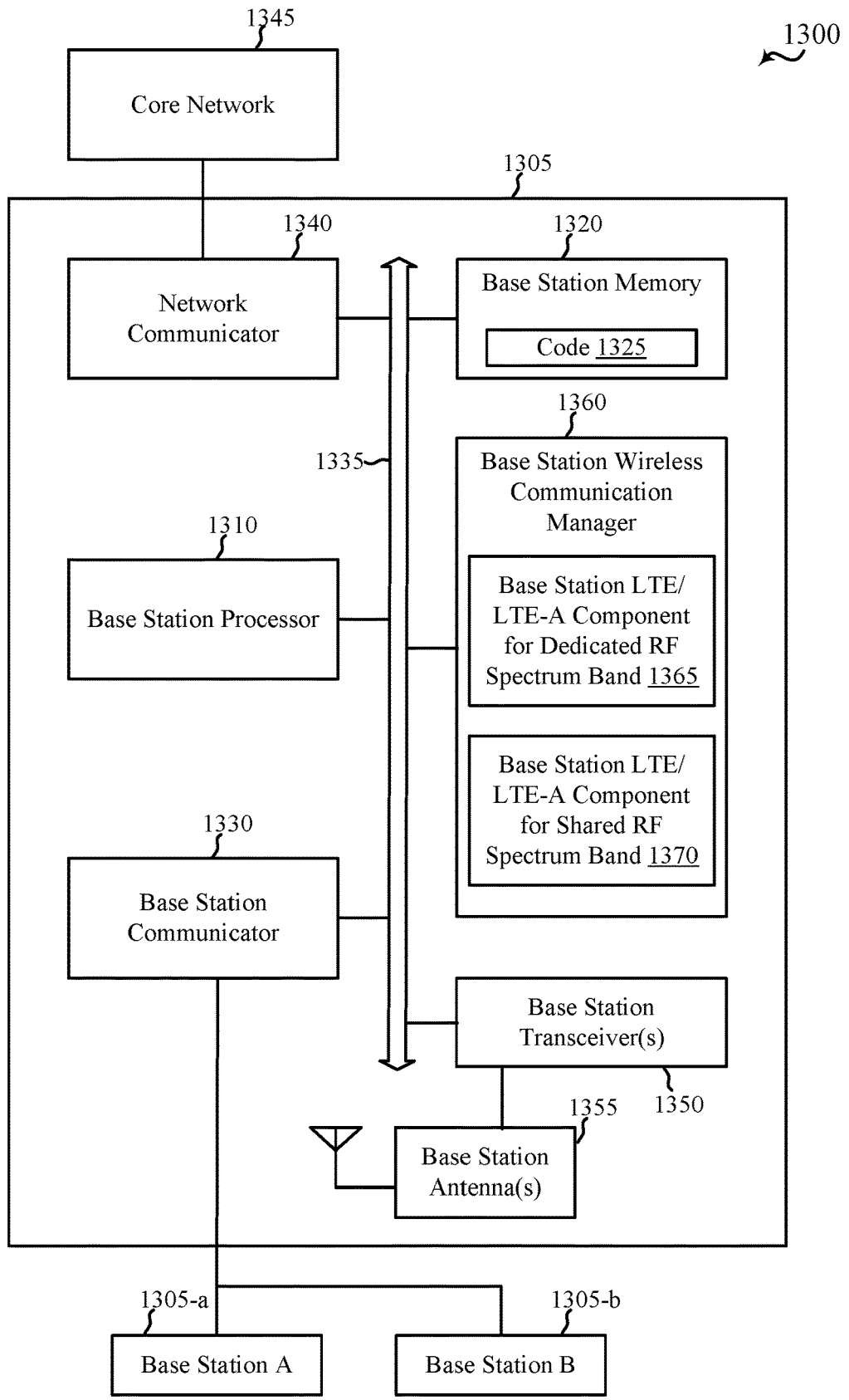
FIG. 13 shows a block diagram of a base station (e.g., a base station forming part or all of an eNB) for use in wireless communication, in accordance with various aspects of the present disclosure.

FIG. 13 shows a block diagram 1300 of a base station 1305 (e.g., a base station forming part or all of an eNB) for use in wireless communication, in accordance with various aspects of the present disclosure. In some examples, the base station 1305 may be an example of one or more aspects of the base stations 105, 205, or 205-*a* described with reference to FIG. 1 or 2, or aspects of one or more of the apparatuses 805, 905, 1105, or 1205 described with reference to FIG. 8, 9, 11, or 12. The base station 1305 may be configured to implement or facilitate at least some of the base station techniques and functions described with reference to FIG. 1, 2, 3, 4, 5, 6, 7, 8, 9, 11, or 12.

The base station 1305 may include a base station processor 1310, a base station memory 1320, at least one base station transceiver (represented by base station transceiver(s) 1350), at least one base station antenna (represented by base station antenna(s) 1355), or a base station wireless communication manager 1360. The base station 1305 may also include one or more of a base station communicator 1330 or a network communicator 1340. Each of these components may be in communication with each other, directly or indirectly, over one or more buses 1335.

The base station memory 1320 may include random access memory (RAM) or read-only memory (ROM). The base station memory 1320 may store computer-readable, computer-executable code 1325 containing instructions that are configured to, when executed, cause the base station processor 1310 to perform various functions described herein related to wireless communication, including, for example, contending for access to one or more channels of a shared radio frequency spectrum band for one or more broadcast transmissions, multicast transmissions, multipoint transmissions, CoMP transmissions, and/or unicast transmissions. Alternatively, the computer-executable code 1325 may not be directly executable by the base station processor 1310 but be configured to cause the base station 1305 (e.g., when compiled and executed) to perform various of the functions described herein.

The base station processor 1310 may include an intelligent hardware device, e.g., a central processing unit (CPU), a microcontroller, an ASIC, etc. The base station processor 1310 may process information received through the base station transceiver(s) 1350, the base station communicator 1330, or the network communicator 1340. The base station processor 1310 may also process information to be sent to the transceiver(s) 1350 for transmission through the antenna(s) 1355, to the base station communicator 1330, for transmission to one or more other base stations (e.g., base station 1305-*a* and base station 1305-*b*), or to the network communicator 1340 for transmission to a core network 1345, which may be an example of one or more aspects of the core network 130 described with reference to FIG. 1. The base station processor 1310 may handle, alone or in connection with the base station wireless communication manager 1360, various aspects of communicating over (or managing communications over) a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to unique users for unique uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

The base station transceiver(s) 1350 may include a modem configured to modulate packets and provide the modulated packets to the base station antenna(s) 1355 for transmission, and to demodulate packets received from the base station antenna(s) 1355. The base station transceiver(s) 1350 may, in some examples, be implemented as one or more base station transmitters and one or more separate base station receivers. The base station transceiver(s) 1350 may support communications in the dedicated radio frequency spectrum band or the shared radio frequency spectrum band. The base station transceiver(s) 1350 may be configured to communicate bi-directionally, via the antenna(s) 1355, with one or more UEs or apparatuses, such as one or more of the UEs 115, 215, 215-*a*, 215-*b*, or 215-*c* described with reference to FIG. 1 or 2, or the apparatus 1015 described with reference to FIG. 10. The base station 1305 may, for example, include multiple base station antennas 1355 (e.g., an antenna array). The base station 1305 may communicate with the core network 1345 through the network communicator 1340. The base station 1305 may also communicate with other base stations, such as the base station 1305-*a* and the base station 1305-*b*, using the base station communicator 1330.

The base station wireless communication manager 1360 may be configured to perform or control some or all of the techniques or functions described with reference to FIG. 1, 2, 3, 4, 5, 6, 7, 8, 9, 11, or 12 related to wireless communication over the dedicated radio frequency spectrum band or the shared radio frequency spectrum band. For example, the base station wireless communication manager 1360 may be configured to support a supplemental downlink mode (e.g., a licensed assisted access mode), a carrier aggregation mode, or a standalone mode using the dedicated radio frequency spectrum band or the shared radio frequency spectrum band. The base station wireless communication manager 1360 may include a base station LTE/LTE-A component for dedicated RF spectrum band 1365 configured to handle LTE/LTE-A communications in the dedicated radio frequency spectrum band, and a base station LTE/LTE-A component for shared RF spectrum band 1370 configured to handle LTE/LTE-A communications in the shared radio frequency spectrum band. The base station wireless communication manager 1360, or portions of it, may include a processor, or some or all of the functions of the base station wireless communication manager 1360 may be performed by the base station processor 1310 or in connection with the base station processor 1310. In some examples, the base station wireless communication manager 1360 may be an example of the wireless communication manager 820, 920, 1120, or 1220 described with reference to FIG. 8, 9, 11, or 12.

Figure 14:
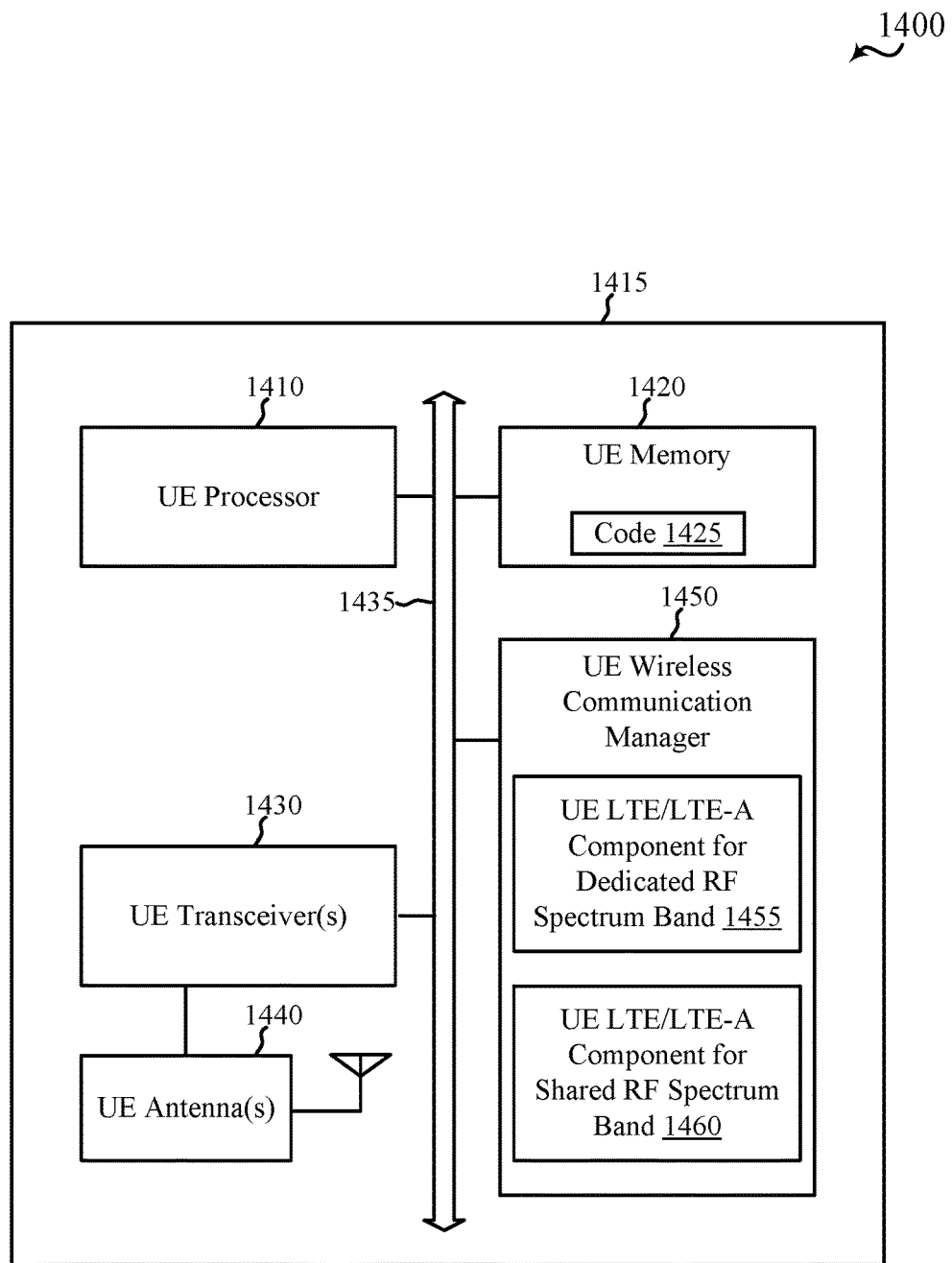
FIG. 14 shows a block diagram of a UE for use in wireless communication, in accordance with various aspects of the present disclosure.

FIG. 14 shows a block diagram 1400 of a UE 1415 for use in wireless communication, in accordance with various aspects of the present disclosure. The UE 1415 may be included or be part of a personal computer (e.g., a laptop computer, a netbook computer, a tablet computer, etc.), a cellular telephone, a PDA, a DVR, an internet appliance, a gaming console, an e-reader, etc. The UE 1415 may, in some examples, have an internal power supply (not shown), such as a small battery, to facilitate mobile operation. In some examples, the UE 1415 may be an example of aspects of one or more of the UEs 115, 215, 215-a, 215-b, or 215-c described with reference to FIG. 1 or 2, or aspects of the apparatus 1015 described with reference to FIG. 10. The UE 1415 may be configured to implement at least some of the UE or apparatus techniques and functions described with reference to FIG. 1, 2, 3, 4, 5, 6, 7, or 10.

The UE 1415 may include a UE processor 1410, a UE memory 1420, at least one UE transceiver (represented by UE transceiver(s) 1430), at least one UE antenna (represented by UE antenna(s) 1440), or a UE wireless communication manager 1450. Each of these components may be in communication with each other, directly or indirectly, over one or more buses 1435.

The UE memory 1420 may include RAM or ROM. The UE memory 1420 may store computer-readable, computer-executable code 1425 containing instructions that are configured to, when executed, cause the UE processor 1410 to perform various functions described herein related to wireless communication, including, for example, transmitting a UE reception status of a broadcast transmission or a multicast transmission (e.g., a multipoint transmission). Alternatively, the computer-executable code 1425 may not be directly executable by the UE processor 1410 but be configured to cause the UE 1415 (e.g., when compiled and executed) to perform various of the functions described herein.

The UE processor 1410 may include an intelligent hardware device, e.g., a CPU, a microcontroller, an ASIC, etc. The UE processor 1410 may process information received through the UE transceiver(s) 1430 or information to be sent to the UE transceiver(s) 1430 for transmission through the UE antenna(s) 1440. The UE processor 1410 may handle, alone or in connection with the UE wireless communication manager 1450, various aspects of communicating over (or managing communications over) a dedicated radio frequency spectrum band or a shared radio frequency spectrum band. The dedicated radio frequency spectrum band may include a radio frequency spectrum band for which transmitting apparatuses may not contend for access (e.g., a radio frequency spectrum band licensed to unique users for unique uses, such as a licensed radio frequency spectrum band usable for LTE/LTE-A communications). The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner).

The UE transceiver(s) 1430 may include a modem configured to modulate packets and provide the modulated packets to the UE antenna(s) 1440 for transmission, and to demodulate packets received from the UE antenna(s) 1440. The UE transceiver(s) 1430 may, in some examples, be implemented as one or more UE transmitters and one or more separate UE receivers. The UE transceiver(s) 1430 may support communications in the dedicated radio frequency spectrum band or the shared radio frequency spectrum band. The UE transceiver(s) 1430 may be configured to communicate bi-directionally, via the UE antenna(s) 1440, with one or more of the base stations 105, 205, 205-a, or 1305 described with reference to FIG. 1, 2, or 13, or aspects of one or more of the apparatuses 805, 905, 1105, or 1205 described with reference to FIG. 8, 9, 11, or 12. While the UE 1415 may include a single UE antenna, there may be examples in which the UE 1415 may include multiple UE antennas 1440.

The UE wireless communication manager 1450 may be configured to perform or control some or all of the UE or apparatus techniques or functions described with reference to FIG. 1, 2, 3, 4, 5, 6, 7, or 10 related to wireless communication over the dedicated radio frequency spectrum band or the shared radio frequency spectrum band. For example, the UE wireless communication manager 1450 may be configured to support a supplemental downlink mode (e.g., a licensed assisted access mode), a carrier aggregation mode, or a standalone mode using the dedicated radio frequency spectrum band or the shared radio frequency spectrum band. The UE wireless communication manager 1450 may include a UE LTE/LTE-A component for dedicated RF spectrum band 1455 configured to handle LTE/LTE-A communications in the dedicated radio frequency spectrum band, and a UE LTE/LTE-A component for shared RF spectrum band 1460 configured to handle LTE/LTE-A communications in the shared radio frequency spectrum band. The UE wireless communication manager 1450, or portions of it, may include a processor, or some or all of the functions of the UE wireless communication manager 1450 may be performed by the UE processor 1410 or in connection with the UE processor 1410. In some examples, the UE wireless communication manager 1450 may be an example of the wireless communication manager 1020 described with reference to FIG. 10.

Figure 15:
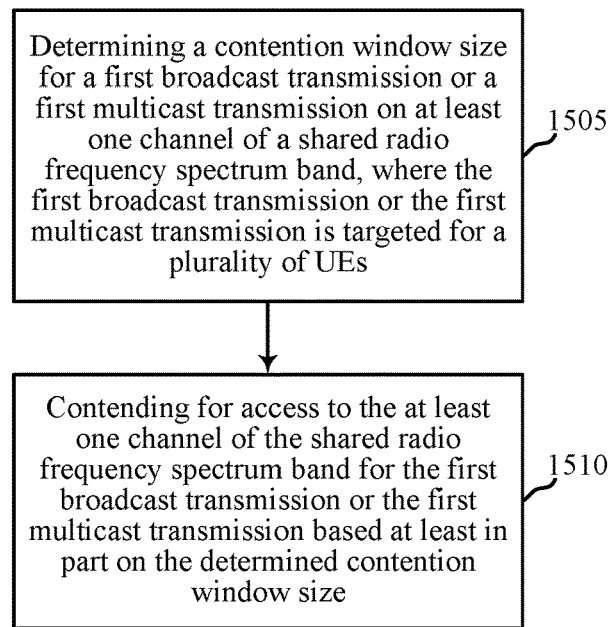
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the base stations 105, 205, 205-a, or 1305 described with reference to FIG. 1, 2, or 13, or aspects of one or more of the apparatuses 805 or 905 described with reference to FIG. 8 or 9. In some examples, a base station may execute one or more sets of codes to control the functional elements of the base station to perform the functions described below. Additionally or alternatively, the base station may perform one or more of the functions described below using special-purpose hardware. In some examples, methods and techniques described for method 1500 relating to a broadcast transmission or a multicast transmission (or a combination thereof) may also relate to a multipoint transmission (e.g., a CoMP transmission). In some examples, a broadcast transmission or a multicast transmission may be an example of a multipoint transmission.

At block 1505, the method 1500 may include determining a contention window size for a first broadcast transmission or a first multicast transmission on at least one channel of a shared radio frequency spectrum band. The first broadcast transmission or the first multicast transmission may be targeted for a first plurality of UEs. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 1505 may be performed using the wireless communication manager 820 or 920 or base station wireless communication manager 1360 described with reference to FIG. 8, 9, or 13, or the contention window size manager 835 or 935 described with reference to FIG. 8 or 9.

At block 1510, the method 1500 may include contending for access to the at least one channel of the shared radio frequency spectrum band for the first broadcast transmission or the first multicast transmission based at least in part on the determined contention window size. The operation(s) at block 1510 may be performed using the wireless communication manager 820 or 920 or base station wireless communication manager 1360 described with reference to FIG. 8, 9, or 13, or the channel access contender 840 or 940 described with reference to FIG. 8 or 9.

In some examples of the method 1500, the first broadcast transmission or the first multicast transmission may include a MBSFN transmission, a single cell eMBMS transmission, a SC-PTM transmission, or a combination thereof.

Thus, the method 1500 may provide for wireless communication. It should be noted that the method 1500 is just one implementation and that the operations of the method 1500 may be rearranged or otherwise modified such that other implementations are possible.

Figure 16:
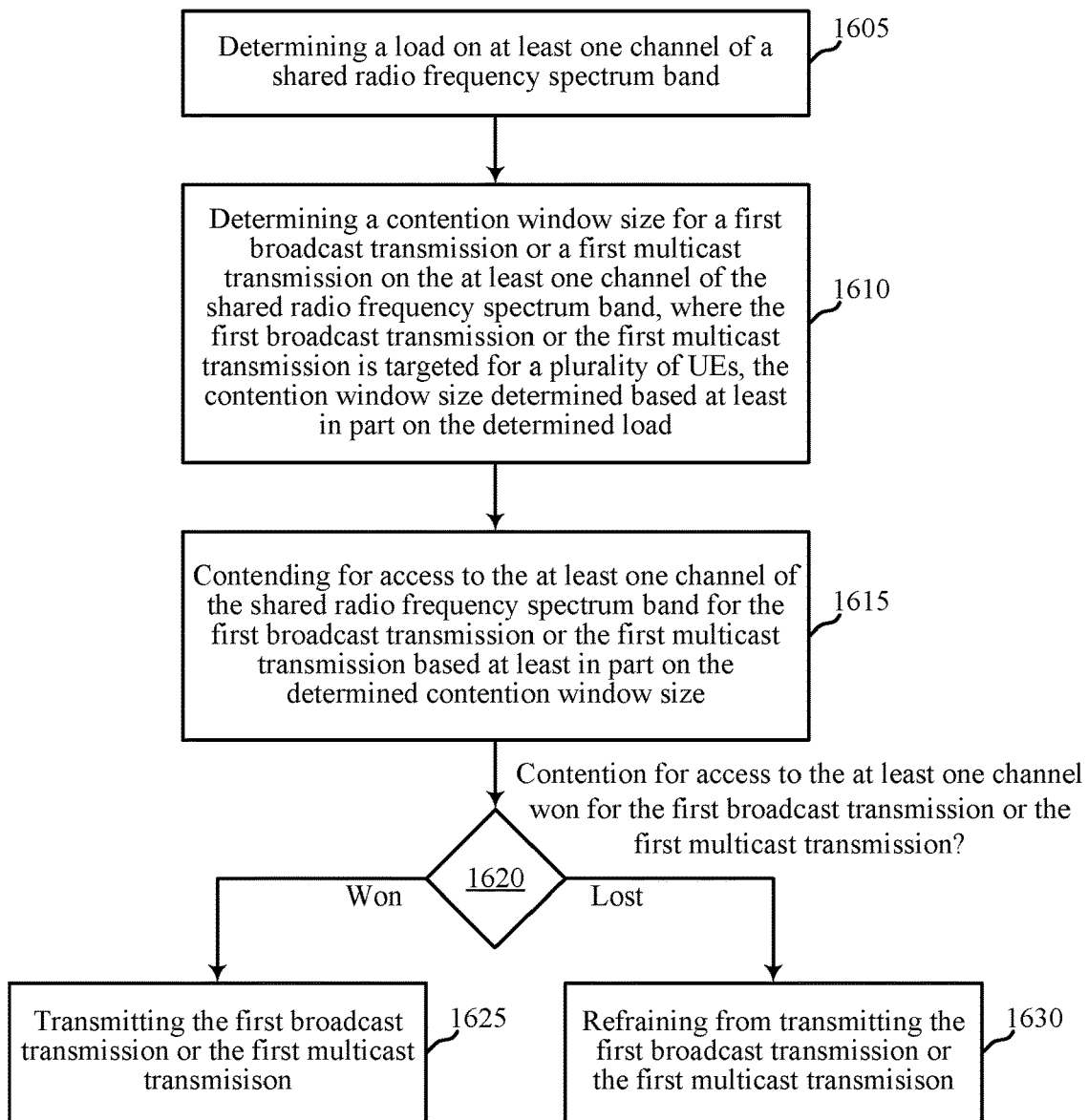
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105, 205, 205-*a*, or 1305 described with reference to FIG. 1, 2, or 13, or aspects of one or more of the apparatuses 805 or 905 described with reference to FIG. 8 or 9. In some examples, a base station may execute one or more sets of codes to control the functional elements of the base station to perform the functions described below. Additionally or alternatively, the base station may perform one or more of the functions described below using special-purpose hardware. In some examples, methods and techniques described for method 1600 relating to a broadcast transmission or a multicast transmission (or a combination thereof) may also relate to a multipoint transmission (e.g., a CoMP transmission). In some examples, a broadcast transmission or a multicast transmission may be an example of a multipoint transmission.

At block 1605, the method 1600 may include determining a load on at least one channel of a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 1605 may be performed using the wireless communication manager 820 or 920 or base station wireless communication manager 1360 described with reference to FIG. 8, 9, or 13, or the channel load determiner 960 described with reference to FIG. 9.

At block 1610, the method 1600 may include determining a contention window size for a first broadcast transmission or a first multicast transmission on at least one channel of a shared radio frequency spectrum band. The first broadcast transmission or the first multicast transmission may be targeted for a first plurality of UEs. The contention window size may be determined based at least in part on the load determined at block 1605. The operation(s) at block 1610 may be performed using the wireless communication manager 820 or 920 or base station wireless communication manager 1360 described with reference to FIG. 8, 9, or 13, or the contention window size manager 835 or 935 described with reference to FIG. 8 or 9.

At block 1615, the method 1600 may include contending for access to the at least one channel of the shared radio frequency spectrum band for the first broadcast transmission or the first multicast transmission based at least in part on the determined contention window size. The operation(s) at block 1615 may be performed using the wireless communication manager 820 or 920 or base station wireless communication manager 1360 described with reference to FIG. 8, 9, or 13, or the channel access contender 840 or 940 described with reference to FIG. 8 or 9.

At block 1620, the method 1600 may include determining whether contention for access to the at least one channel for the first broadcast transmission or the first multicast transmission is won. Upon winning contention for access to the at least one channel, the method 1600 may continue at block 1625. Upon not winning contention for access to the at least one channel, the method 1600 may continue at block 1630. At block 1625, the method 1600 may include transmitting the first broadcast transmission or the first multicast transmission. At block 1630, the method 1600 may include refraining from transmitting the first broadcast transmission or the first multicast transmission. The operation(s) at block 1620, 1625, or 1630 may be performed using the wireless communication manager 820 or 920 or base station wireless communication manager 1360 described with reference to FIG. 8, 9, or 13, or the transmission manager 950 described with reference to FIG. 9.

In some examples of the method 1600, the first broadcast transmission or the first multicast transmission may include a MBSFN transmission, a single cell eMBMS transmission, a SC-PTM transmission, or a combination thereof.

Thus, the method 1600 may provide for wireless communication. It should be noted that the method 1600 is just one implementation and that the operations of the method 1600 may be rearranged or otherwise modified such that other implementations are possible.

Figure 17:
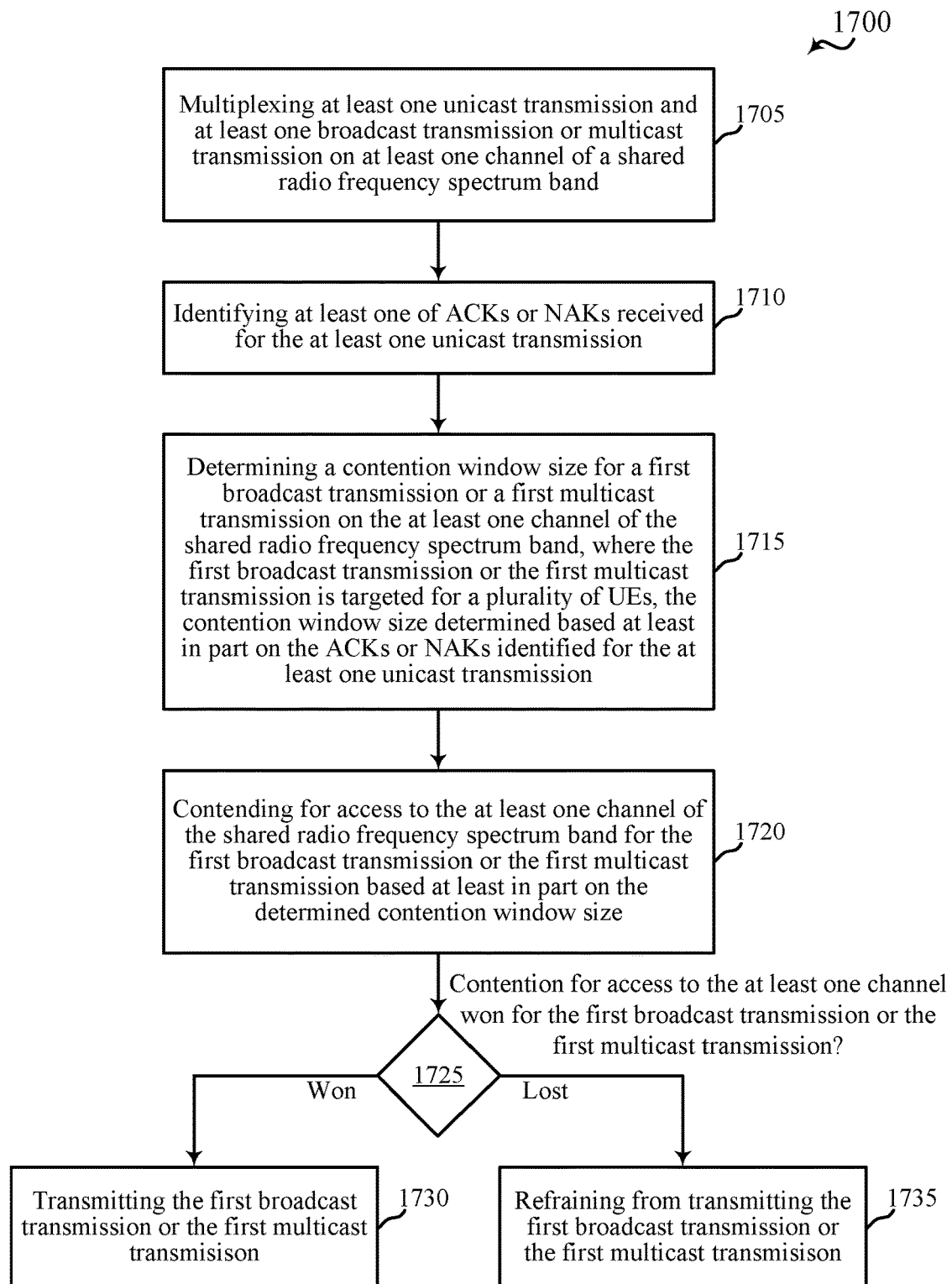
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations 105, 205, 205-*a*, or 1305 described with reference to FIG. 1, 2, or 13, or aspects of one or more of the apparatuses 805 or 905 described with reference to FIG. 8 or 9. In some examples, a base station may execute one or more sets of codes to control the functional elements of the base station to perform the functions described below. Additionally or alternatively, the base station may perform one or more of the functions described below using special-purpose hardware. In some examples, methods and techniques described for method 1700 relating to a broadcast transmission or a multicast transmission (or a combination thereof) may also relate to a multipoint transmission (e.g., a CoMP transmission). In some examples, a broadcast transmission or a multicast transmission may be an example of a multipoint transmission.

At block 1705, the method 1700 may include multiplexing at least one unicast transmission and at least one broadcast transmission or multicast transmission on at least one channel of a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 1705 may be performed using the wireless communication manager 820 or 920 or base station wireless communication manager 1360 described with reference to FIG. 8, 9, or 13, or the transmission manager 950 described with reference to FIG. 9.

At block 1710, the method 1700 may include identifying at least one of ACKs or NAKs received for the at least one unicast transmission. The operation(s) at block 1710 may be performed using the wireless communication manager 820 or 920 or base station wireless communication manager 1360 described with reference to FIG. 8, 9, or 13, or the unicast transmission ACK/NAK identifier 965 described with reference to FIG. 9.

At block 1715, the method 1700 may include determining a contention window size for a first broadcast transmission or a first multicast transmission on the at least one channel of the shared radio frequency spectrum band. The first broadcast transmission or the first multicast transmission may be targeted for a first plurality of UEs. The contention window size may be determined based at least in part on the ACKs or NAKs identified for the at least one unicast transmission at block 1710. The operation(s) at block 1715 may be performed using the wireless communication manager 820 or 920 or base station wireless communication manager 1360 described with reference to FIG. 8, 9, or 13, or the contention window size manager 835 or 935 described with reference to FIG. 8 or 9.

At block 1720, the method 1700 may include contending for access to the at least one channel of the shared radio frequency spectrum band for the first broadcast transmission or the first multicast transmission based at least in part on the determined contention window size. The operation(s) at block 1720 may be performed using the wireless communication manager 820 or 920 or base station wireless communication manager 1360 described with reference to FIG. 8, 9, or 13, or the channel access contender 840 or 940 described with reference to FIG. 8 or 9.

At block 1725, the method 1700 may include determining whether contention for access to the at least one channel for the first broadcast transmission or the first multicast transmission is won. Upon winning contention for access to the at least one channel, the method 1700 may continue at block 1730. Upon not winning contention for access to the at least one channel, the method 1700 may continue at block 1735. At block 1730, the method 1700 may include transmitting the first broadcast transmission or the first multicast transmission. At block 1735, the method 1700 may include refraining from transmitting the first broadcast transmission or the first multicast transmission. The operation(s) at block 1725, 1730, or 1735 may be performed using the wireless communication manager 820 or 920 or base station wireless communication manager 1360 described with reference to FIG. 8, 9, or 13, or the transmission manager 950 described with reference to FIG. 9.

In some examples of the method 1700, the first broadcast transmission or the first multicast transmission may include a MBSFN transmission, a single cell eMBMS transmission, a SC-PTM transmission, or a combination thereof.

Thus, the method 1700 may provide for wireless communication. It should be noted that the method 1700 is just one implementation and that the operations of the method 1700 may be rearranged or otherwise modified such that other implementations are possible.

Figure 18:
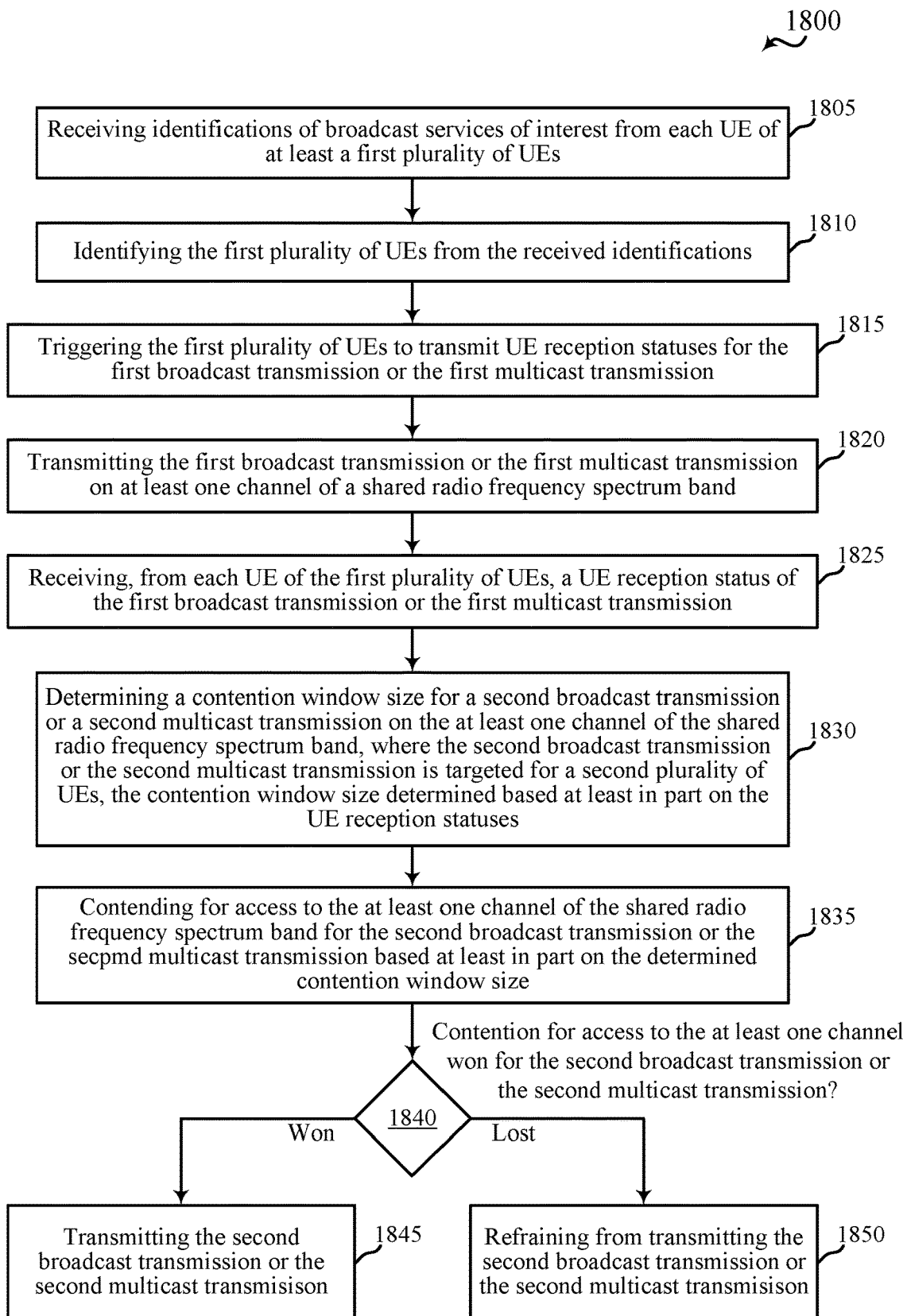
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the base stations 105, 205, 205-*a*, or 1305 described with reference to FIG. 1, 2, or 13, or aspects of one or more of the apparatuses 805 or 905 described with reference to FIG. 8 or 9. In some examples, a base station may execute one or more sets of codes to control the functional elements of the base station to perform the functions described below. Additionally or alternatively, the base station may perform one or more of the functions described below using special-purpose hardware. In some examples, methods and techniques described for method 1800 relating to a broadcast transmission or a multicast transmission (or a combination thereof) may also relate to a multipoint transmission (e.g., a CoMP transmission). In some examples, a broadcast transmission or a multicast transmission may be an example of a multipoint transmission.

At block 1805, the method 1800 may include receiving identifications of broadcast services of interest from each UE of at least a first plurality of UEs. The operation(s) at block 1805 may be performed using the wireless communication manager 820 or 920 or base station wireless communication manager 1360 described with reference to FIG. 8, 9, or 13, or the broadcast/multicast services manager 945 described with reference to FIG. 9.

At block 1810, the method 1800 may include identifying the first plurality of UEs from the received identifications. The first plurality of UEs may be identified based at least in part on a type of service associated with a first broadcast transmission or a first multicast transmission, and based at least in part on the received indications indicating that the UEs in the first plurality of UEs are interested in the type of service associated with the first broadcast transmission or the first multicast transmission. The operation(s) at block 1810 may be performed using the wireless communication manager 820 or 920 or base station wireless communication manager 1360 described with reference to FIG. 8, 9, or 13, or the transmission manager 950 described with reference to FIG. 9.

At block 1815, the method 1800 may include triggering the first plurality of UEs to transmit UE reception statuses for the first broadcast transmission or the first multicast transmission. The operation(s) at block 1815 may be performed using the wireless communication manager 820 or 920 or base station wireless communication manager 1360 described with reference to FIG. 8, 9, or 13, or the UE reception status requestor 955 described with reference to FIG. 9.

At block 1820, the method 1800 may include transmitting the first broadcast transmission or the first multicast transmission on at least one channel of a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 1820 may be performed using the wireless communication manager 820 or 920 or base station wireless communication manager 1360 described with reference to FIG. 8, 9, or 13, or the transmission manager 950 described with reference to FIG. 9.

At block 1825, the method 1800 may include receiving, from each UE of the first plurality of UEs, a UE reception status of the first broadcast transmission or the first multicast transmission. In some examples, the UE reception status of the first broadcast transmission or the first multicast transmission may include a UE BLER for the first broadcast transmission or the first multicast transmission. The operation(s) at block 1825 may be performed using the wireless communication manager 820 or 920 or base station wireless communication manager 1360 described with reference to FIG. 8, 9, or 13, or the UE reception status receiver 970 described with reference to FIG. 9.

At block 1830, the method 1800 may include determining a contention window size for a second broadcast transmission or a second multicast transmission on the at least one channel of the shared radio frequency spectrum band. The second broadcast transmission or the second multicast transmission may be targeted for a second plurality of UEs. The first plurality of UEs and the second plurality of UEs may include a same plurality of UEs or different pluralities of UEs. The contention window size may be determined based at least in part on the UE reception statuses. The operation(s) at block 1830 may be performed using the wireless communication manager 820 or 920 or base station wireless communication manager 1360 described with reference to FIG. 8, 9, or 13, or the contention window size manager 835 or 935 described with reference to FIG. 8 or 9.

At block 1835, the method 1800 may include contending for access to the at least one channel of the shared radio frequency spectrum band for the second broadcast transmission based at least in part on the determined contention window size. The operation(s) at block 1835 may be performed using the wireless communication manager 820 or 920 or base station wireless communication manager 1360 described with reference to FIG. 8, 9, or 13, or the channel access contender 840 or 940 described with reference to FIG. 8 or 9.

At block 1840, the method 1800 may include determining whether contention for access to the at least one channel for the second broadcast transmission or the second multicast transmission is won. Upon winning contention for access to the at least one channel, the method 1800 may continue at block 1845. Upon not winning contention for access to the at least one channel, the method 1800 may continue at block 1850. At block 1845, the method 1800 may include transmitting the second broadcast transmission or the second multicast transmission. At block 1850, the method 1800 may include refraining from transmitting the second broadcast transmission or the second multicast transmission. The operation(s) at block 1840, 1845, or 1850 may be performed using the wireless communication manager 820 or 920 or base station wireless communication manager 1360 described with reference to FIG. 8, 9, or 13, or the transmission manager 950 described with reference to FIG. 9.

In some examples of the method 1800, the first broadcast transmission, the first multicast transmission, the second broadcast transmission, or the second multicast transmission may include a MBSFN transmission, a single cell eMBMS transmission, a SC-PTM transmission, or a combination thereof.

Thus, the method 1800 may provide for wireless communication. It should be noted that the method 1800 is just one implementation and that the operations of the method 1800 may be rearranged or otherwise modified such that other implementations are possible.

Figure 19:
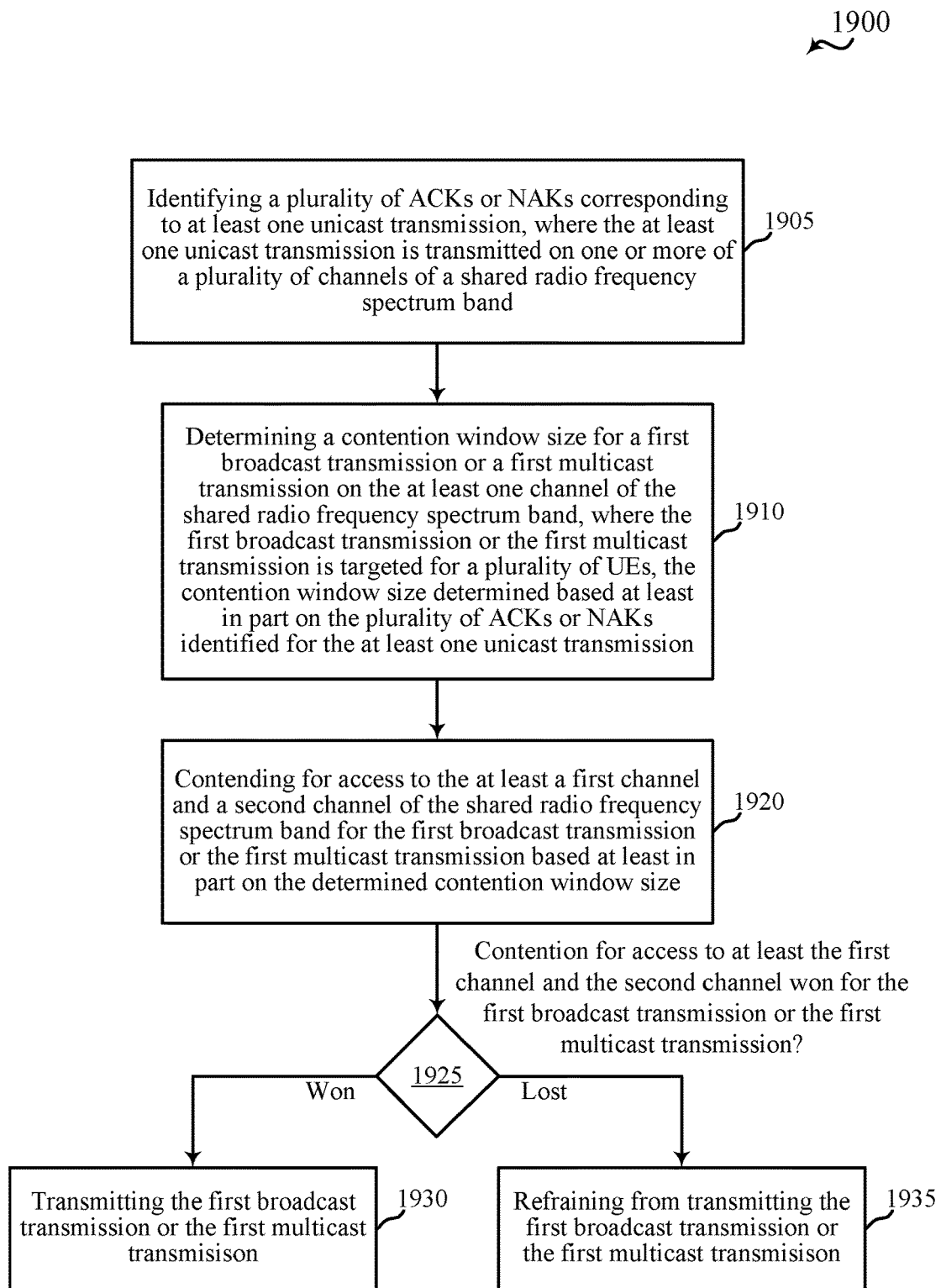
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the base stations 105, 205, 205-*a*, or 1305 described with reference to FIG. 1, 2, or 13, or aspects of one or more of the apparatuses 805 or 905 described with reference to FIG. 8 or 9. In some examples, a base station may execute one or more sets of codes to control the functional elements of the base station to perform the functions described below. Additionally or alternatively, the base station may perform one or more of the functions described below using special-purpose hardware. In some examples, methods and techniques described for method 1900 relating to a broadcast transmission or a multicast transmission (or a combination thereof) may also relate to a multipoint transmission (e.g., a CoMP transmission). In some examples, a broadcast transmission or a multicast transmission may be an example of a multipoint transmission.

At block 1905, the method 1900 may include identifying a plurality of ACKs or NAKs corresponding to at least one unicast transmission. The at least one unicast transmission may be transmitted on one or more of a plurality of channels of a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 1905 may be performed using the wireless communication manager 820 or 920 or base station wireless communication manager 1360 described with reference to FIG. 8, 9, or 13, or the unicast transmission ACK/NAK identifier 965 described with reference to FIG. 9.

At block 1910, the method 1900 may include determining a contention window size for a first multiple channel broadcast transmission or a first multiple channel multicast transmission. The first multiple channel broadcast transmission or the first multiple channel multicast transmission may be targeted for a plurality of UEs. The contention window size may be determined based at least in part on the plurality of ACKs or NAKs identified at block 1905. The operation(s) at block 1910 may be performed using the wireless communication manager 820 or 920 or base station wireless communication manager 1360 described with reference to FIG. 8, 9, or 13, or the contention window size manager 835 or 935 described with reference to FIG. 8 or 9.

At block 1915, the method 1900 may include contending for access to at least a first channel and a second channel of the plurality of channels of the shared radio frequency spectrum band, for the first multiple channel broadcast transmission or the first multiple channel multicast transmission, based at least in part on the determined contention window size. The operation(s) at block 1915 may be performed using the wireless communication manager 820 or 920 or base station wireless communication manager 1360 described with reference to FIG. 8, 9, or 13, or the channel access contender 840 or 940 described with reference to FIG. 8 or 9.

At block 1920, the method 1900 may include determining whether contention for access to at least the first channel and the second channel for the first multiple channel broadcast transmission or the first multiple channel multicast transmission is won. Upon winning contention for access to at least the first channel and the second channel, the method 1900 may continue at block 1925. Upon not winning contention for access to at least the first channel and the second channel, the method 1900 may continue at block 1930. At block 1925, the method 1900 may include transmitting the first channel and the second channel for the first multiple channel broadcast transmission or the first multiple channel multicast transmission. At block 1930, the method 1900 may include refraining from transmitting the first channel and the second channel for the first multiple channel broadcast transmission or the first multiple channel multicast transmission. The operation(s) at block 1920, 1925, or 1930 may be performed using the wireless communication manager 820 or 920 or base station wireless communication manager 1360 described with reference to FIG. 8, 9, or 13, or the transmission manager 950 described with reference to FIG. 9.

In some examples of the method 1900, the first multiple channel broadcast transmission or the first multiple channel multicast transmission may include a MBSFN transmission, a single cell eMBMS transmission, a SC-PTM transmission, or a combination thereof.

Thus, the method 1900 may provide for wireless communication. It should be noted that the method 1900 is just one implementation and that the operations of the method 1900 may be rearranged or otherwise modified such that other implementations are possible.

Figure 20:
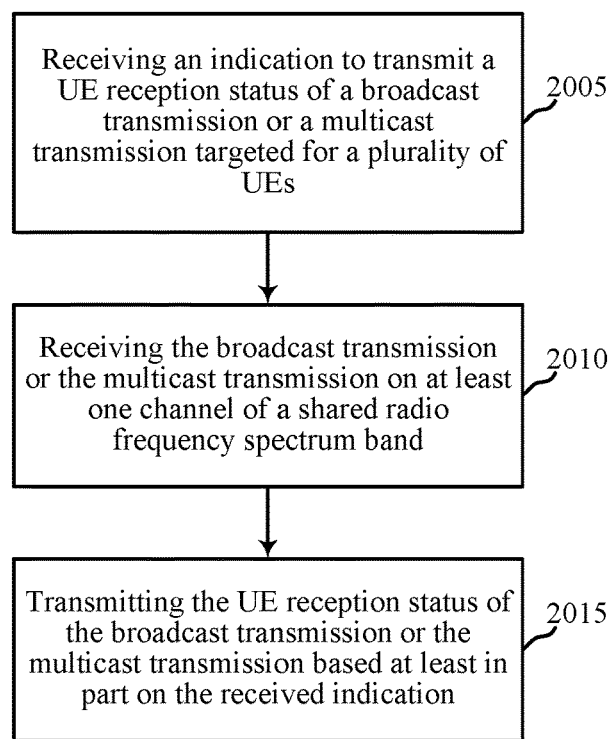
FIG. 20 is a flow chart illustrating an example of a method for wireless communication, in accordance with various aspects of the present disclosure.

FIG. 20 is a flow chart illustrating an example of a method 2000 for wireless communication, in accordance with various aspects of the present disclosure. For clarity, the method 2000 is described below with reference to aspects of one or more of the UEs 115, 215, 215-a, 215-b, 215-c, or 1415 described with reference to FIG. 1, 2, or 14, or aspects of the apparatus 1015 described with reference to FIG. 10. In some examples, a UE may execute one or more sets of codes to control the functional elements of the UE to perform the functions described below. Additionally or alternatively, the UE may perform one or more of the functions described below using special-purpose hardware. In some examples, methods and techniques described for method 2000 relating to a broadcast transmission or a multicast transmission (or a combination thereof) may also relate to a multipoint transmission (e.g., a CoMP transmission). In some examples, a broadcast transmission or a multicast transmission may be an example of a multipoint transmission.

At block 2005, the method 2000 may include receiving an indication to transmit a UE reception status of a broadcast transmission or a multicast transmission targeted for a plurality of UEs. The operation(s) at block 2005 may be performed using the wireless communication manager 1020 or UE wireless communication manager 1450 described with reference to FIG. 10 or 14, or the transmission reception status reporting manager 1040 described with reference to FIG. 10.

At block 2010, the method 2000 may include receiving the broadcast transmission or the multicast transmission on at least one channel of a shared radio frequency spectrum band. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 2010 may be performed using the wireless communication manager 1020 or UE wireless communication manager 1450 described with reference to FIG. 10 or 14, or the transmission reception manager 1035 described with reference to FIG. 10.

At block 2015, the method 2000 may include transmitting the UE reception status of the broadcast transmission or the multicast transmission based at least in part on the received indication. In some examples, the UE reception status of the broadcast transmission or the multicast transmission may include a UE BLER for the broadcast transmission or the multicast transmission. The operation(s) at block 2015 may be performed using the wireless communication manager 1020 or UE wireless communication manager 1450 described with reference to FIG. 10 or 14, or the transmission reception status reporting manager 1040 described with reference to FIG. 10.

In some examples of the method 2000, the broadcast transmission or the multicast transmission may include a MBSFN transmission, a single cell eMBMS transmission, a SC-PTM transmission, or a combination thereof. In some examples, the at least one channel over which the broadcast transmission or the multicast transmission is received may include a single channel. In other examples, the at least one channel over which the broadcast transmission or the multicast transmission is received may include at least a first channel and a second channel, and the broadcast transmission or the multicast transmission may include a multiple channel broadcast transmission or a multiple channel multicast transmission.

Thus, the method 2000 may provide for wireless communication. It should be noted that the method 2000 is just one implementation and that the operations of the method 2000 may be rearranged or otherwise modified such that other implementations are possible.

Figure 21:
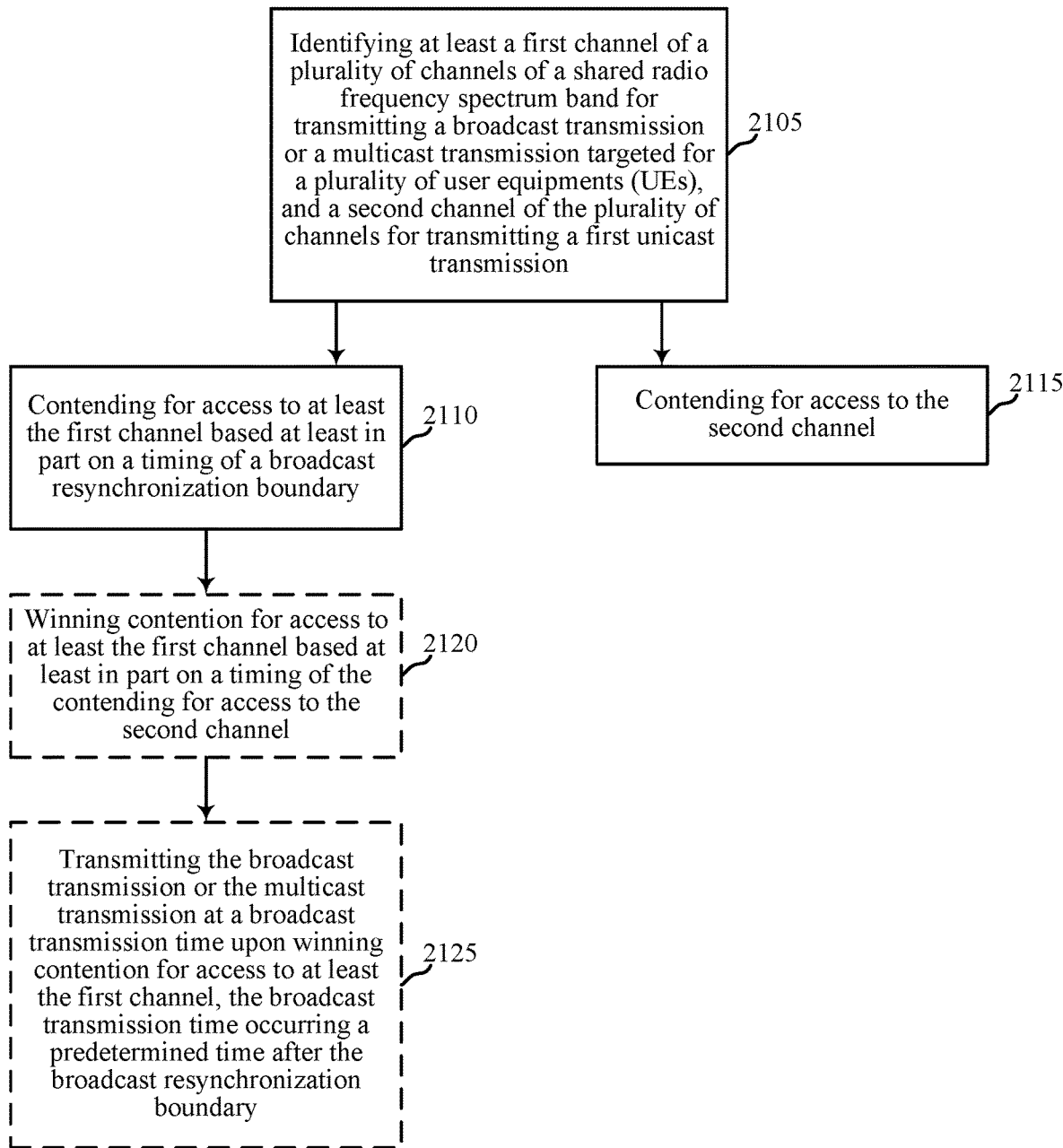
FIG. 21 is a flow chart illustrating an example of a method for wireless communication, in accordance with various aspects of the present disclosure.

FIG. 21 is a flow chart illustrating an example of a method 2100 for wireless communication, in accordance with various aspects of the present disclosure. For clarity, the method 2100 is described below with reference to aspects of one or more of the base stations 105, 205, 205-a, or 1305 described with reference to FIG. 1, 2, or 13, or aspects of one or more of the apparatuses 805 or 905 described with reference to FIG. 8 or 9. In some examples, a base station may execute one or more sets of codes to control the functional elements of the base station to perform the functions described below. Additionally or alternatively, the base station may perform one or more of the functions described below using special-purpose hardware. In some examples, methods and techniques described for method 2100 relating to a broadcast transmission or a multicast transmission (or a combination thereof) may also relate to a multipoint transmission (e.g., a CoMP transmission). In some examples, a broadcast transmission or a multicast transmission may be an example of a multipoint transmission.

At block 2105, the method 2100 may include identifying at least a first channel of a plurality of channels of a shared radio frequency spectrum band for transmitting a broadcast transmission or a multicast transmission, and identifying a second channel of the plurality of channels for transmitting a first unicast transmission. In some examples, the broadcast transmission or the multicast transmission may include a MBSFN transmission, a single cell eMBMS transmission, a SC-PTM transmission, or a combination thereof. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 2105 may be performed using the wireless communication manager 1120 or 1220 or base station wireless communication manager 1360 described with reference to FIG. 11, 12, or 13, or the transmission-to-channel mapper 1135 or 1235 described with reference to FIG. 11 or 12.

The operations at block 2110 and block 2115 may be performed independently, in synchronization, and/or in parallel. At block 2110, the method 2100 may include contending for access to at least the first channel based at least in part on a timing of a broadcast resynchronization boundary. The operation(s) at block 2110 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2115, the method 2100 may include contending for access to the second channel. In some examples, the contending for access to the second channel may be performed independently of the contending for access to at least the first channel. In some examples, the contending for access to the second channel may be synchronized with the broadcast resynchronization boundary. The operation(s) at block 2115 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2120, the method 2100 may optionally include winning contention for access to at least the first channel based at least in part on a timing of the contending for access to the second channel (at block 2115). For example, when contention for access to the at least first channel and the second channel is synchronized, or when contention for access to at least the first channel is won before winning contention for access to the second channel, contention for access to at least the first channel may be won. When contention for access to the second channel is won before winning contention for access to at least the first channel, or when the second channel is in use at the completion of contending for access to at least the first channel, contention for access to at least the first channel may not be won (e.g., use of the second channel for the first unicast transmission (or another transmission) may block access to at least the first channel for the broadcast transmission). The operation(s) at block 2120 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2125, the method 2100 may optionally include transmitting the broadcast transmission or the multicast transmission at a broadcast transmission time upon winning contention for access to at least the first channel. The broadcast transmission time may occur a predetermined time after a timing of the broadcast resynchronization boundary. The operation(s) at block 2125 may be performed using the wireless communication manager 1120 or 1220 or base station wireless communication manager 1360 described with reference to FIG. 11, 12, or 13, the transmission manager 1145 or 1245 described with reference to FIG. 11 or 12, or the broadcast/multicast transmission manager 1265 described with reference to FIG. 12.

Thus, the method 2100 may provide for wireless communication. It should be noted that the method 2100 is just one implementation and that the operations of the method 2100 may be rearranged or otherwise modified such that other implementations are possible.

Figure 22:
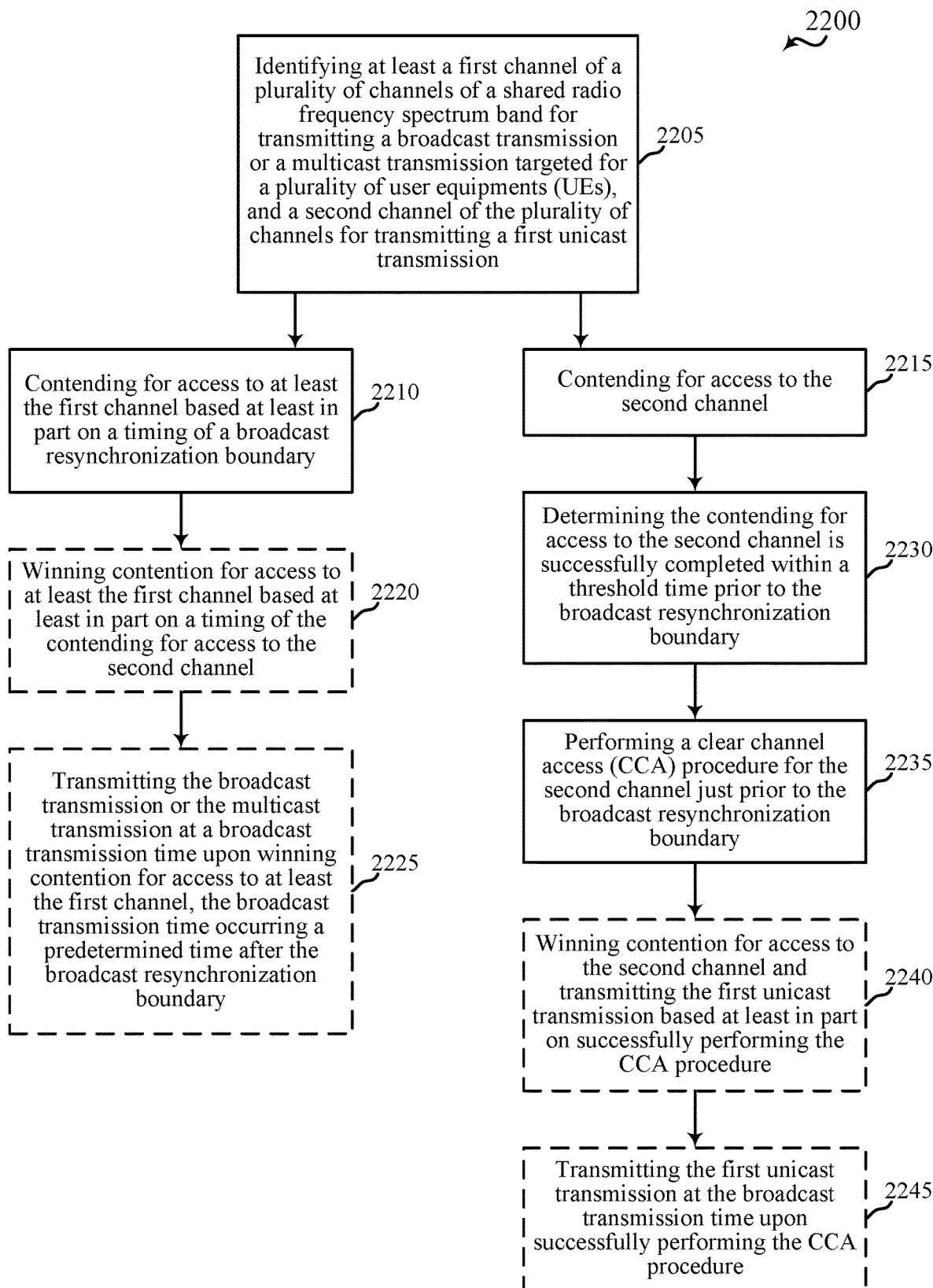
FIG. 22 is a flow chart illustrating an example of a method for wireless communication, in accordance with various aspects of the present disclosure.

FIG. 22 is a flow chart illustrating an example of a method 2200 for wireless communication, in accordance with various aspects of the present disclosure. For clarity, the method 2200 is described below with reference to aspects of one or more of the base stations 105, 205, 205-*a*, or 1305 described with reference to FIG. 1, 2, or 13, or aspects of one or more of the apparatuses 805 or 905 described with reference to FIG. 8 or 9. In some examples, a base station may execute one or more sets of codes to control the functional elements of the base station to perform the functions described below. Additionally or alternatively, the base station may perform one or more of the functions described below using special-purpose hardware. In some examples, methods and techniques described for method 2200 relating to a broadcast transmission or a multicast transmission (or a combination thereof) may also relate to a multipoint transmission (e.g., a CoMP transmission). In some examples, a broadcast transmission or a multicast transmission may be an example of a multipoint transmission.

At block 2205, the method 2200 may include identifying at least a first channel of a plurality of channels of a shared radio frequency spectrum band for transmitting a broadcast transmission or a multicast transmission, and identifying a second channel of the plurality of channels for transmitting a first unicast transmission. In some examples, the broadcast transmission or the unicast transmission may include a MBSFN transmission, a single cell eMBMS transmission, a SC-PTM transmission, or a combination thereof. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 2205 may be performed using the wireless communication manager 1120 or 1220 or base station wireless communication manager 1360 described with reference to FIG. 11, 12, or 13, or the transmission-to-channel mapper 1135 or 1235 described with reference to FIG. 11 or 12.

The operations at block 2210 and 2215 may be performed independently, in synchronization, and/or in parallel. At block 2210, the method 2200 may include contending for access to at least the first channel based at least in part on a timing of a broadcast resynchronization boundary. The operation(s) at block 2210 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2215, the method 2200 may include contending for access to the second channel. The operation(s) at block 2215 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2220, the method 2200 may optionally include winning contention for access to at least the first channel based at least in part on a timing of the contending for access to the second channel (at block 2215). The operation(s) at block 2220 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2225, the method 2200 may optionally include transmitting the broadcast transmission or the multicast transmission at a broadcast transmission time upon winning contention for access to at least the first channel. The broadcast transmission time may occur a predetermined time after a timing of the broadcast resynchronization boundary. The operation(s) at block 2225 may be performed using the wireless communication manager 1120 or 1220 or base station wireless communication manager 1360 described with reference to FIG. 11, 12, or 13, the transmission manager 1145 or 1245 described with reference to FIG. 11 or 12, or the broadcast/multicast transmission manager 1265 described with reference to FIG. 12.

At block 2230, the method 2200 may include determining the contending for access to the second channel is successfully completed within a threshold time prior to the broadcast resynchronization boundary. The operation(s) at block 2230 may be performed using the wireless communication manager 1120 or 1220 or base station wireless communication manager 1360 described with reference to FIG. 11, 12, or 13, the channel access contender 1140 or 1240 described with reference to FIG. 11 or 12, or the unicast transmission deferral manager 1250 described with reference to FIG. 12.

At block 2235, the method 2200 may include performing a CCA procedure for the second channel just prior to the broadcast resynchronization boundary. The operation(s) at block 2235 may be performed using the wireless communication manager 1120 or 1220 or base station wireless communication manager 1360 described with reference to FIG. 11, 12, or 13, the channel access contender 1140 or 1240 described with reference to FIG. 11 or 12, or the unicast transmission deferral manager 1250 described with reference to FIG. 12.

At block 2240, the method 2200 may optionally include winning contention for access to the second channel based upon successfully performing the CCA procedure. In this manner, transmission of the first unicast transmission on the second channel may be synchronized with transmission of the broadcast transmission or the multicast transmission on at least the first channel, and transmission of the first unicast transmission will not block contention for access to at least the first channel or block transmission of the broadcast transmission or the multicast transmission. The operation(s) at block 2240 may be performed using the wireless communication manager 1120 or 1220 or base station wireless communication manager 1360 described with reference to FIG. 11, 12, or 13, the channel access contender 1140 or 1240 described with reference to FIG. 11 or 12, or the unicast transmission deferral manager 1250 described with reference to FIG. 12.

At block 2245, the method 2200 may optionally include transmitting the first unicast transmission at the broadcast transmission time upon successfully performing the CCA procedure. The operation(s) at block 2245 may be performed using the wireless communication manager 1120 or 1220 or base station wireless communication manager 1360 described with reference to FIG. 11, 12, or 13, the transmission manager 1145 or 1245 described with reference to FIG. 11 or 12, or the unicast transmission manager 1270 described with reference to FIG. 12.

Thus, the method 2200 may provide for wireless communication. It should be noted that the method 2200 is just one implementation and that the operations of the method 2200 may be rearranged or otherwise modified such that other implementations are possible.

Figure 23:
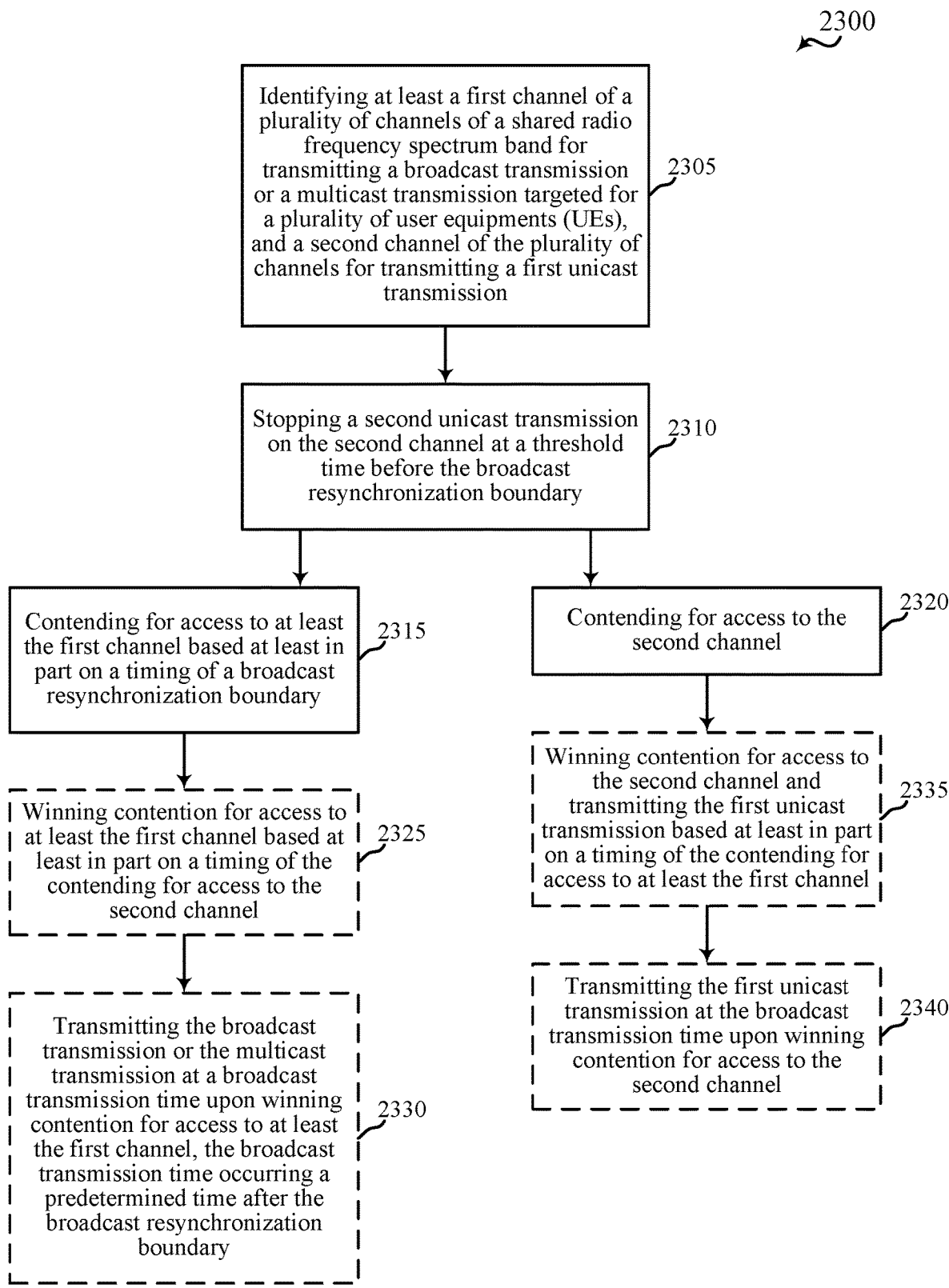
FIG. 23 is a flow chart illustrating an example of a method for wireless communication, in accordance with various aspects of the present disclosure.

FIG. 23 is a flow chart illustrating an example of a method 2300 for wireless communication, in accordance with various aspects of the present disclosure. For clarity, the method 2300 is described below with reference to aspects of one or more of the base stations 105, 205, 205-a, or 1305 described with reference to FIG. 1, 2, or 13, or aspects of one or more of the apparatuses 805 or 905 described with reference to FIG. 8 or 9. In some examples, a base station may execute one or more sets of codes to control the functional elements of the base station to perform the functions described below. Additionally or alternatively, the base station may perform one or more of the functions described below using special-purpose hardware. In some examples, methods and techniques described for method 2300 relating to a broadcast transmission or a multicast transmission (or a combination thereof) may also relate to a multipoint transmission (e.g., a CoMP transmission). In some examples, a broadcast transmission or a multicast transmission may be an example of a multipoint transmission.

At block 2305, the method 2300 may include identifying at least a first channel of a plurality of channels of a shared radio frequency spectrum band for transmitting a broadcast transmission or a multicast transmission, and identifying a second channel of the plurality of channels for transmitting a first unicast transmission. In some examples, the broadcast transmission or the multicast transmission may include a MBSFN transmission, a single cell eMBMS transmission, a SC-PTM transmission, or a combination thereof. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 2305 may be performed using the wireless communication manager 1120 or 1220 or base station wireless communication manager 1360 described with reference to FIG. 11, 12, or 13, or the transmission-to-channel mapper 1135 or 1235 described with reference to FIG. 11 or 12.

At block 2310, the method 2300 may include stopping a second unicast transmission on the second channel at a threshold time before a broadcast resynchronization boundary. The second unicast transmission may precede the first unicast transmission. Stopping the second unicast transmission may enable synchronization of contention for access to at least the first channel (for transmission of the broadcast transmission or the multicast transmission) and contention for access to the second channel (for transmission of the first unicast transmission), so that transmission of one of the transmissions does not block the other of the transmissions.

The operation(s) at block 2310 may be performed using the wireless communication manager 1120 or 1220 or base station wireless communication manager 1360 described with reference to FIG. 11, 12, or 13, or the unicast transmission termination manager 1255 described with reference to FIG. 12.

The operations performed at block 2315 and block 2320 may be performed independently, in synchronization, and/or in parallel. At block 2315, the method 2300 may include contending for access to at least the first channel based at least in part on a timing of the broadcast resynchronization boundary. The operation(s) at block 2315 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2320, the method 2300 may include contending for access to the second channel upon stopping the second unicast transmission. The operation(s) at block 2320 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2325, the method 2300 may optionally include winning contention for access to at least the first channel based at least in part on a timing of the contending for access to the second channel (at block 2320). The operation(s) at block 2325 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2330, the method 2300 may optionally include transmitting the broadcast transmission or the multicast transmission at a broadcast transmission time upon winning contention for access to at least the first channel. The broadcast transmission time may occur a predetermined time after a timing of the broadcast resynchronization boundary. The operation(s) at block 2330 may be performed using the wireless communication manager 1120 or 1220 or base station wireless communication manager 1360 described with reference to FIG. 11, 12, or 13, the transmission manager 1145 or 1245 described with reference to FIG. 11 or 12, or the broadcast/multicast transmission manager 1265 described with reference to FIG. 12.

At block 2335, the method 2300 may optionally include winning contention for access to the second channel based at least in part on a timing of the contending for access to at least the first channel (at block 2315). The operation(s) at block 2335 may be performed using the wireless communication manager 1120 or 1220 or base station wireless communication manager 1360 described with reference to FIG. 11, 12, or 13, the channel access contender 1140 or 1240 described with reference to FIG. 11 or 12, or the unicast transmission deferral manager 1250 described with reference to FIG. 12.

At block 2340, the method 2300 may optionally include transmitting the first unicast transmission at the broadcast transmission time upon winning contention for access to the second channel. The operation(s) at block 2340 may be performed using the wireless communication manager 1120 or 1220 or base station wireless communication manager 1360 described with reference to FIG. 11, 12, or 13, the transmission manager 1145 or 1245 described with reference to FIG. 11 or 12, or the unicast transmission manager 1270 described with reference to FIG. 12.

Thus, the method 2300 may provide for wireless communication. It should be noted that the method 2300 is just one implementation and that the operations of the method 2300 may be rearranged or otherwise modified such that other implementations are possible.

Figure 24:
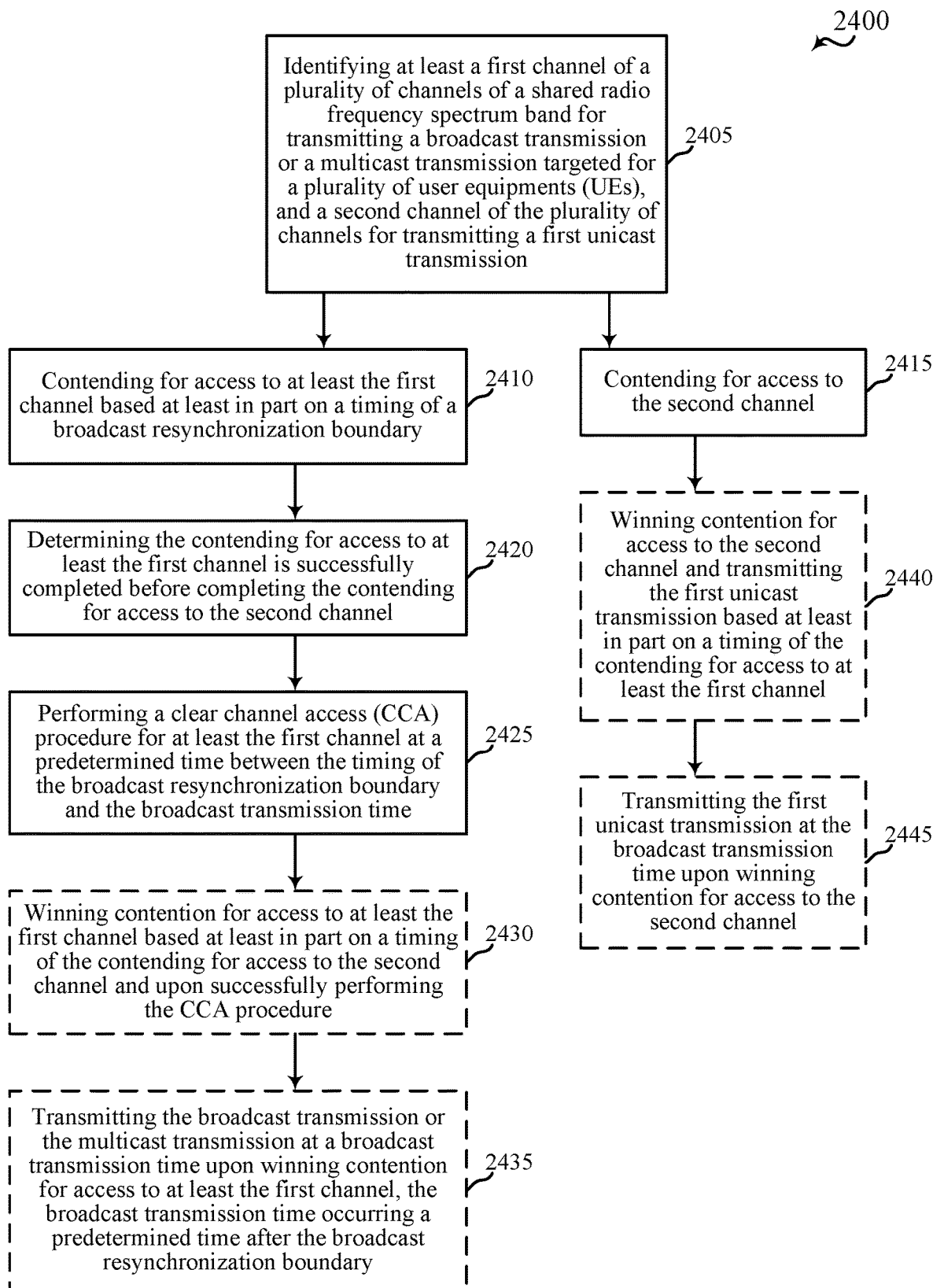
FIG. 24 is a flow chart illustrating an example of a method for wireless communication, in accordance with various aspects of the present disclosure.

FIG. 24 is a flow chart illustrating an example of a method 2400 for wireless communication, in accordance with various aspects of the present disclosure. For clarity, the method 2400 is described below with reference to aspects of one or more of the base stations 105, 205, 205-a, or 1305 described with reference to FIG. 1, 2, or 13, or aspects of one or more of the apparatuses 805 or 905 described with reference to FIG. 8 or 9. In some examples, a base station may execute one or more sets of codes to control the functional elements of the base station to perform the functions described below. Additionally or alternatively, the base station may perform one or more of the functions described below using special-purpose hardware. In some examples, methods and techniques described for method 2400 relating to a broadcast transmission or a multicast transmission (or a combination thereof) may also relate to a multipoint transmission (e.g., a CoMP transmission). In some examples, a broadcast transmission or a multicast transmission may be an example of a multipoint transmission.

At block 2405, the method 2400 may include identifying at least a first channel of a plurality of channels of a shared radio frequency spectrum band for transmitting a broadcast transmission or a multicast transmission, and identifying a second channel of the plurality of channels for transmitting a first unicast transmission. In some examples, the broadcast transmission or the multicast transmission may include a MBSFN transmission, a single cell eMBMS transmission, a SC-PTM transmission, or a combination thereof. The shared radio frequency spectrum band may include a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner). The operation(s) at block 2405 may be performed using the wireless communication manager 1120 or 1220 or base station wireless communication manager 1360 described with reference to FIG. 11, 12, or 13, or the transmission-to-channel mapper 1135 or 1235 described with reference to FIG. 11 or 12.

The operations performed at block 2410 and block 2415 may be performed independently, in synchronization, and/or in parallel. At block 2410, the method 2400 may include contending for access to at least the first channel based at least in part on a timing of the broadcast resynchronization boundary. The operation(s) at block 2410 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2415, the method 2400 may include contending for access to the second channel. The operation(s) at block 2415 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2420, the method 2400 may include determining the contending for access to at least the first channel is successfully completed before completing the contending for access to the second channel. The operation(s) at block 2420 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2425, the method 2400 may include performing a CCA procedure for at least the first channel at a predetermined time between the timing of the broadcast resynchronization boundary and a broadcast transmission time. The broadcast transmission time may occur a predetermined time after a timing of the broadcast resynchronization boundary. In this manner, transmission of the broadcast transmission or the multicast transmission on at least the first channel may be synchronized with transmission of the first unicast transmission on the second channel, and transmission of the broadcast transmission or the multicast transmission will not block contention for access to the second channel or block transmission of the first unicast transmission. The operation(s) at block 2425 may be performed using the wireless communication manager 1120 or 1220 or base station wireless communication manager 1360 described with reference to FIG. 11, 12, or 13, the channel access contender 1140 or 1240 described with reference to FIG. 11 or 12, or the broadcast/multicast transmission deferral manager 1260.

At block 2430, the method 2400 may optionally include winning contention for access to at least the first channel based at least in part on a timing of the contending for access to the second channel (at block 2415) and upon successfully performing the CCA procedure (at block 2425). The operation(s) at block 2430 may be performed using the wireless communication manager 1120 or 1220 or base station wireless communication manager 1360 described with reference to FIG. 11, 12, or 13, or the channel access contender 1140 or 1240 described with reference to FIG. 11 or 12.

At block 2435, the method 2400 may optionally include transmitting the broadcast transmission at a broadcast transmission time upon winning contention for access to at least the first channel. The broadcast transmission time may occur a predetermined time after a timing of the broadcast resynchronization boundary. The operation(s) at block 2435 may be performed using the wireless communication manager 1120 or 1220 or base station wireless communication manager 1360 described with reference to FIG. 11, 12, or 13, the transmission manager 1145 or 1245 described with reference to FIG. 11 or 12, or the broadcast/multicast transmission manager 1265 described with reference to FIG. 12.

At block 2440, the method 2400 may optionally include winning contention for access to the second channel based at least in part on a timing of the contending for access to at least the first channel (at block 2315). The operation(s) at block 2440 may be performed using the wireless communication manager 1120 or 1220 or base station wireless communication manager 1360 described with reference to FIG. 11, 12, or 13, the channel access contender 1140 or 1240 described with reference to FIG. 11 or 12, or the unicast transmission deferral manager 1250 described with reference to FIG. 12.

At block 2445, the method 2400 may optionally include transmitting the first unicast transmission at the broadcast transmission time upon winning contention for access to the second channel. The operation(s) at block 2445 may be performed using the wireless communication manager 1120 or 1220 or base station wireless communication manager 1360 described with reference to FIG. 11, 12, or 13, the transmission manager 1145 or 1245 described with reference to FIG. 11 or 12, or the unicast transmission manager 1270 described with reference to FIG. 12.

Thus, the method 2400 may provide for wireless communication. It should be noted that the method 2400 is just one implementation and that the operations of the method 2400 may be rearranged or otherwise modified such that other implementations are possible.

In some examples, aspects of the methods 1500, 1600, 1700, 1800, 1900, 2100, 2200, or 2300 described with reference to FIG. 15, 16, 17, 18, 19, 21, 22, or 23 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be a processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Components implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communications, comprising:
    determining a previous contention window size for a transmission over a shared radio frequency spectrum band;
    determining, based at least in part on a unicast reception status of at least a unicast transmission over the shared radio frequency spectrum band, a current contention window size for a first multipoint transmission on at least one channel of the shared radio frequency spectrum band, wherein the first multipoint transmission is targeted for a first plurality of user equipments (UEs), wherein determining the current contention window size further comprises:
        increasing the current contention window size compared with the previous contention window size upon receiving one or more non-acknowledgements (NAKs) for the unicast transmission; or
        decreasing the current contention window size or leaving the current contention window size the same compared with the previous contention window size upon receiving one or more acknowledgements (ACKs) for the unicast transmission; and
    contending for access to the at least one channel of the shared radio frequency spectrum band for the first multipoint transmission based at least in part on the determined current contention window size.

2. The method of claim 1, wherein the first multipoint transmission comprises a first broadcast transmission or a first multicast transmission.

3. The method of claim 1, wherein the first multipoint transmission comprises a coordinated multipoint transmission.

4. The method of claim 1, further comprising:
    determining a load on the at least one channel of the shared radio frequency spectrum band;
    wherein determining the current contention window size is further based at least in part on the determined load.

5. The method of claim 1, further comprising:
    multiplexing the at least one unicast transmission with the first multipoint transmission on the at least one channel of the shared radio frequency spectrum band; and
    determining the unicast reception status based at least in part on identifying the one or more ACKs or NAKs received for the at least one unicast transmission;
    wherein determining the current contention window size is further based at least in part on the ACKs or NAKs identified for the at least one unicast transmission.

6. The method of claim 1, further comprising:
    receiving, from each user equipment (UE) of a second plurality of UEs, an additional UE reception status of a second multipoint transmission on the at least one channel of the shared radio frequency spectrum band, wherein the second multipoint transmission is transmitted before the first multipoint transmission and targeted for the second plurality of UEs;
wherein determining the current contention window size is further based at least in part on the additional UE reception statuses.

7. The method of claim 6, wherein each UE reception status of the second multipoint transmission comprises a UE block error rate (BLER) for the second multipoint transmission.

8. The method of claim 6, further comprising:
receiving identifications of broadcast services of interest from each UE of at least the second plurality of UEs;
identifying the second plurality of UEs from the received identifications; and
triggering the second plurality of UEs to transmit the additional UE reception statuses for the second multipoint transmission.

9. The method of claim 6, wherein the first plurality of UEs and the second plurality of UEs comprise a same plurality of UEs or different pluralities of UEs.

10. The method of claim 1, wherein the at least one channel comprises at least a first channel and a second channel, and the first multipoint transmission comprises a multiple channel multipoint transmission over at least the first channel and the second channel.

11. The method of claim 10, further comprising:
determining the unicast reception status based at least in part on the one or more ACKS or NAKs corresponding to the at least one unicast transmission, wherein the at least one unicast transmission is transmitted on one or more of a plurality of channels of the shared radio frequency spectrum band, the plurality of channels including the at least one channel on which the first multipoint transmission is transmitted.

12. The method of claim 1, wherein the first multipoint transmission comprises a multicast-broadcast single-frequency network (MBSFN) transmission, a single cell enhanced multimedia broadcast multicast services (eMBMS) transmission, a single cell point to multipoint (SC-PTM) transmission, or a combination thereof.

13. The method of claim 1, wherein determining, based at least in part on the unicast reception status of the shared radio frequency spectrum band, the contention window size further comprises:
increasing the current contention window size compared with the previous contention window size upon receiving more than a threshold number of NAKs for the unicast transmission.

14. The method of claim 1, wherein determining the current contention window size is further based on a current Listen-Before-Talk (LBT) burst.

15. An apparatus for wireless communications, comprising:
a processor;
memory coupled to the processor; and
the processor and the memory configured to:
determine a previous contention window size for a transmission over a shared radio frequency spectrum band;
determine, based at least in part on a unicast reception status of at least a unicast transmission over the shared radio frequency spectrum band, a current contention window size for a first multipoint transmission on at least one channel of the shared radio frequency spectrum band, wherein the first multipoint transmission is targeted for a first plurality of user equipments (UEs), wherein determine the current contention window size further comprises:
increase the current contention window size compared with the previous contention window size upon receiving one or more non-acknowledgements (NAKs) for the unicast transmission; or
decrease the current contention window size or leave the current contention window size the same compared with the previous contention window size upon receiving one or more acknowledgements (ACKs) for the unicast transmission; and
contend for access to the at least one channel of the shared radio frequency spectrum band for the first multipoint transmission based at least in part on the determined current contention window size.

16. The apparatus of claim 15, wherein the first multipoint transmission comprises a first broadcast transmission or a first multicast transmission.

17. The apparatus of claim 15, wherein the first multipoint transmission comprises a coordinated multipoint transmission.

18. The apparatus of claim 15, wherein the processor and the memory are configured to:
determine a load on the at least one channel of the shared radio frequency spectrum band;
wherein determine the current contention window size is further based at least in part on the determined load.

19. The apparatus of claim 15, wherein the processor and the memory are configured to:
multiplex the at least one unicast transmission with the first multipoint transmission on the at least one channel of the shared radio frequency spectrum band; and
determine the unicast reception status based at least in part on identifying the one or more ACKs or NAKs received for the at least one unicast transmission;
wherein determine the current contention window size is further based at least in part on the ACKs or NAKs identified for the at least one unicast transmission.

20. The apparatus of claim 15, wherein the processor and the memory are configured to:
receive from each user equipment (UE) of a second plurality of UEs, an additional UE reception status of a second multipoint transmission on the at least one channel of the shared radio frequency spectrum band, wherein the second multipoint transmission is transmitted before the first multipoint transmission and targeted for the second plurality of UEs;
wherein determine the current contention window size is further based at least in part on the UE reception statuses.

21. The apparatus of claim 20, wherein each UE reception status of the second multipoint transmission comprises a UE block error rate for the second multipoint transmission.

22. The apparatus of claim 15, wherein the at least one channel comprises at least a first channel and a second channel, and the first multipoint transmission comprises a multiple channel multipoint transmission over at least the first channel and the second channel.

23. The apparatus of claim 22, wherein the processor and the memory are configured to:
determine the unicast reception status based at least in part on identifying the one or more ACKs or NAKs corresponding to the at least one unicast transmission, wherein the at least one unicast transmission is transmitted on one or more of a plurality of channels of the shared radio frequency spectrum band, the plurality of channels including the at least one channel on which the first multipoint transmission is transmitted;

wherein determining the current contention window size is further based at least in part on the plurality of ACKs or NAKs.

24. The apparatus of claim 15, wherein the first multipoint transmission comprises a multicast-broadcast single-frequency network (MBSFN) transmission, a single cell enhanced multimedia broadcast multicast services (eMBMS) transmission, a single cell point to multipoint (SC-PTM) transmission, or a combination thereof.

* * * * *